United States Patent [19]
Mishima et al.

[11] Patent Number: 6,111,667
[45] Date of Patent: Aug. 29, 2000

[54] IMAGE PROCESSING APPARATUS AND IMAGE FORMING APPARATUS CONNECTED TO THE IMAGE PROCESSING APPARATUS

[75] Inventors: Nobuhiro Mishima, Toyokawa; Munehiro Nakatani, Toyohashi; Kazuhiro Ueda, Toyokawa; Eiji Hanada, Aichi-Ken, all of Japan

[73] Assignee: Minolta Co., Ltd., Osaka, Japan

[21] Appl. No.: 08/763,466

[22] Filed: Dec. 11, 1996

[30] Foreign Application Priority Data

Dec. 12, 1995 [JP] Japan .................................... 7-346144

[51] Int. Cl.[7] .................................................. H04N 1/04
[52] U.S. Cl. .......................... 358/488; 358/452; 358/401; 382/294
[58] Field of Search ..................... 358/488, 449, 358/404, 444, 401, 496, 497, 498, 408, 452, 527; 382/294, 296, 293, 295; 355/23, 25; 399/374, 372, 371, 368, 362; H04N 1/04, 1/387

[56] References Cited

U.S. PATENT DOCUMENTS

| | | | |
|---|---|---|---|
| 4,972,271 | 11/1990 | Koumura | 358/300 |
| 5,093,653 | 3/1992 | Ikehira | 358/488 |
| 5,440,403 | 8/1995 | Hashimoto et al. | 358/488 |
| 5,528,387 | 6/1996 | Kelly et al. | 358/488 |
| 5,566,004 | 10/1996 | Imaizumi et al. | 358/450 |
| 5,726,775 | 3/1998 | Walsh | 358/488 |
| 5,764,379 | 6/1998 | Matsuda et al. | 358/488 |
| 5,764,383 | 6/1998 | Saund et al. | 358/488 |
| 5,764,870 | 6/1998 | Manico et al. | 395/117 |

FOREIGN PATENT DOCUMENTS 4-150560  5/1992  Japan .

Primary Examiner—Cheukfan Lee
Attorney, Agent, or Firm—McDermott, Will & Emery

[57] ABSTRACT

An image processing apparatus capable of outputting high quality image by correcting deviations of respective positions or inclinations of a plurality of sheets of document simultaneously placed on a document base and an image forming apparatus connected to the image processing apparatus and capable of forming a copy with no inclination in respect of paper. Image data with the corrected position or corrected inclination is provided by processing the image signal.

29 Claims, 58 Drawing Sheets

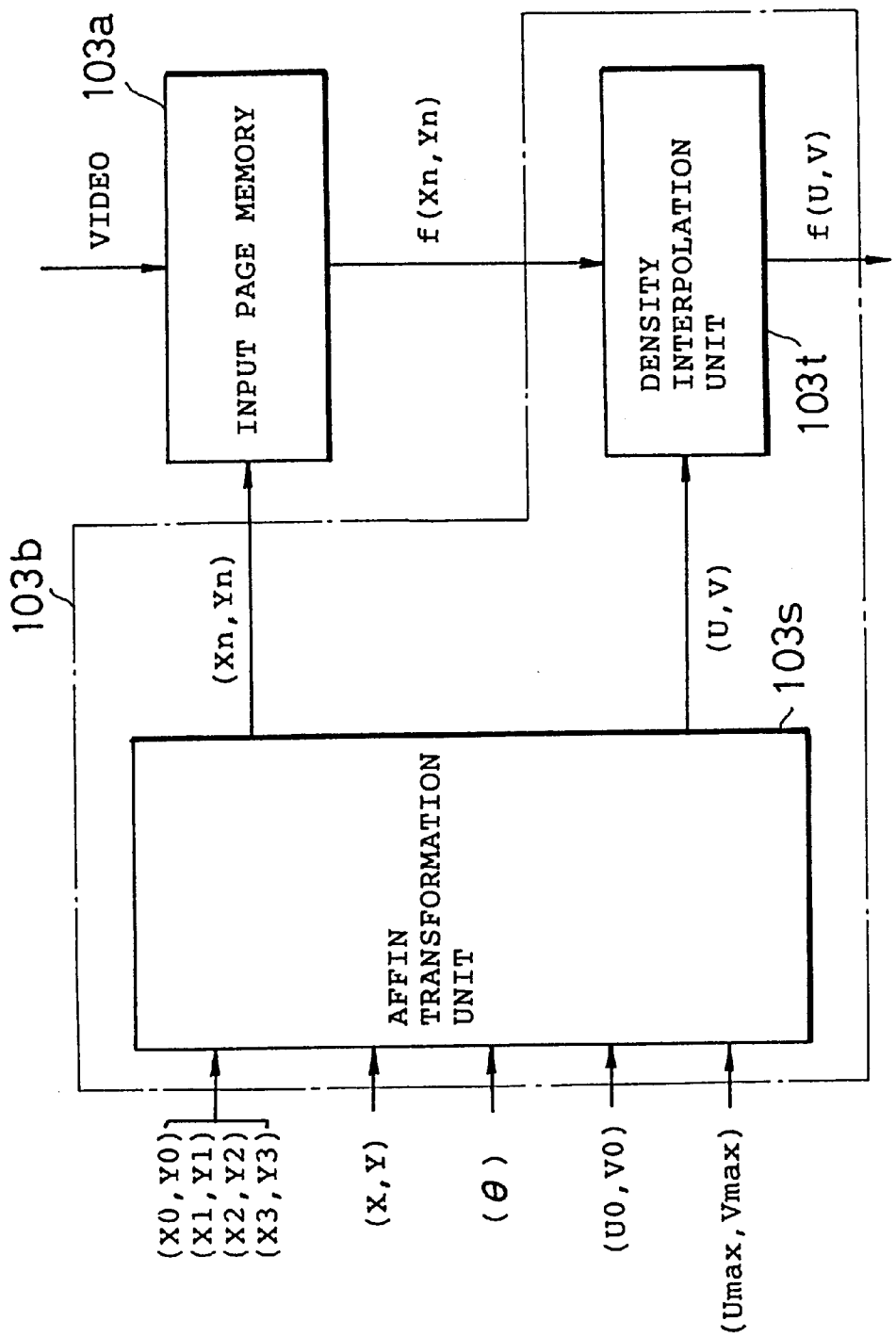

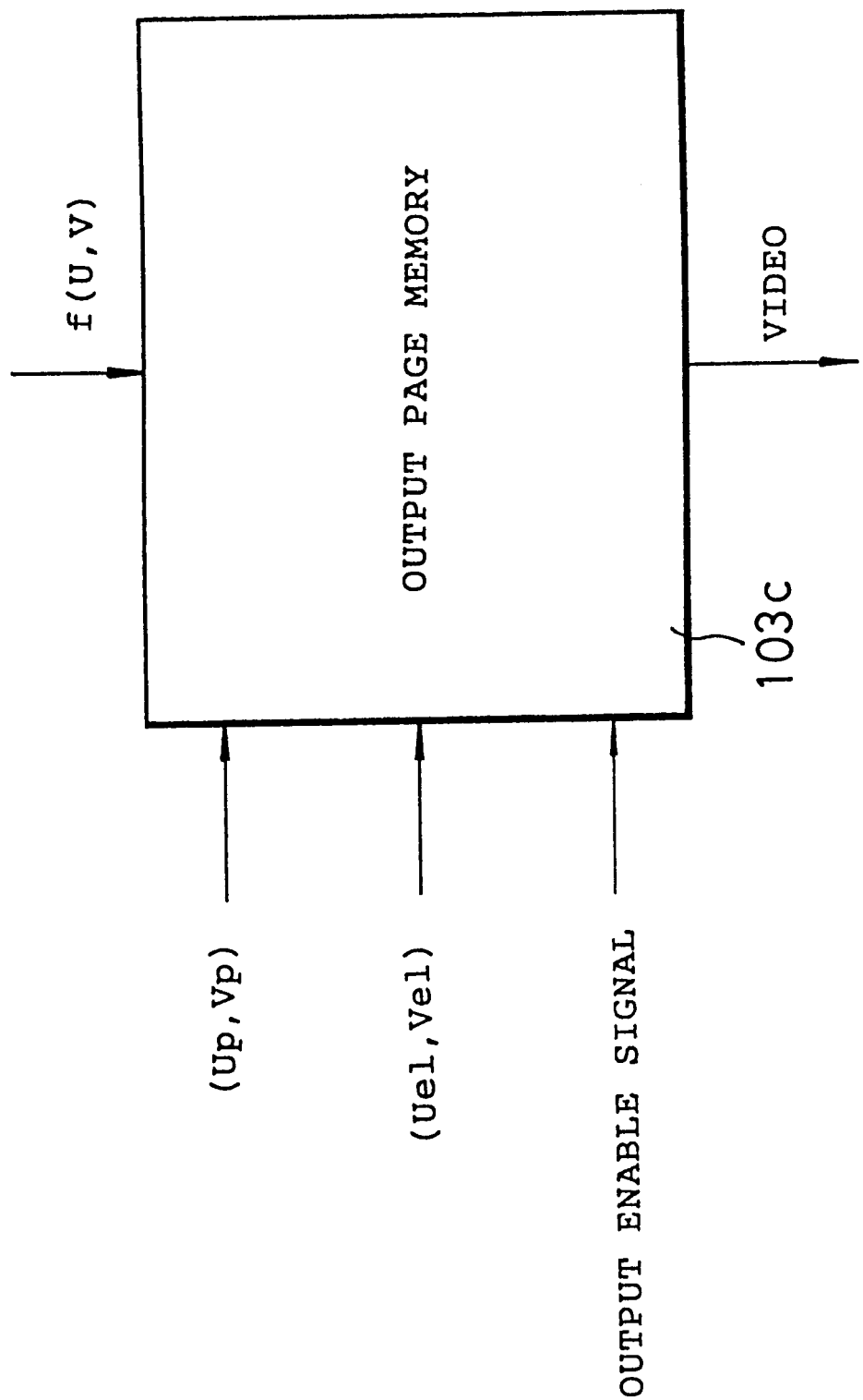

Xbook = (Xmax + Xmin) / 2

IMAGE PROCESSING APPARATUS AND IMAGE FORMING APPARATUS CONNECTED TO THE IMAGE PROCESSING APPARATUS

BACKGROUND OF THE INVENTION

Field of the Invention

The present invention relates to an image processing apparatus and an image forming apparatus connected to the image processing apparatus, particularly to an image processing apparatus by which even if a plurality of sheets of document placed on a document base or a plurality of image information sent from a host system such as a scanner or the like, are inclined respectively at different angles, the inclination of each of the image information can be corrected and aligned image can be outputted, and an image forming apparatus connected to the image processing apparatus and capable of conducting image forming operation in respect of image outputted from the image processing apparatus.

For example, according to an image processing apparatus an automatic document feeder (ADF) automatically setting document on a document base and continuously discharging document which has been set on the document base and has been read from the document base, is provided whereby swift finishing of image reading operation in respect of a large number of sheets of document is achieved.

In this case, if the document is set in an inclined state in setting the document onto the document base, image of the document in an inclined state is naturally read in reading it by a scanner or the like and when printing operation is conducted on paper by, for example, a printer, etc. connected to the image processing apparatus based on the inclined image, the printed image is inclined. Accordingly, it is necessary to provide means for setting the document in an aligned state in setting the document onto the document base or correcting the inclination in setting the document.

Hence, according to a conventional image processing apparatus, firstly, a lateral width regulating plate is set to a document tray of the ADF to prevent the document from setting in an inclined state. Further, when an operator sets document onto a document tray of the ADF, the operator regulates the document into an aligned state on the document tray by butting the regulating plate to the document and thereafter starts the transferring operation. The document may be inclined in the midst of transferring the document from the document tray of the ADF to the document base and therefore, the operator corrects the inclination of the document on the document base by butting a side of the document to a document scale (rule plate) provided on the document base as a reference position.

However, when a bundle of document to be set to the ADF is mixed with a plurality of sheets of document having different sizes, only the document having the maximum size can be butted to the above-described lateral width regulating plate (document having a size smaller than the maximum size cannot be butted) and therefore, the inclination of the document having a size smaller than the maximum size cannot be corrected. Also, when a plurality of sheets of document are set on the document base by the ADF, sides of all the document cannot be butted to the document scale and therefore, the positions or the inclinations in respect of all the document cannot be corrected.

In scanning a book etc. (hereinafter, book type document), an operator places two spread pages on the document base and the scanning is conducted. If the left and right pages are placed to be inclined in respect of a reference line such as the document scale on the document base by the operator, the image of the two scanned spread pages is inclined, giving rise to inconvenience wherein when the inclined image is printed by a printer, etc., the image is inclined in respect of the periphery of paper and looks untidy.

Furthermore, if respectives of image information are inclined when a plurality of image information sent from a host system or the like, are sent to an image processing apparatus, and the image processing apparatus outputs the respective image information without correcting the inclinations of the image information, for example, in the case where the respectives of image information are printed by an image forming apparatus connected to the image processing apparatus, there causes inconvenience in which the plurality of images are inclined in respect of the periphery of paper and look untidy.

SUMMARY OF THE INVENTION

It is the major object of the present invention to provide an image processing apparatus capable of outputting high quality image, in which even if a plurality of sheets of document placed simultaneously on a document base or image information sent from a host system or the like, are positionally shifted or inclined, the positional shift or inclination of image can be corrected by processing image signals.

It is another object or the present invention to provide an image forming apparatus connected to the image processing apparatus capable of outputting high quality image by correcting the positional shift or the inclination of image by processing image signals even if the image information is positionally shifted or inclined whereby copies having no inclination in respect of record medium can be formed in printing the copies.

It is another object of the present invention to provide an image processing apparatus capable of visually recognizing positions or inclinations of a plurality of sheets of document before correction, which are simultaneously placed on a document base and a result of correcting the positions or the inclinations of the plurality of sheets of document by processing image signals provided by scanning the document.

The other objects of the present invention will be clarified by a detailed explanation in reference to the drawings.

BRIEF DESCRIPTION OF THE DRAWINGS

FIG. 10 is a block diagram showing details of the constitution of a rotation processor;

FIG. 12 is a diagram for explaining input and output signals such as paper size, erasure area and the like in an output page memory;

DETAILED DESCRIPTION OF THE PREFERRED EMBODIMENTS

An explanation will be given of embodiments of the present invention in reference to the drawings as follows.

(Outline of Constitution of Copier)

Figure 1:
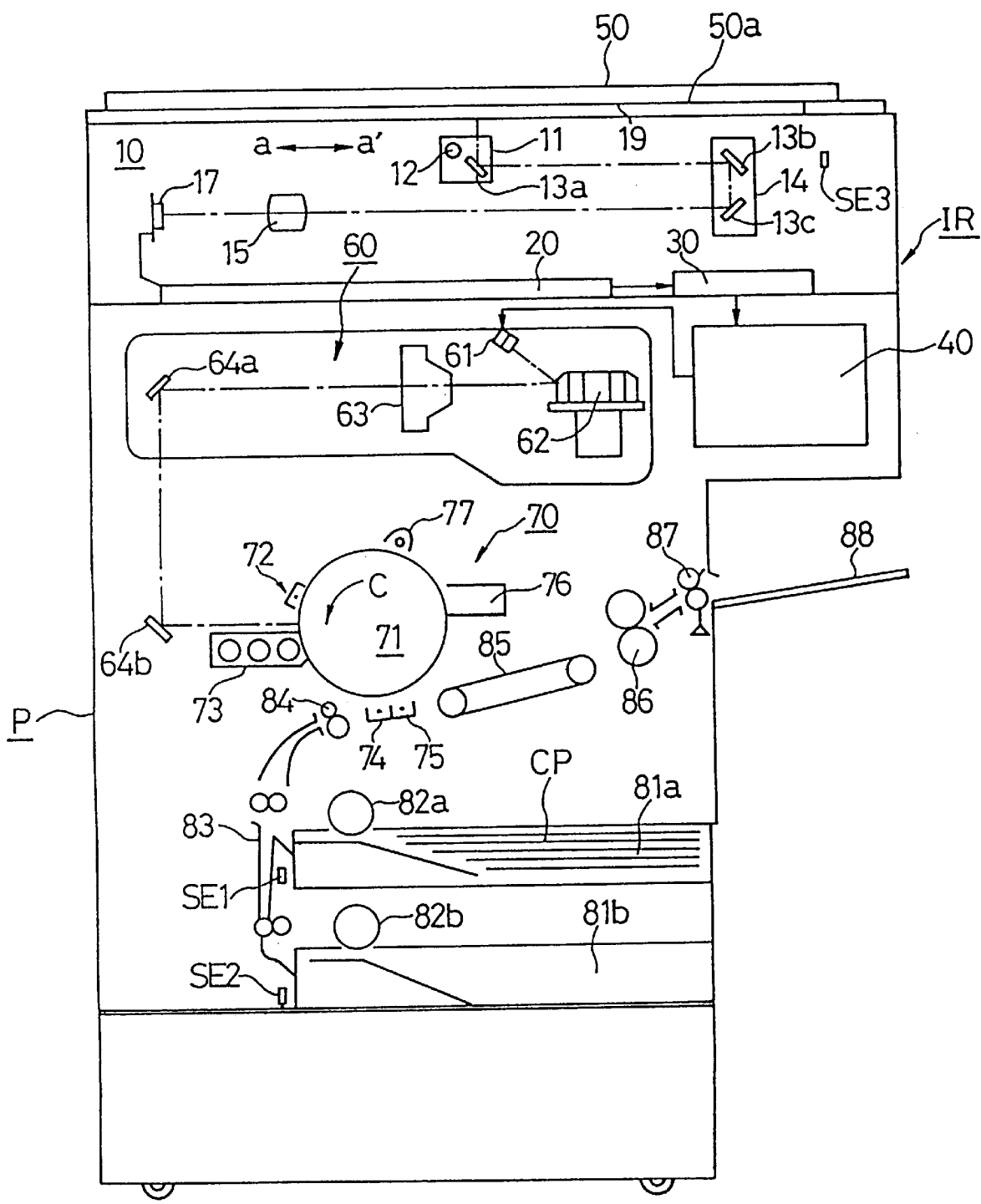
FIG. 1 is a sectional view showing an outline of the constitution of a digital copier suitable for applying the present invention.

FIG. 1 is a sectional view showing the outline of the constitution of a digital copier to which the present invention is applied. The copier 1 is constituted grossly by an image reading unit IR and a printing unit P.

The image reading unit IR reads image of document placed on a document base 19 and forms image data corresponding to respective pixels of the document and is constituted by a scanning system 10 for reading the image of the document and convert it into image signal, an image processing unit 20 for processing the image signal outputted from the scanning system 10 and a rotation control unit 30 for rotating the image data outputted from the image processing unit 20 and outputting it to a printer.

The printing unit P forms image on record paper based on the image data and is constituted by a printing processing unit 40 for driving a laser oscillator 61 based on the image data outputted from the rotation control unit 30 of the image reading unit IR, a laser optical system 60 for focussing laser beam irradiated from the laser oscillator 61 onto a photosensitive drum 71 and an image forming system 70 for developing latent image formed on the photosensitive drum 71 and transferring and fixing it onto record paper.

An explanation will be given of the outline of the constitution and the operation of the image reading unit IR. The scanning system 10 is provided with a first scanner 11 comprising an exposure lamp 12 and a first mirror 13*a* and a second scanner 14 comprising a second mirror 13*b* and a third mirror 13*c*.

When the first and the second scanners 11 and 14 are moved in an arrow mark "a'" direction by a motor, not illustrated, the document image is scanned by a preliminary scanning by moving the scanners at higher speed than a speed at which the scanners scan the document image in an arrow mark "a" direction whereby the position of the document image is detected. Further, the movement of the first and the second scanners 11 and 14 in the arrow mark "a" direction constitutes a regular scanning which scans document in the sub-scanning direction.

Numeral 17 designates a line sensor which is constituted by a large number of CCDs arranged in the main scanning direction (orthogonal to paper face) for reading the image in the main scanning direction. That is, the document image that is projected via the first and the second scanners 11 and 14 and a projecting lens 15, is focused on the line sensor 17 and image signals corresponding to respective pixels of she document image are outputted from the line sensor 17. Incidentally, a sensor SE 3 detects that the first scanner 11 is at home position.

The image signal outputted from the line sensor 17 is subjected to adjustment of image darkness and other necessary correction processings by the image processing unit 20 and thereafter stored once in a memory at the rotation control unit 30 and is outputted to the printing unit P after it is rotated. When the rotation processing is not necessary, the image signal is outputted to the printing unit P as it is.

A face 50*a* of a document cover 50 on the side of the document base (platen glass) 19 is colored in orange having a low spectroscopic sensitivity in respect of the line sensor 17. Thereby, even if light of the exposure lamp is reflected by the document cover 50 and is incident on the line sensor, no detecting signal is outputted from the line sensor in respect of the face of the document cover 50 on the side of the document base as in black color. The sheet of document is normally in white and therefore, the line sensor can identify the document and the rear face of the document cover even in a state where the document cover is closed and can identify the area of the document in a state where the document cover is opened since light from the exposure lamp that is reflected by the document cover does not reach the line sensor.

An explanation will be given of the outline of the constitution and the operation of the printing unit P. The printing processing unit 40 modulates the laser oscillator 61 based on the image data outputted from the rotation control unit 30. Laser beam that is modulated based on the image data, is projected onto the photosensitive drum 71 via a polygonal mirror 62, a f/θ lens 63 and mirrors 64*a* and 64*b* whereby the latent image is formed.

A main charger 72, a developer 73, a transferring charger 74, a separating charger 75, a cleaner 76, an eraser lamp 77 and the like are arranged at the surrounding of the photosensitive drum 71 and the latent image on the photosensitive drum 71 is developed by a toner through the processing of a well-known electronic photography.

Recording paper CP stored in paper feed cassettes 81*a* and 81*b*, is fed by paper feed rollers 82*a* and 82*b* which are driven to rotate and are transferred by transfer rollers, not illustrated, and is once stopped at an awaiting position where a front end thereof is brought into contact with a nip portion of a timing roller 84. Incidentally, notations SE 1 and SE 2 designate sensors for detecting the size of the recording paper CP stored in the paper feed cassettes 81*a* and 81*b*.

The toner image formed on the photosensitive drum 71 is moved to a transferring position. Corresponding to the timing, the timing roller 84 starts rotating and the recording paper CP standing ready at the awaiting position is transferred to the transferring position where the transferring charger 74 is disposed. At the transferring position the toner image formed on the photosensitive drum 71 is transcribed onto the recording paper CP by the operation of the transferring charger 74. The recording paper CP is separated from the photosensitive drum 71 by the operation of the separating charger 75 and is transferred by a transfer belt 85. The toner image is thermo-compressed at a fixing roller 86 and is fixed onto the recording paper CP. Incidentally, the photosensitive drum 71, the paper feed rollers 82*a* and 82*b*, the transfer belt 85, the fixing roller 86 and the like are driven by motors, not illustrated.

(Constitution of Control System)

Figure 2:
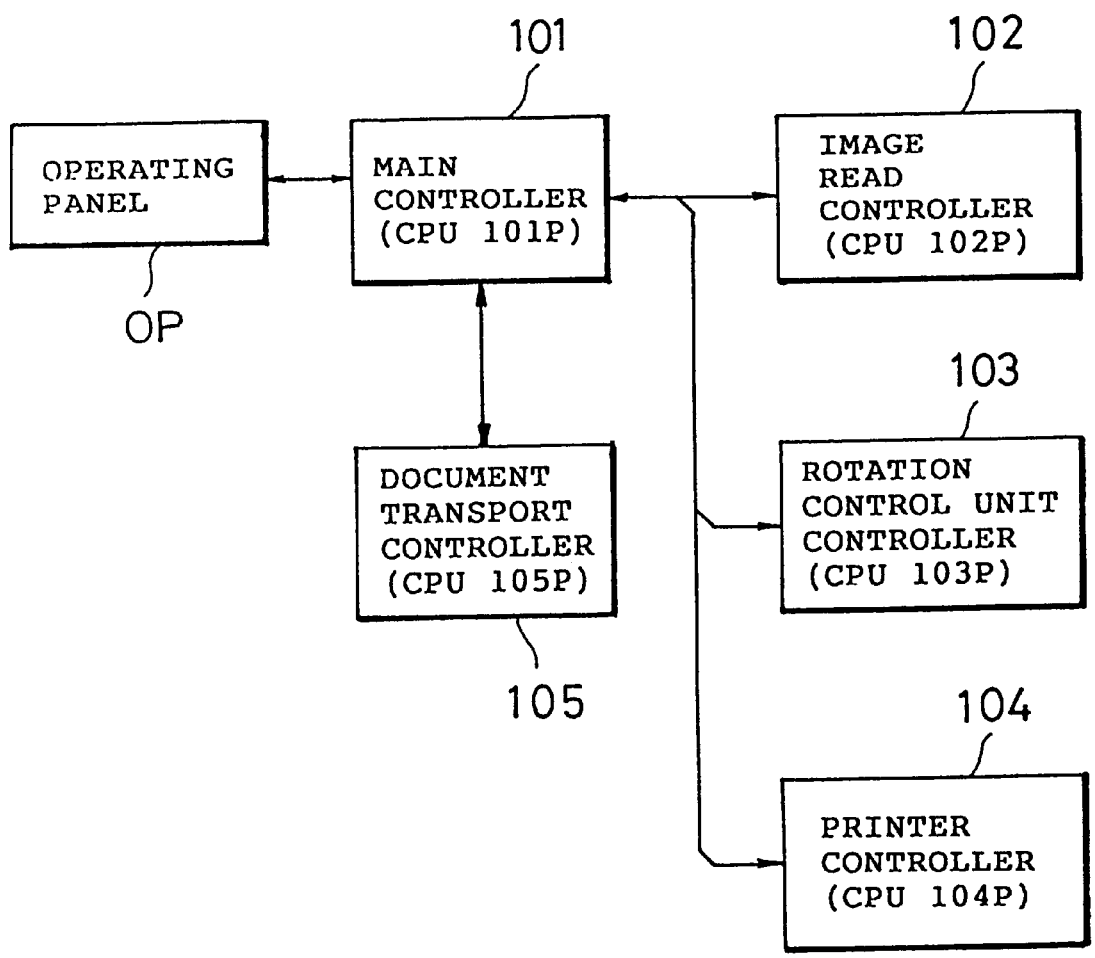
FIG. 2 is a block diagram for explaining the total constitution of a control system.

FIG. 2 is a block diagram for explaining the total constitution of the control system. The control system is constituted by a main controller 101 having CPU 101P, an image read controller 102 having CPU 102P, a rotation control unit controller 103 having CPU 103P, a printer controller 104 having CPU 104P and an operation panel OP, which are connected to the main controller 101.

Figure 3:
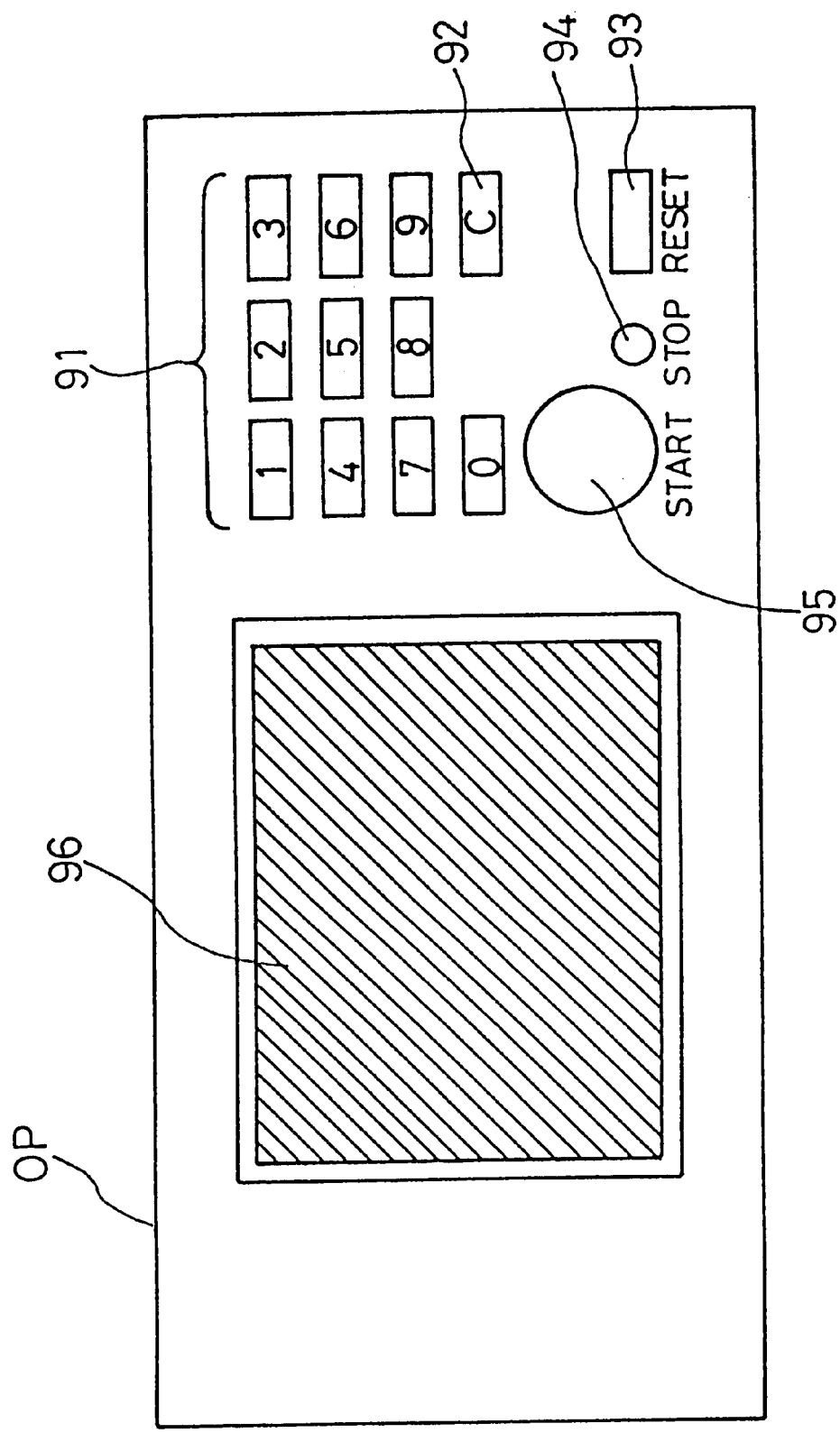
FIG. 3 is a front view of an operation panel.

FIG. 3 is a front view of the operation panel OP. The operation panel is constituted by ten keys 91 for inputting a number of copies etc., a clear key 92, a reset key 93, a stop key 94, a start key 95 for instructing start of copying, a display 96 having a touch panel for displaying setting or copy conditions and states of copier and the like.

Figure 4:
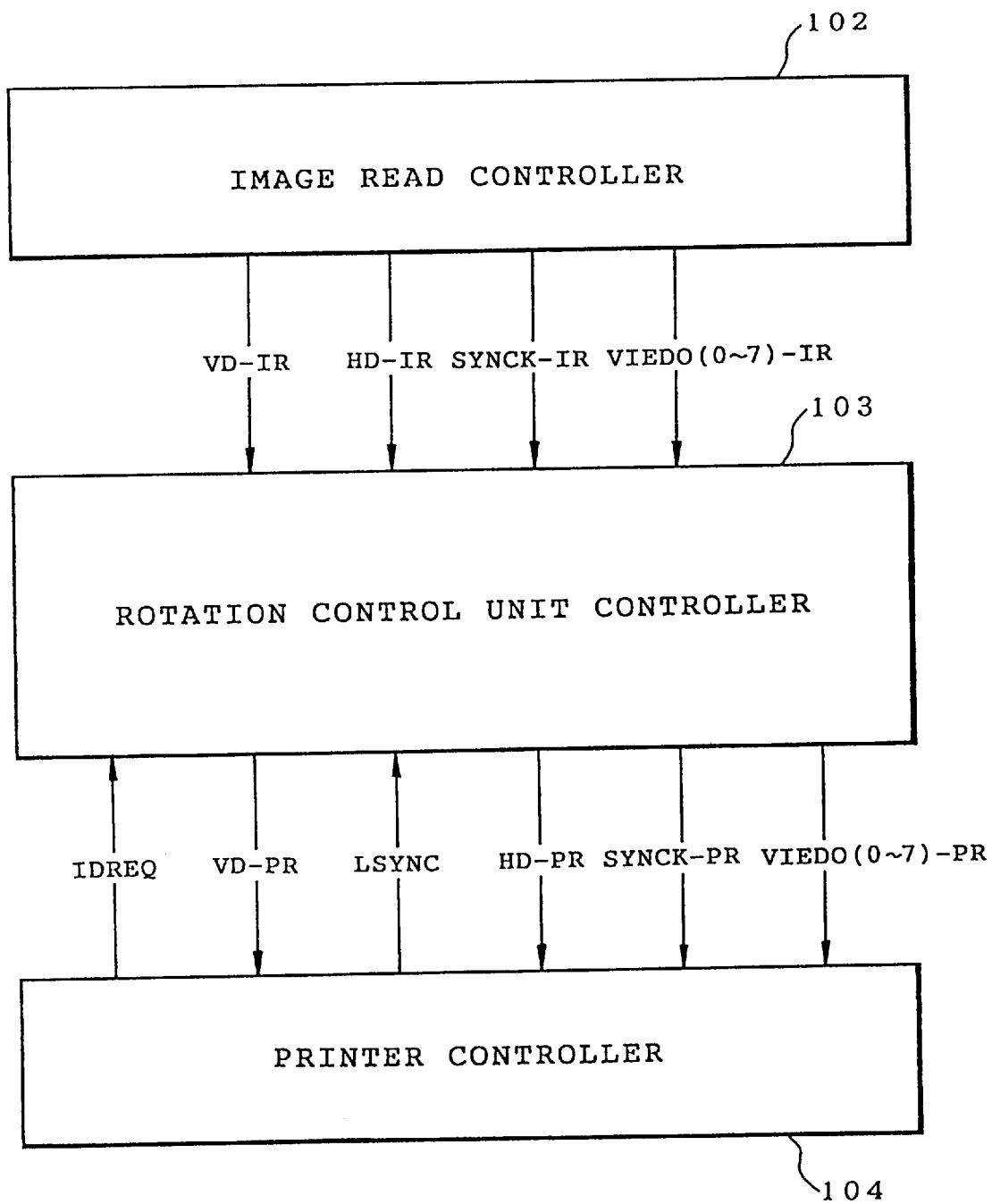
FIG. 4 is a diagram for explaining types of signals transmitted from an image read controller to a rotation control unit controller and types of signals transmitted between the rotation control unit controller and a printer controller.

FIG. 4 shows types of signals outputted from the image read controller 102 to the rotation control unit controller 103 and types of signals exchanged between the rotation control unit controller 103 and the printer controller 104. A page effective area signal VD-IR, a line effective area signal ED-IR, a synchronism signal SYNCK-IR and effective image data (1 pixel, 8 bits) VIDEO (0–7)-IR are outputted from the image read controller 102 to the rotation control unit controller 103. A page data transfer start request signal IDREQ, a page data VD-PR, a 1 line start reference signal LSYNC, line data HD-PR, a synchronism signal SYNCK-PR and effective image data (1 pixel, 8 bits) VIDEO (0–7)-PR are exchanged between the rotation control unit controller 103 and the printer controller 104.

Figure 5:
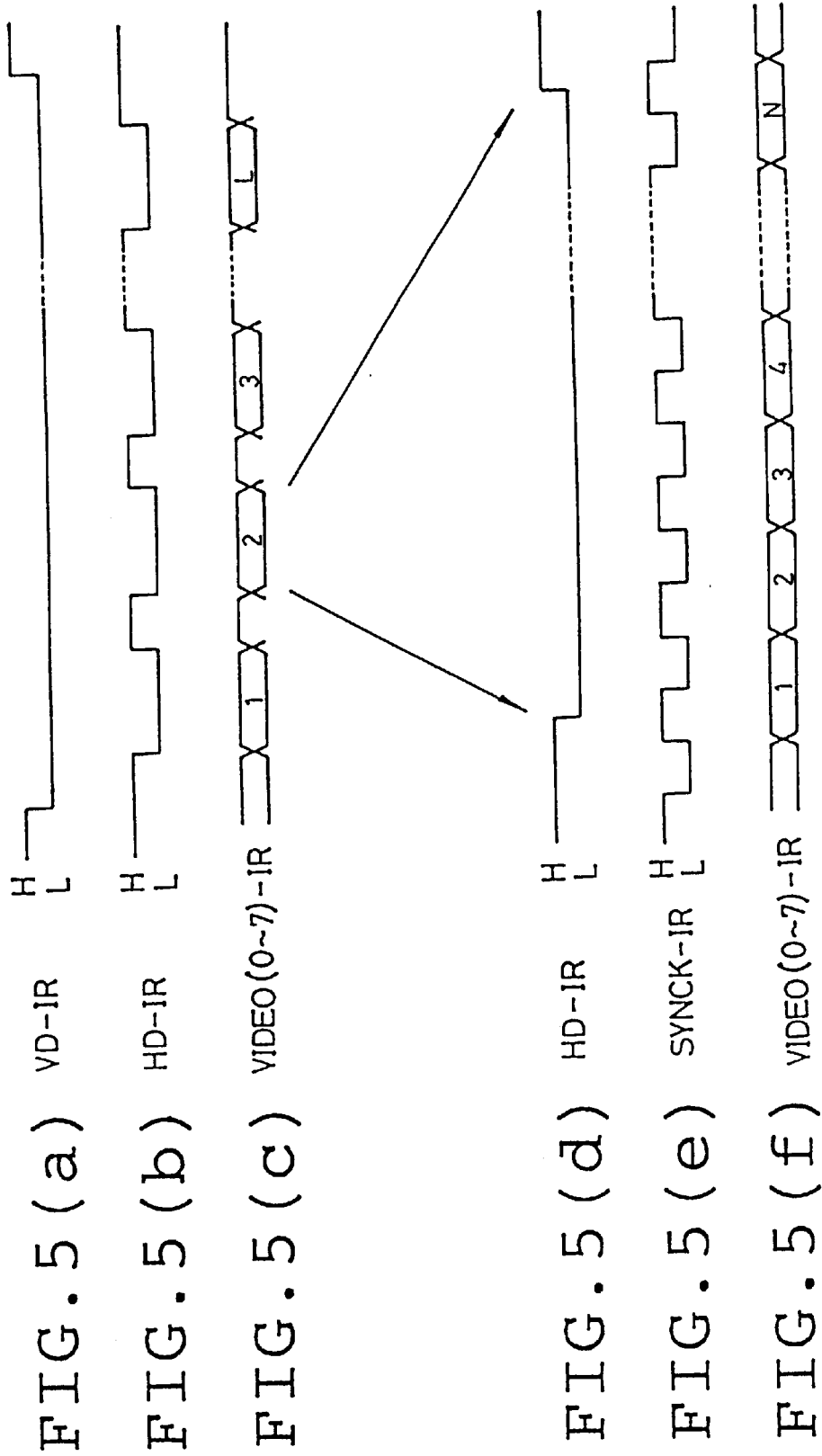
FIG. 5(a) to FIG. 5(f) are diagrams for explaining timing of signals transmitted from the image read controller to the rotation control unit controller.
Figure 6:
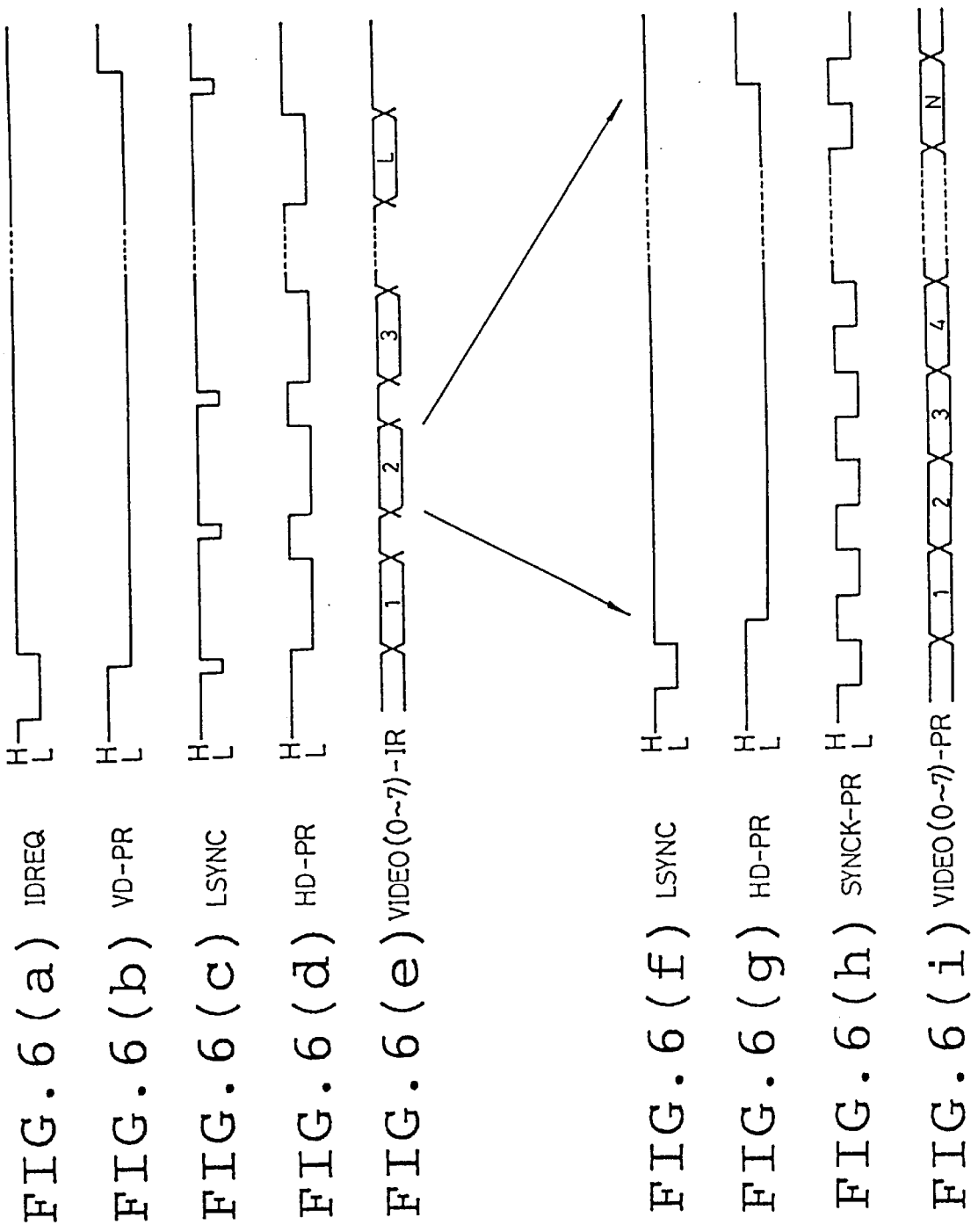
FIG. 6(a) to FIG. 6(i) are diagrams for explaining timing of signals transmitted between the rotation control unit controller and the printer controller.

FIG. 5(a) to FIG. 5(b) illustrate timing charts showing timings of the signals VD-IR, HD-IR, SYNCK-IR and VIDEO (0–7)-IR outputted from the image read controller 102 to the rotation control unit controller 103. The effective image data VIDEO (0–7)-IR are transferred in synchronism with the synchronism signal SYNCK-IR during a time period where the page effective area signal VD-IR and the line effective area signal HD-IR are active, or at "L".

FIG. 6(a) to FIG. 6(i) illustrate timing charts showing timings of the signals IDREQ, VD-PR, LSYNC, HD-PR, SYNCK-PR and VIDEO (0–7)-PR are exchanged between the rotation control unit controller 103 and the printer controller 104. The image signal is transferred from the rotation control unit controller 103 in synchronism with the page data transfer start request signal IDREQ and the 1 line start reference signal LSYNC. The effective image data VIDEO (0–7)-PR is transferred in synchronism with the synchronism signal SYNCK-PR during a time period where both of the page data VD-PR and the line data VD-PR are active, or at "L".

Figure 7:
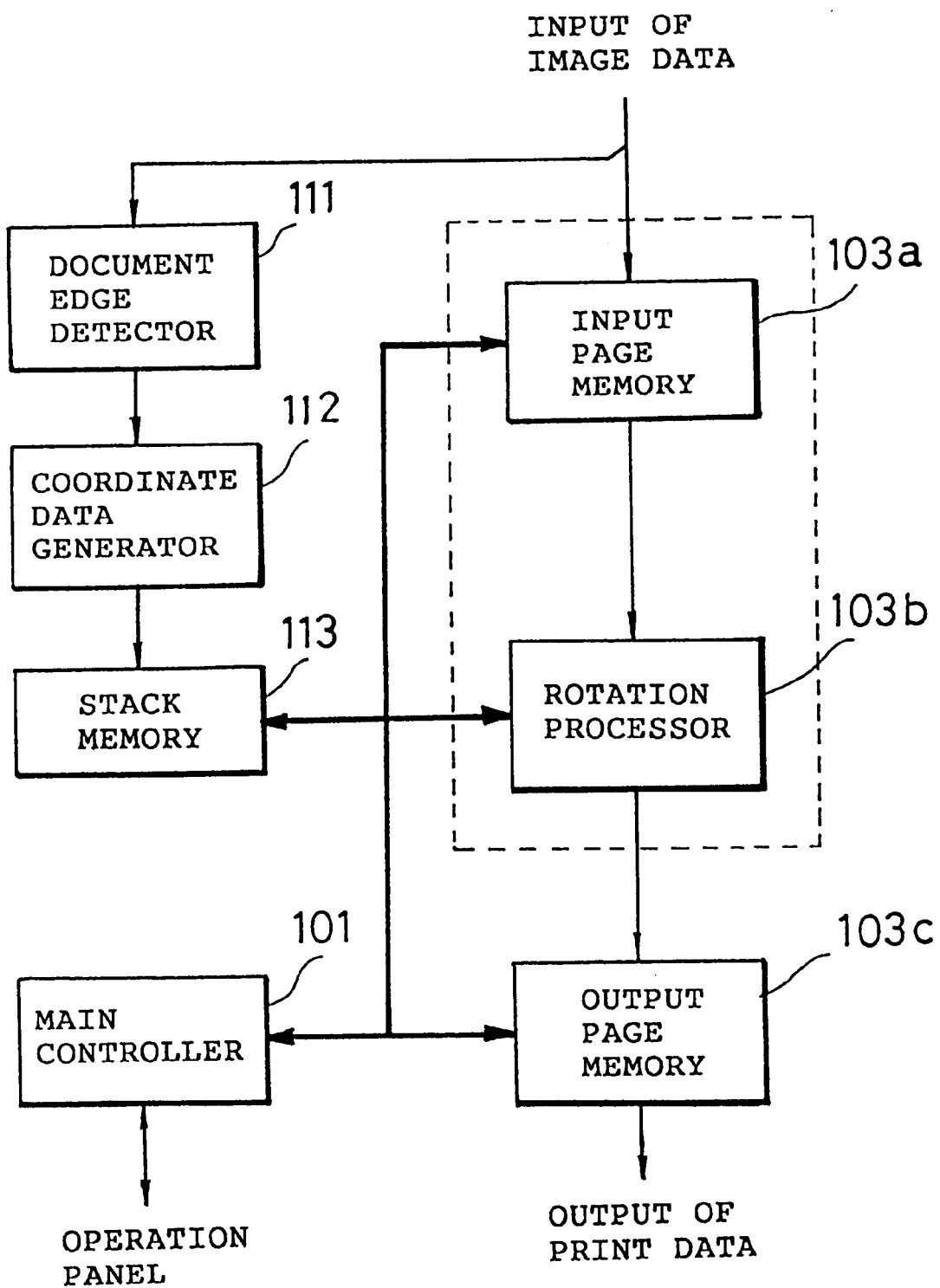
FIG. 7 is a block diagram showing details of the constitution of the rotation control unit controller.

FIG. 7 is a block diagram showing the detailed constitution of the rotation control unit controller 103. The image data transferred from the image read controller 102 is temporarily stored in an input page memory 103a and inputted to a document edge detector 111. The image data inputted to the document edge detector 111 is processed by a coordinate data generator 112 whereby coordinate values of document edge are determined and stored in a stack memory 113.

The image data temporarily stored in the input page memory 103a are organized in 2-dimensional coordinates. A rotation processing unit 103b executes a predetermined rotation processing based on the coordinate values of document edge stored in the stack memory 113 and temporarily stores the results in an output page memory 103c.

Incidentally, the CPU of the main controller 101 executes input and output of image data, setting and processing of commands and the like.

Figure 8:
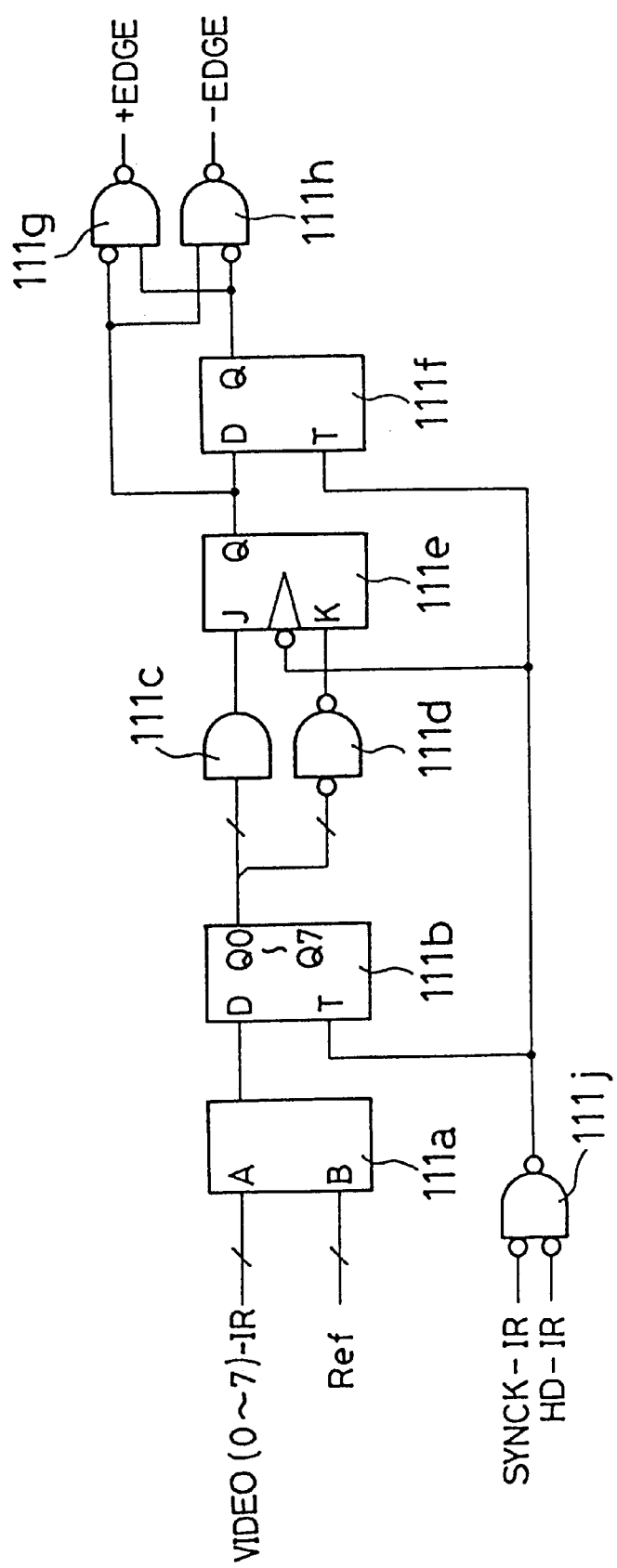
FIG. 8 is a block diagram showing the circuit constitution of a document edge detector.

FIG. 8 is a block diagram showing the circuit layout of the document edge detector 111. The image data VIDEO (0–7)-IR transferred from the image read controller 102 are compared with reference data Ref (background density of document sheet and detected density in a state where nothing remains at the document transfer belt or document base) and are converted into binary data. The presence or absence of the document can firmly be determined by comparing the image data with the reference data.

Noise is eliminated from the converted binary data by a shift resister 111b by a pixel unit of 8 bits. Finally, an edge of the document (+EDGE) indicating a state where the absence of the document is changing to the presence thereof and an edge of the document (−EDGE) indicating a state where the presence of the document is changing to the absence thereof, are detected whereby a detecting signal of 1 shot pulse is outputted. The timings of these operations are controlled by the synchronism signal SYNCK-IR and the line effective area signal HD-IR.

Figure 9:
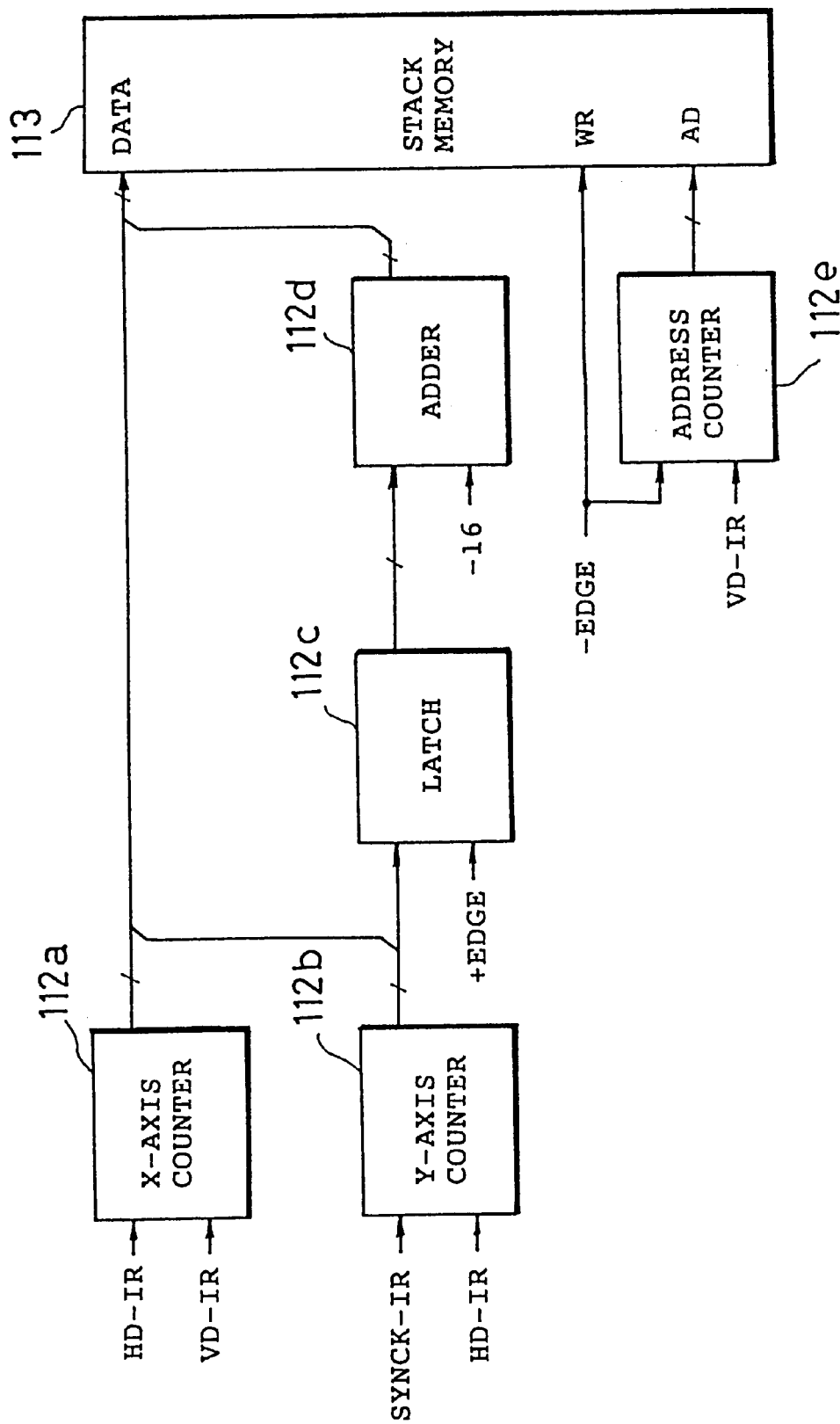
FIG. 9 is a block diagram showing the circuit constitution of a coordinate data generator.

FIG. 9 is a block diagram showing the circuit layout or the coordinate data generator 112. The line effective area signal HD-IR (CLK, clock) and the page effective area signal VD-IR (CLEAR, clear) are inputted to a X-axis counter 112a whereby a X-axis coordinate signal in the sub-scanning direction is generated.

Further, the synchronism signal SYNCK-IR (CLK, clock) and the line effective area signal HD-IR (CLEAR, clear) are inputted to a Y-axis counter 112b whereby a Y-axis coordinate signal in the main scanning direction is generated.

The Y-axis coordinate signal in the main scanning direction is once latched by a latch 112c by +EDGE signal and thereafter a constant 16 is subtracted therefrom by an adder 112d.

The −EDGE signal (CLK, clock) and the page effective area signal VD-IR (CLEAR, clear) are inputted to an address counter 112e whereby an address signal is generated. By making the −EDGE signal a write instructing signal the X-coordinate signal in the sub-scanning direction and the Y-axis coordinate signal outputted form the adder 112d are stored to the stack memory 113 at addresses indicated by the address signal.

The addresses are successively updated by the −EDGE signal and are cleared by the page effective area signal VD-IR.

FIG. 10 is a block diagram showing details of the rotation processor 103b where the rotation of image is executed by an affin transformation unit 103s. The affin transformation is a method of the geometrical transformation between coordinates where data (image data) of the x-y coordinate system is transformed into the u-v coordinate system in which transformation such as parallel displacement, enlargement, reduction, rotation or the like is performed and which is generally represented by the following equation (1).

$$\begin{bmatrix} u \\ v \end{bmatrix} = \begin{bmatrix} a_0 \\ b_0 \end{bmatrix} + \begin{bmatrix} a_1 & a_2 \\ b_1 & b_2 \end{bmatrix} \begin{bmatrix} x \\ y \end{bmatrix} \qquad (1)$$

Figure 11A:
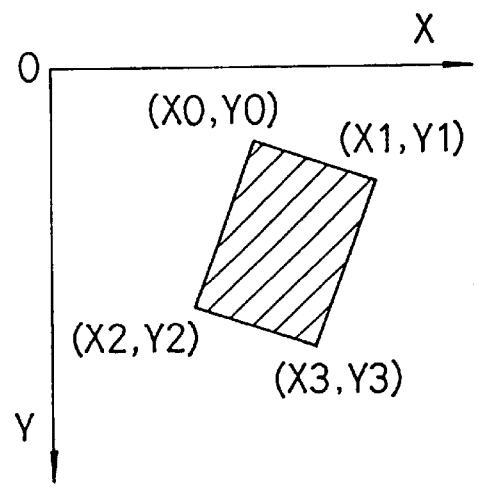
FIG. 11(a), FIG. 11(b) and FIG. 11(c) are diagrams for explaining relations between image areas and coordinate systems.
Figure 11B:
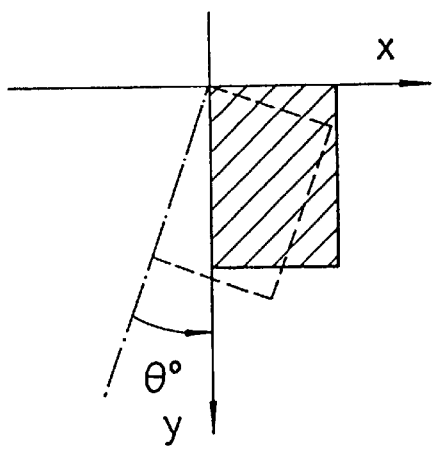
Figure 11C:
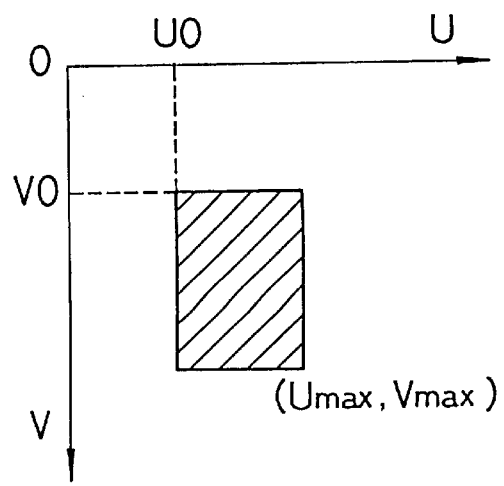

According to this embodiment the parallel displacement and rotation of image are conducted. Firstly, coordinates of 4 points at 4 corners of an image processing area in the input page memory 103a, are set by the x-y coordinate system. Coordinates of the origin of rotation coordinates in rotating the image are indicated by the x-y coordinate system and the image is rotated by specifying a rotational angle θ. Next, after editing is performed, the origin of the rotation coordinates of the rotated image is assigned by the u-v coordinate system. FIG. 11(a) is a diagram for explaining the setting of the image processing area in the x-y coordinate system, FIG. 11(b) is a diagram for explaining the rotation of the image and FIG. 11(c) is a diagram for explaining the editing operation.

The processing can be represented by the following equation (2).

$$\begin{bmatrix} u \\ v \end{bmatrix} = \begin{bmatrix} u_0 \\ v_0 \end{bmatrix} + \begin{bmatrix} \cos\theta & -\sin\theta \\ \sin\theta & \cos\theta \end{bmatrix} \begin{bmatrix} X - X_0 \\ Y - Y_0 \end{bmatrix} \quad (2)$$

The origin of rotated image (origin of rotation coordinates) in the u-v coordinate system may be represented by coordinate values (U0, V0) and the maximum value of new image which has been rotated and edited (most remote point from origin) can be represented by coordinate values(Umax, Vmax).

The coordinates (U, V) which have been subjected to the affin transformation, are not ordinarily provided with integers and therefore, the density of the new edited image is interpolated by using a density data f (Xn, Yn) of the original image by a density interpolating unit 103*t* (refer to FIG. 10). As the method of interpolation, there has been suggested the approximation method, the linear interpolation method, the three-dimensional spline interpolation method and the like. However, the detailed explanation thereof will be omitted.

The interpolated image data are stored along with the density data f (U,V) to the outputted page memory 103*c* in accordance with the two-dimensional u-v coordinates and are outputted in accordance with print timings by a unit of line.

FIG. 12 is a diagram showing input and output signals at the output page memory 103*c* such as setting of paper size, setting of erasure area, and permission of outputting image signal etc. FIG. 13(*a*) is a diagram showing the setting of paper size where a rectangular area having a diagonal line passing through the paper size coordinates (U0, V0) and (Up, Vp) is designated as the image data outputting area. Further, FIG. 13(*b*) is a diagram for explaining erasure of the image data outputting area where a rectangular area having a diagonal line constituted by coordinates (Ue0, Ve0) and (Ue1, Ve1) of an erasure area is designated as the erasure area which remains white in printing. Incidentally, according to the U-V coordinates the V-axis direction is the main scanning direction and the U-axis direction is the sub-scanning direction.

(Operation of Control System)

There are normal mode, plural sheets document mode and book mode as operational modes of the copier. These operational modes are designated by the touch panel of the operational panel OP. An explanation will be given later of designating the operational modes.

Figure 14:
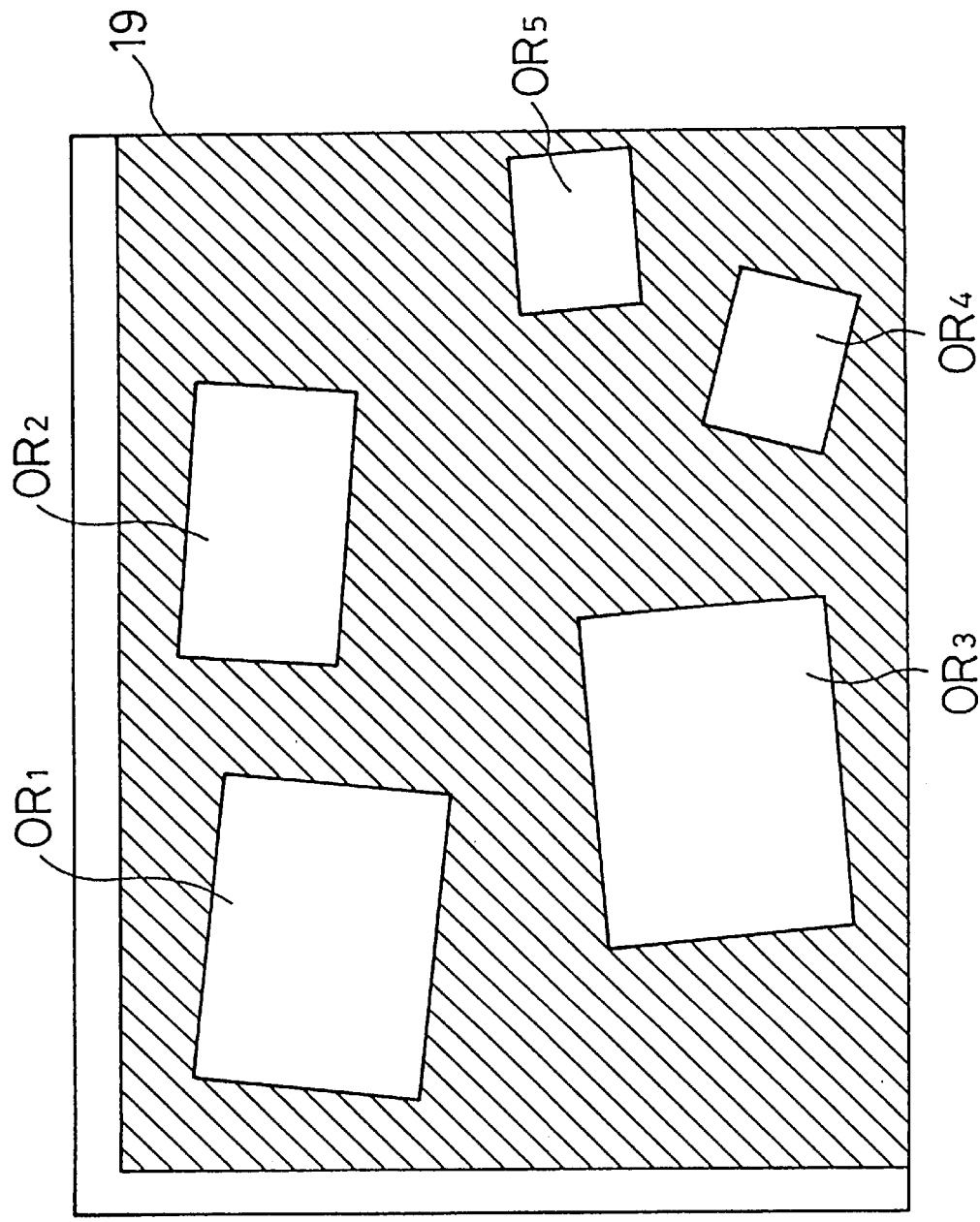
FIG. 14 is a diagram for explaining positions of a plurality of sheets of document on a document base.

Firstly, an explanation will be given of a case where the plural sheets document mode is designated. FIG. 14 is a view showing a state where the plural sheets document mode is designated by operating the touch panel 96 of the operation panel and a plurality of sheets of document OR1 through OR5 (white portions) are fed onto the document base 19.

Figure 15:
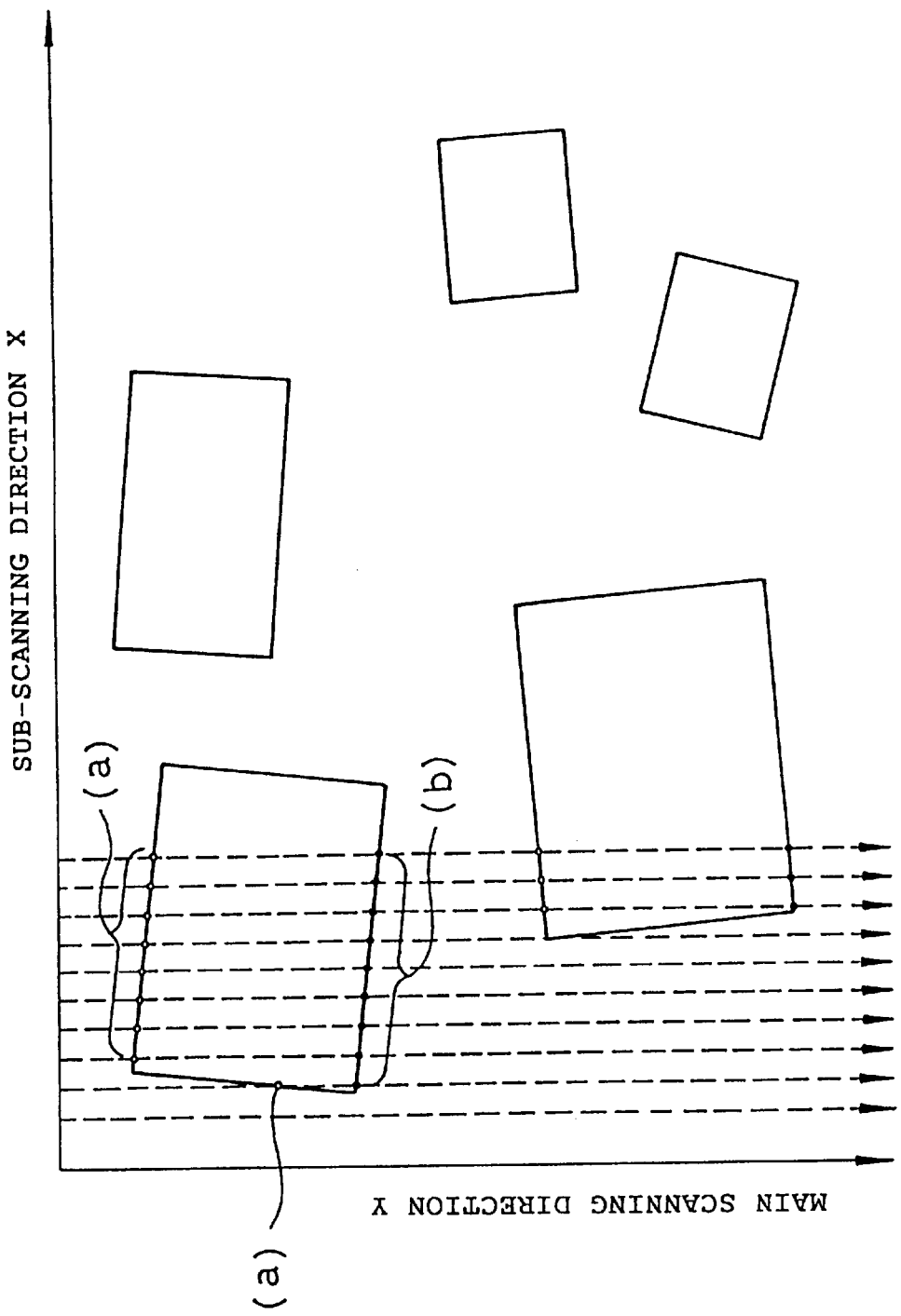
FIG. 15 is a diagram for explaining scanning of document and detection of document edge.

FIG. 15 is a diagram for explaining scanning of document on the document base as illustrated by FIG. 14 in which a scanner scans the plurality of sheets of document OR in Y direction (main scanning direction) while moving in X direction (sub-scanning direction). Image signals are outputted by a unit of line and are stored to the input page memory 103*a*.

Document edge is simultaneously detected. That is, as illustrated by FIG. 15, with respect to each scanning line a white point "a" where the document OR is detected, is detected as +EDGE and a black point "b" where separation from the document OR is detected, is detected as −EDGE. A scanning line number (Xn), a count value (YWm) of +EDGE corresponding to a distance from the start point of the scanning line to the white point "a" and a count value (YBm) of −EDGE corresponding to a distance from the start point of the scanning line to the black point "b" are stored in the stack memory 113 as a set of document edge detecting signals and the set of document edge detecting signals for each scanning line is successively stared to the stack memory 113.

As explained above, the rotation control unit controller 103 determines the coordinates of four points of the four corners of the document area based on the set of the document edge detecting signals for each scanning line stored in the stack memory 113 and carries out the image rotation and the editing operation.

Figure 16:
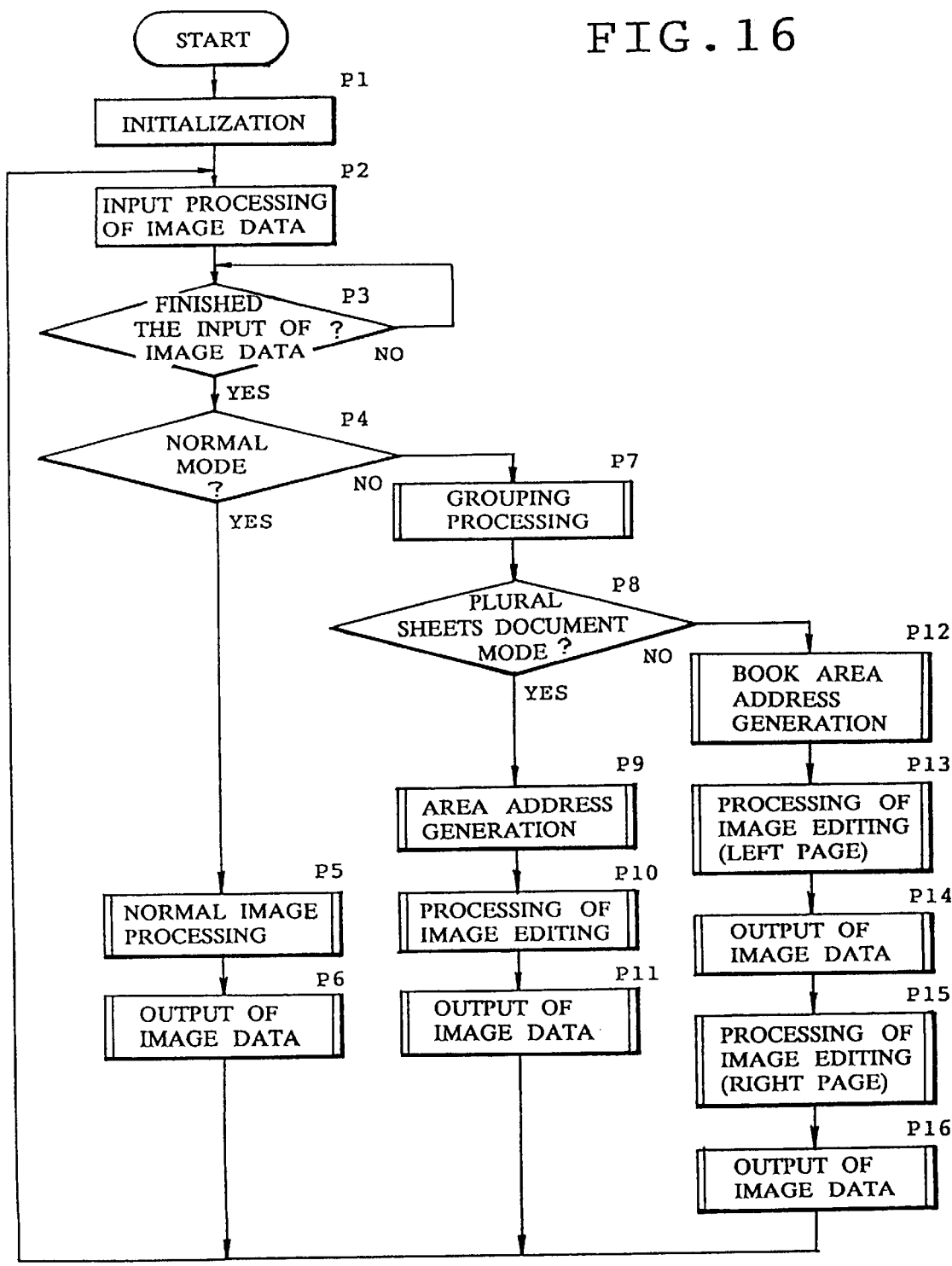
FIG. 16 is a flowchart for explaining the outline of image processing in accordance with operational modes of a copier.

FIG. 16 is a flowchart for explaining the outline of image processing in accordance with the operational modes of the copier. Firstly, initializing is conducted (step P1), input processing of image data is started and finishing of processing is awaited (steps P2, P3). When the inputting of image data has been finished, whether the document mode is the normal mode is determined (step P4) and if the document mode is the normal mode, normal image processing is conducted and image data is outputted thereby finishing the processing (steps P5, P6) and the operation returns to step P2.

When the operational mode is not the normal mode according to the determination the step P4, the document mode is the plural sheets document mode or the book mode and accordingly, grouping is conducted (step P7). A detailed explanation will be given later with regard thereto. Next, whether the document mode is the plural sheets document mode or the book mode is determined (step P8) and if the document node is the plural sheets document mode, processing of area address generation of the document, processing of image editing and outputting image data are carried out (steps P9, P10 and P11) and the operation returns to step P2.

Further, when the document mode is the book mode according to the determination at step P8, processing of book area address generation, processing of editing the image of left page of a book and outputting image data are carried out (steps P12, P13 and P14) and further, processing of editing the image of right page of the book and outputting image data are carried out (steps P15, P16) and the operation returns to step P2.

Figure 17:
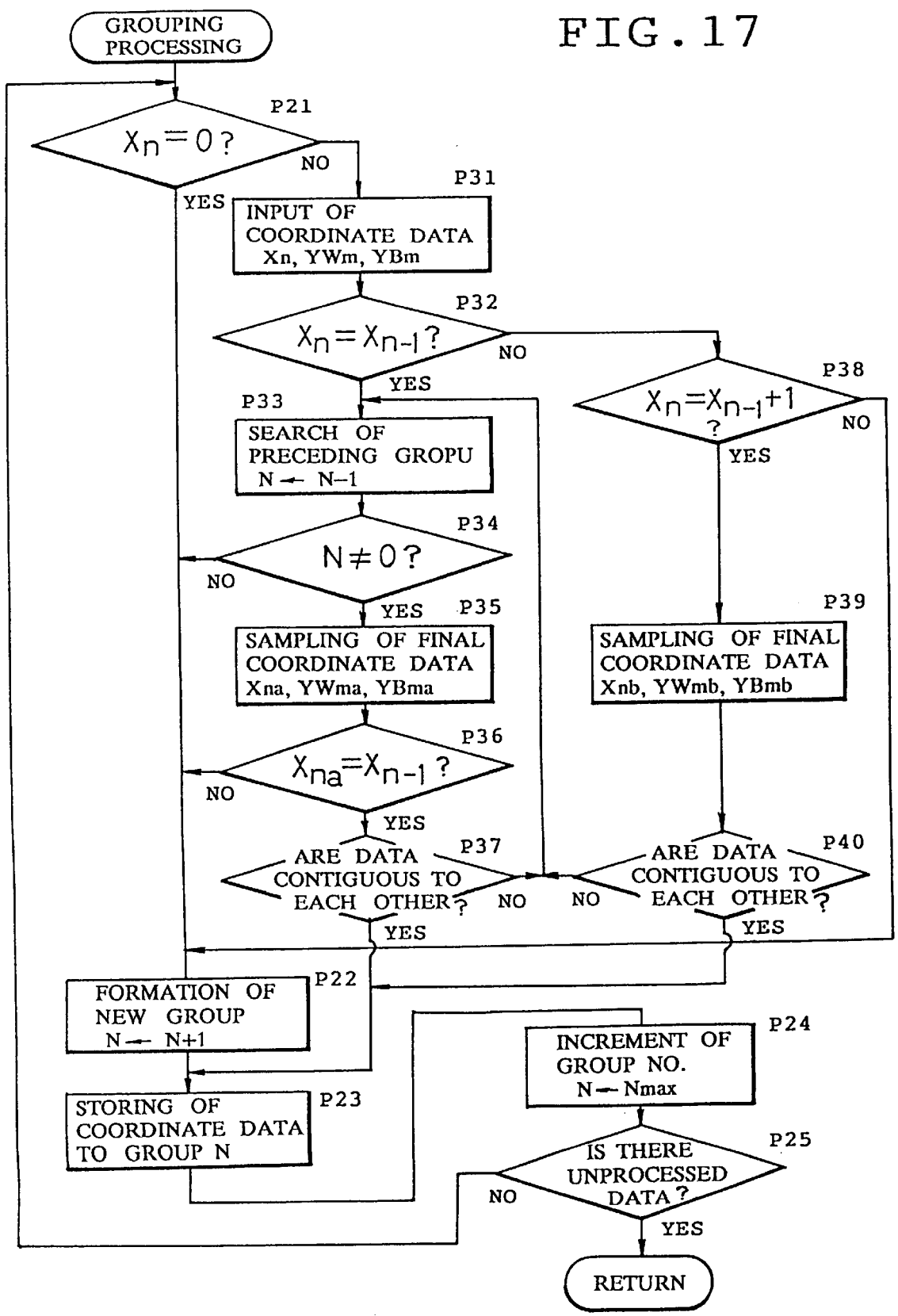
FIG. 17 is a flowchart for explaining details of grouping processing.

FIG. 17 is a flowchart showing details of the grouping operation which has been illustrated as step P7 in the flowchart of FIG. 16. The scanning line number Xn is investigated and whether the scanning line number is the scanning line number Xn=0 indicating the first scanning line is determined (step P21). If Xn=0, a new group N is formed (N←N+1) and the coordinate data are stored to the formed group N (steps P22, P23). The group number N is incremented to a newest group number Nmax and the presence or absence of unprocessed data is determined (steps P24, P25). When there are unprocessed data, the operation returns to step P21 and successive processings are carried out and when there are no unprocessed data, the operation returns to the main routine.

When Xn≠0according to the determination at step P21, the coordinate data of the scanning line number Xn is inputted (step P31) and whether data are the same as the data of the preceding scanning line ($X_{n-1}$) is determined (step P32). If the data are the same as the data of the preceding scanning line, a preceding group (N-1) is searched (steps P33, P34), the final coordinate data in the group are sampled and the operation confirms that the scanning line of the sampled data is the preceding scanning line (steps P35, P36).

The coordinate data of the inputted scanning line (Xn) are compared with the coordinate data of the preceding scanning line ($X_{n-1}$) and whether these data are contiguous to each other is determined (step P37). According to this determination these data are determined to be contiguous to each other when the count value (YWm) of +EDGE of the scanning line (Xn) is larger than the count value (YBma) of −EDGE of the preceding scanning line ($X_{n-1}$) or when the count value (YBm) of −EDGE of the scanning line (Xn) is smaller than the count value (YWma) of +EDGE of the preceding scanning line ($X_{n-1}$). When these are contiguous data, the operation proceeds to the processings at step P23 and thereafter. If these are not the contiguous data, the operation returns to step P33.

When the inputted coordinate data are not the coordinate data of the preceding scanning line according to the determination at step P32, whether the data are data of a scanning line formed by incrementing by 1 to (contiguous to) the preceding scanning line ($X_{n-1}$) is determined (step P38) and if the answer is yes, the final coordinate data in the group are sampled and whether the data are the contiguous data is determined (steps P39, P40). According to this determination these data are determined to be contiguous to each other when the count value (YWm) of +EDGE of the scanning line (Xn) is larger than the count value (YBmb) of −EDGE of the scanning line formed by incrementing by 1 to the preceding scanning line ($X_{n-1}$) or when the count value (YBm) of −EDGE of the scanning line (Xn) is smaller than the count value (YWmb) of +EDGE of the scanning line formed by incrementing by 1 to the preceding scanning line ($X_{n-1}$). If these are contiguous data, the operation proceeds to the processings at step P23 and thereafter. Further, if these are not the contiguous data, the operation returns to step P33.

The coordinate data can be classified for each group N by these processings. The group number N corresponds to the number of sheets Nmax of the document placed on the document base and therefore, the coordinate of edge is classified for each of the sheets of document.

Figure 18:
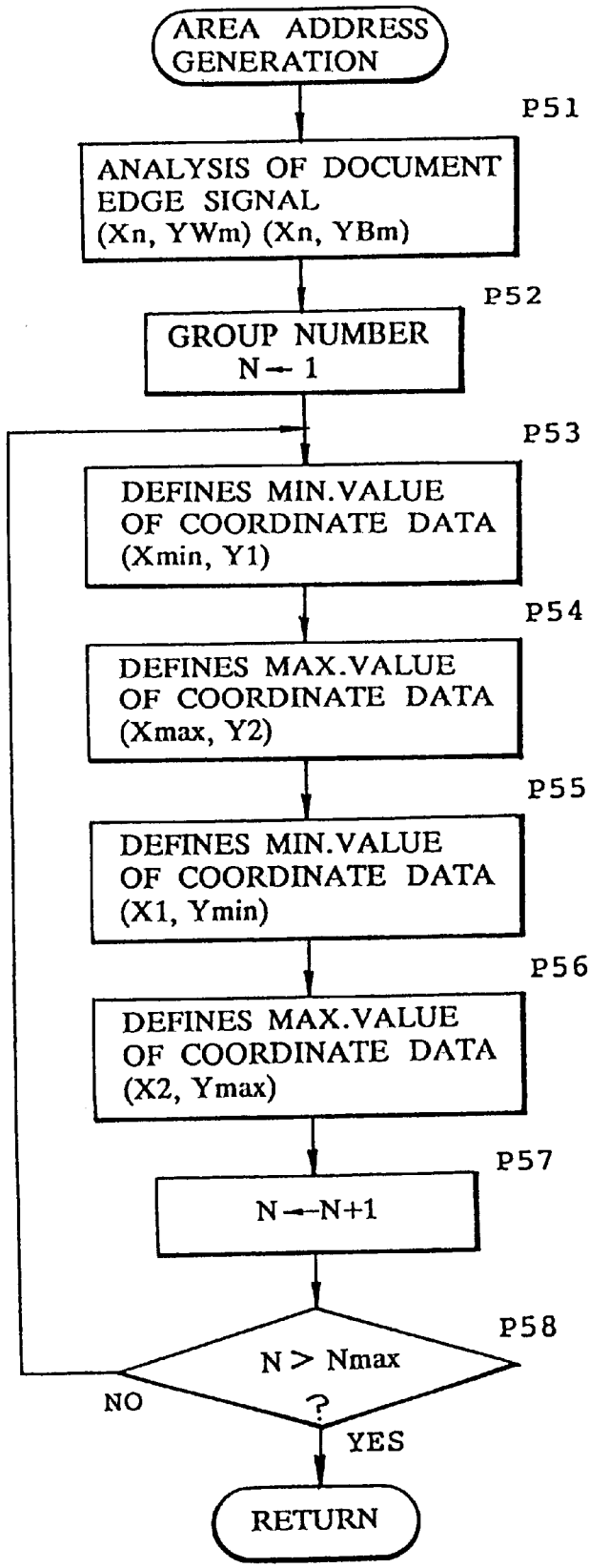
FIG. 18 is a flowchart for explaining details of area address generation processing.

FIG. 18 is a flowchart showing details of the processing of area address generation which defines the document area in the case of the plural sheets document mode, which is designated as step P9 in the flowchart of FIG. 16. Firstly, the document edge detecting signals stored in the stack memory 113 are analyzed and determined a scanning line number (Xn) and a count value (YWm) of +EDGE, and the scanning line number (Xn) and a count value (YBm) of −EDGE, and 1 is substituted for the group number N (steps P51, P52).

Next, coordinate data (Xmin, Y1) having a minimum value in respect of the X-coordinate in the group, coordinate data (Xmax, Y2) having a maximum value in respect of X-coordinate, coordinate data (X1, Ymin) having a minimum value in respect of Y-coordinate and coordinate data (X2, Ymax) having a maximum value in respect of Y-coordinate are defined (steps P53 through P56). Group number N is incremented, the processings are repeated and the defining operation is conducted with respect to all the groups (N=1 to Nmax) (steps P57, P58) and the operation returns the main routine.

Figure 19A:
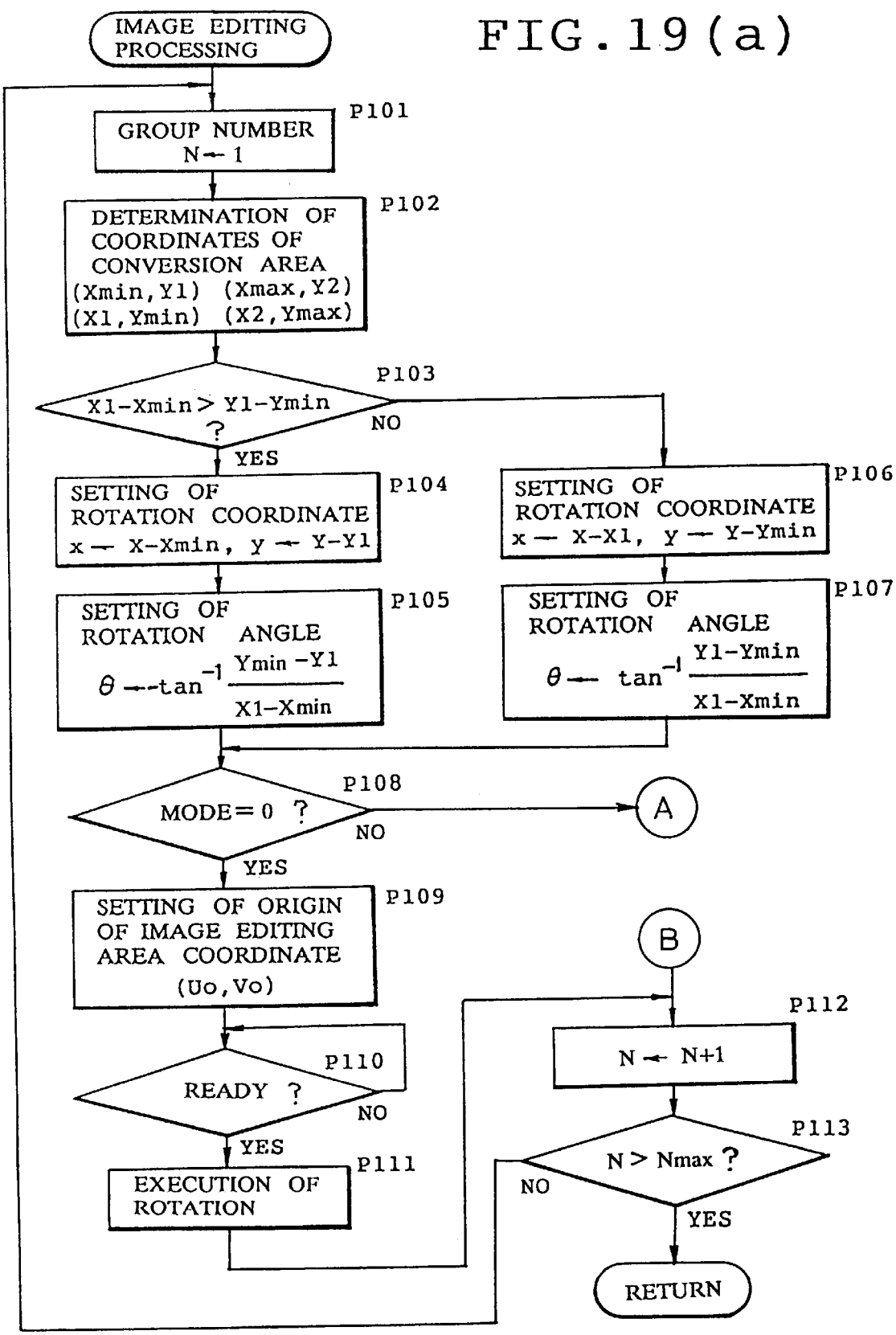
FIG. 19(a) and FIG. 19(b) are flowcharts for explaining details of image rotation and editing processing.
Figure 19B:
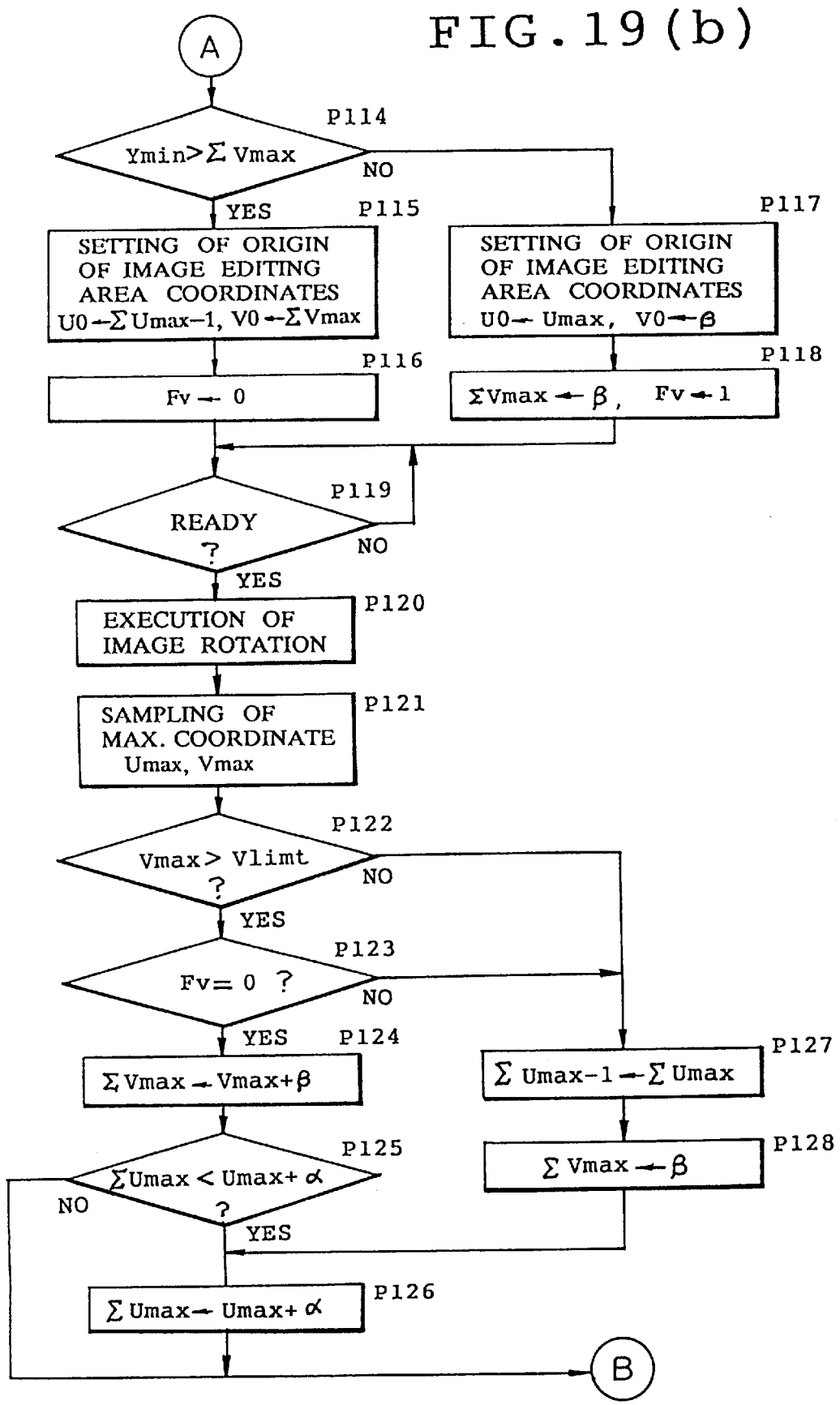

FIGS. 19(a) and 19(b) illustrate a flowchart showing details of image editing processing in the case of the plural sheets document mode which is designated as step P10 in the flowchart of FIG. 16. Firstly, 1 is substituted for group number N and the document areas which are determined by the processing of area address generation (Xmin, Y1), (Xmax, Y2), (X1, Ymin), (X2, Ymax) are determined as coordinates of a conversion area (steps P101, P102). Next, specific two distances between coordinates are compared whereby the direction of the inclination of the document is determined (step P103) and the coordinates are converted into the rotation coordinates and the rotational angle θ is determined (steps P104 through P107).

That is, when the two distances between coordinates are specified as X1−Xmin>Y1−Ymin, the origin and the rotational angle θ of the rotation coordinates (x, y) are set as follows (steps P104, P105). The rotational direction is the clockwise direction.

x←X−Xmin
y←Y−Y1
θ←−$\tan^{-1}${(Ymin−Y1)/(X1−Xmin)}

When the two distances between coordinates are specified as X1−Xmin≦Y1−Ymin, the origin and the rotational angle θ of the rotation coordinates (x, y) are set as follows (steps P106, P107). The rotational direction is the anti-clockwise direction.

x←X−X1
y←Y−Ymin
θ←$\tan^{-1}${(Y1−Ymin)/(X1−Xmin)}

By following the above-described conditions the position at the surrounding of the document and the position of the reference coordinates are unified by a small correction angle of 45° or less.

Now, the operation proceeds to image editing. Firstly, the mode of image editing is investigated (step P108). "mode 0" is a mode in which the origin of image editing is constituted by the origin of the rotation coordinates and only the inclination of each document image is corrected and "mode 1" is a mode in which respective inclinations of a plurality of document images are corrected and thereafter the plurality of document images are edited by parallely moving them to optimum positions.

When the mode is "mode 0" according to the determination at step P108, the origin (U0, V0) of the rotation coordinates are determined as the coordinates of the origin of the image editing (step P109), the image rotation processing is executed after awaiting for the finishing of standing ready (steps P110, P111), incrementing the group number N, and the termination of processing with respect to all the groups is determined (steps P112, P113). The operation returns to the main routine when the processing of all groups is finished.

When the operation mode is not the mode 0 according to the determination at step P108, the operation mode is the mode 1. In this case coordinates (α, β) of the origin of image editing are determined with respect to the image of the group number N=1. Incidentally, the values of α and β are previously inputted from the operation panel (or dip switch). it is intended with regards thereto to refer to an explanation of a display having a touch panel of the operation panel, mentioned later.

Next, a coordinate of the origin of editing area for a succeeding document image is specified as displaced at an interval of β in respect of the V-axis direction from the maximum value (Umax, Vmax) of the coordinate value of the editing area of the document image and a coordinate of the origin of editing area of the succeeding document image is specified as displaced at an interval of α in respect of the U-axis direction. By this processing the respective images can be arranged regularly without overlapping the plurality of document images (refer to FIG. 26).

The flowchart illustrated by FIG. 19(b) shows the processing in the case of the mode 1. When the operational mode is not the mode 0 according to the determination at step P108 (refer to FIG. 19(a)), the operation proceeds to step P114. Whether the minimum value Ymin in the Y-axis direction of the inputted image is larger than a total sum of EVmax of the coordinate value in the V-axis direction of the already specified editing area of the document image, is determined (step P114), when Ymin>EVmax, the image is arranged in the V-axis direction without changing the alignment reference (U-axis direction), the coordinate U0 of the editing origin in the U-axis direction is set to the total sum EUmax-1 of the coordinate value of the editing area in the U-axis direction, the coordinate V0 of the editing origin in the V-axis direction is set to the total sum EVmax of the coordinate value in the V-axis direction and a flag Fv is set to 0 (steps P115, P116).

Further, when Ymin≦EVmax, the image is arranged in the U-axis direction by changing the alignment reference (U-axis direction), the coordinate U0 of the editing origin in the U-axis direction is set to the total sum EUmax of the coordinate value of the editing area in the U-axis direction, the coordinate V0 of the editing origin in the V-axis direction is set to β and β is put into the total sum EVmax of the coordinate value in the V-axis direction and the flag Fv is set to 1 (steps P117, P118). The rotation processing is executed after awaiting for the finishing of standing ready (steps P119, P120) and the maximum values Umax and Vmax of the coordinate values of the editing area are sampled (step P121).

Whether the maximum value Vmax of the coordinate in the V-axis direction of the editing area exceeds a predetermined limit value Vlimt, is determined (step P122) and when V-max>Vlimt, whether the flag is specified as Fv=0 is determined (step P123). If the flag Fv =0, the (Vmax+β) is substituted for the total sum EVmax of the coordinate value in the V-axis direction (step P124) and whether the total sum EUmax of the coordinate values in the U-axis direction is specified by (EUmax<EUmax+α), is determined (step P125). When the total sum EUmax of the coordinate value in the U-axis direction is smaller than EUmax+α, EUmax+α is substituted for EUmax (step P126) and the operation proceeds to the processings at step P112 and thereafter.

When the determination at step P122 and the determination at step P123 are negative, EUmax is substituted for the total sum EUmax-1 of the coordinate value of the editing area in the U-axis direction, β is substituted for the total sum EVmax of the coordinate value in the V-axis direction (steps P127, P128) and the operation proceeds to the processings at step 126 and thereafter.

Figure 20:
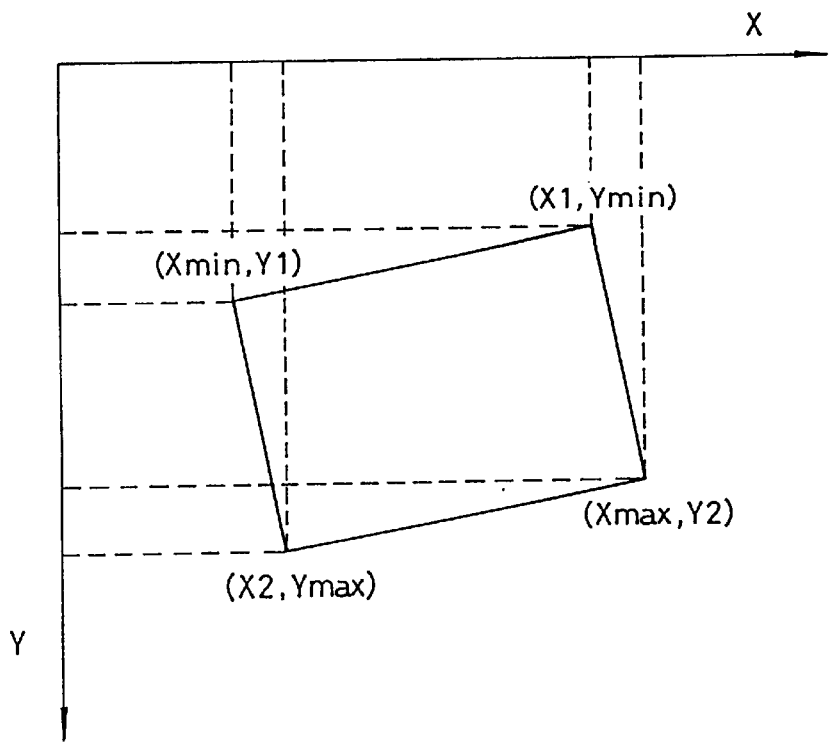
FIG. 20 is a diagram for explaining an address of a document area.
Figure 21:
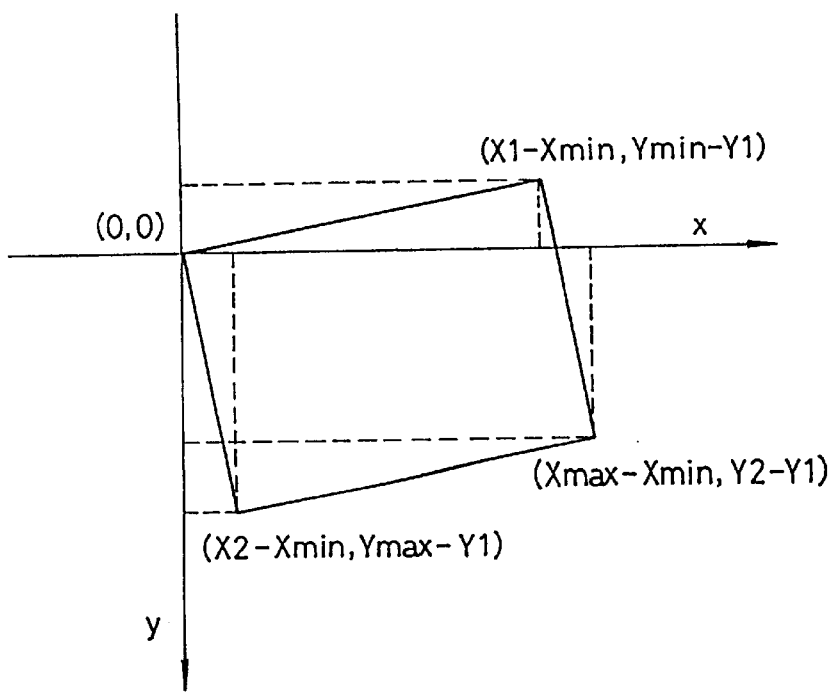
FIG. 21 is a diagram for explaining the address of the document area according to a new coordinate system.

FIG. 20 indicates the document area determined by the processing of area address generation in the case of X1−Xmin>Y1−Ymin in respect of two distances between coordinates and FIG. 21 indicates the document area illustrated in FIG. 20 by new coordinates according to the above-described rotation coordinate conversion processing.

Figure 22:
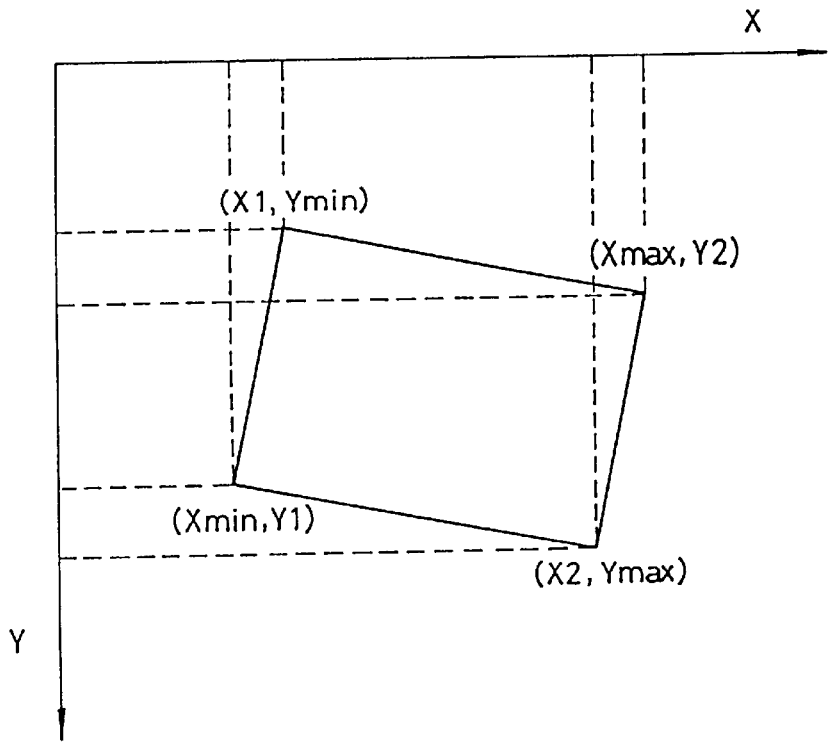
FIG. 22 is a diagram for explaining an address of a document area.
Figure 23:
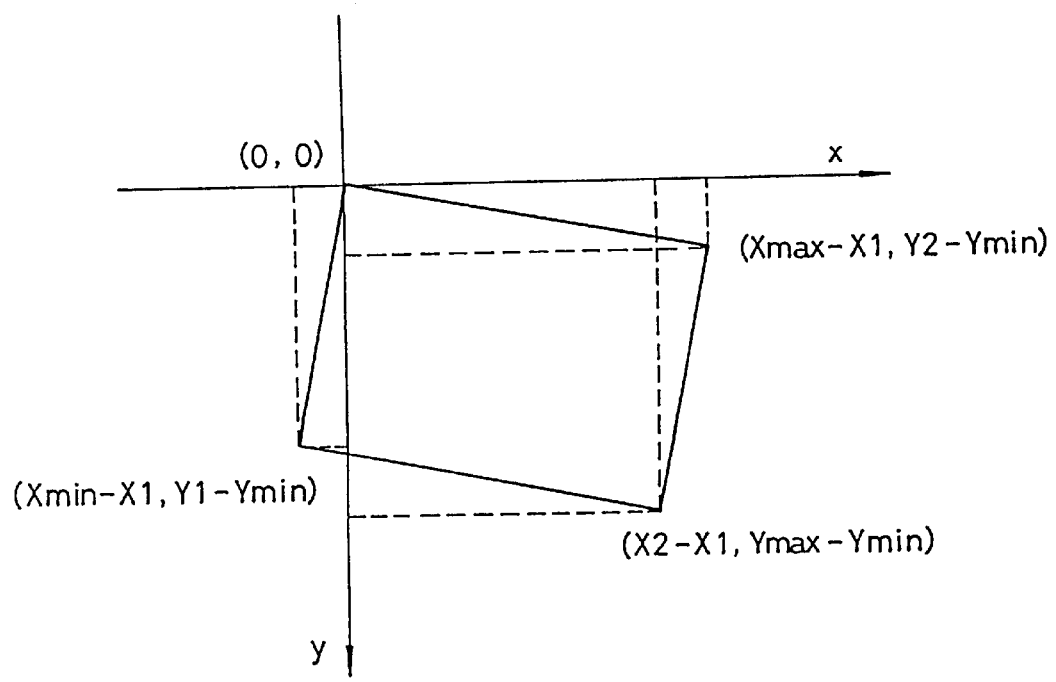
FIG. 23 is a diagram for explaining the address of the document area according to a new coordinate system.

FIG. 22 indicates the document area determined by processing of area address generation in the case where X1−Xmin≦Y1−Ymin in respect of two distances between coordinates and FIG. 23 indicates the document area illustrated by FIG. 22 by new coordinates according to the above-described rotation coordinate conversion processing.

Figure 24:
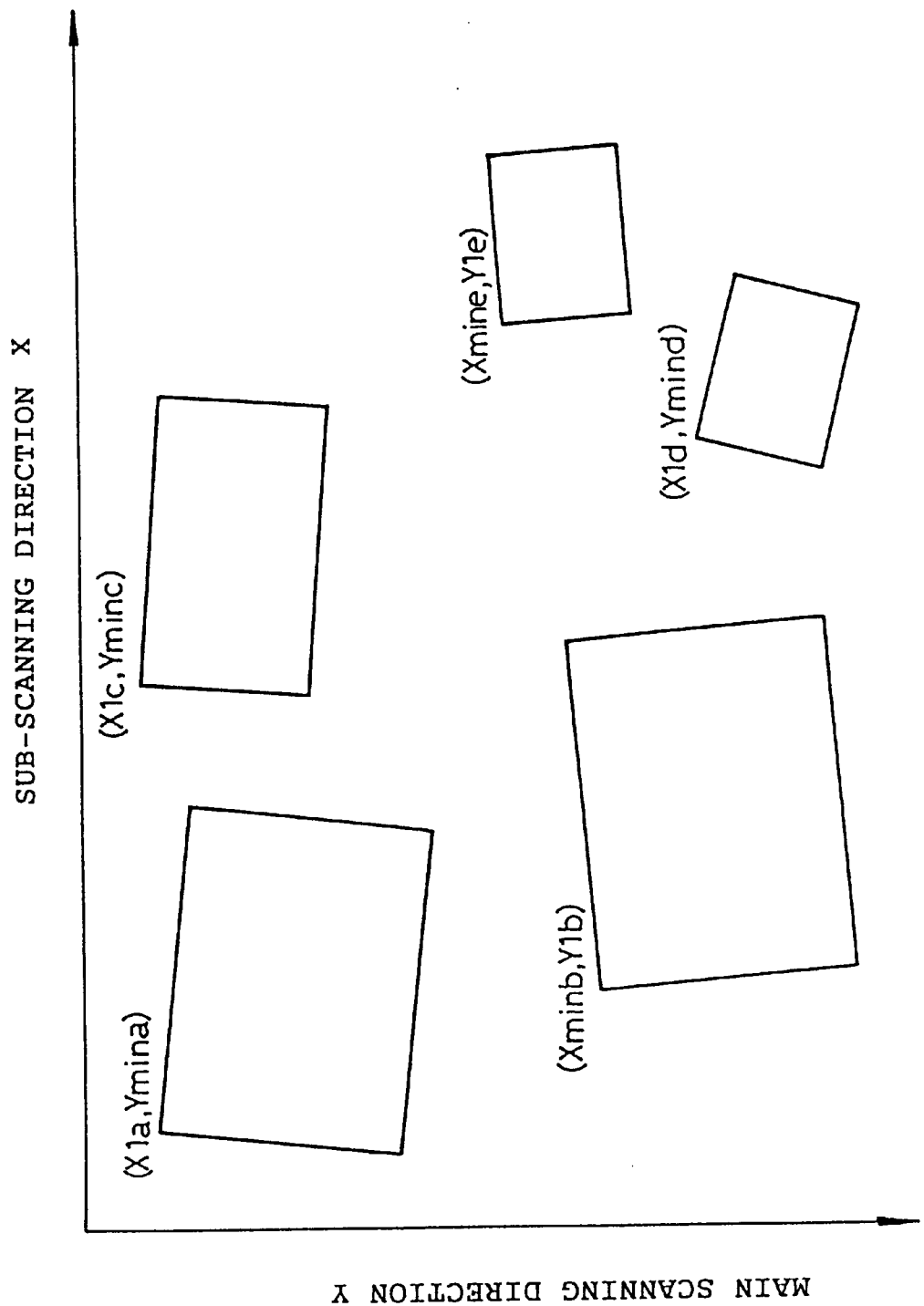
FIG. 24 is a diagram for explaining respective inputted document images and set origins of rotation coordinate systems.
Figure 25:
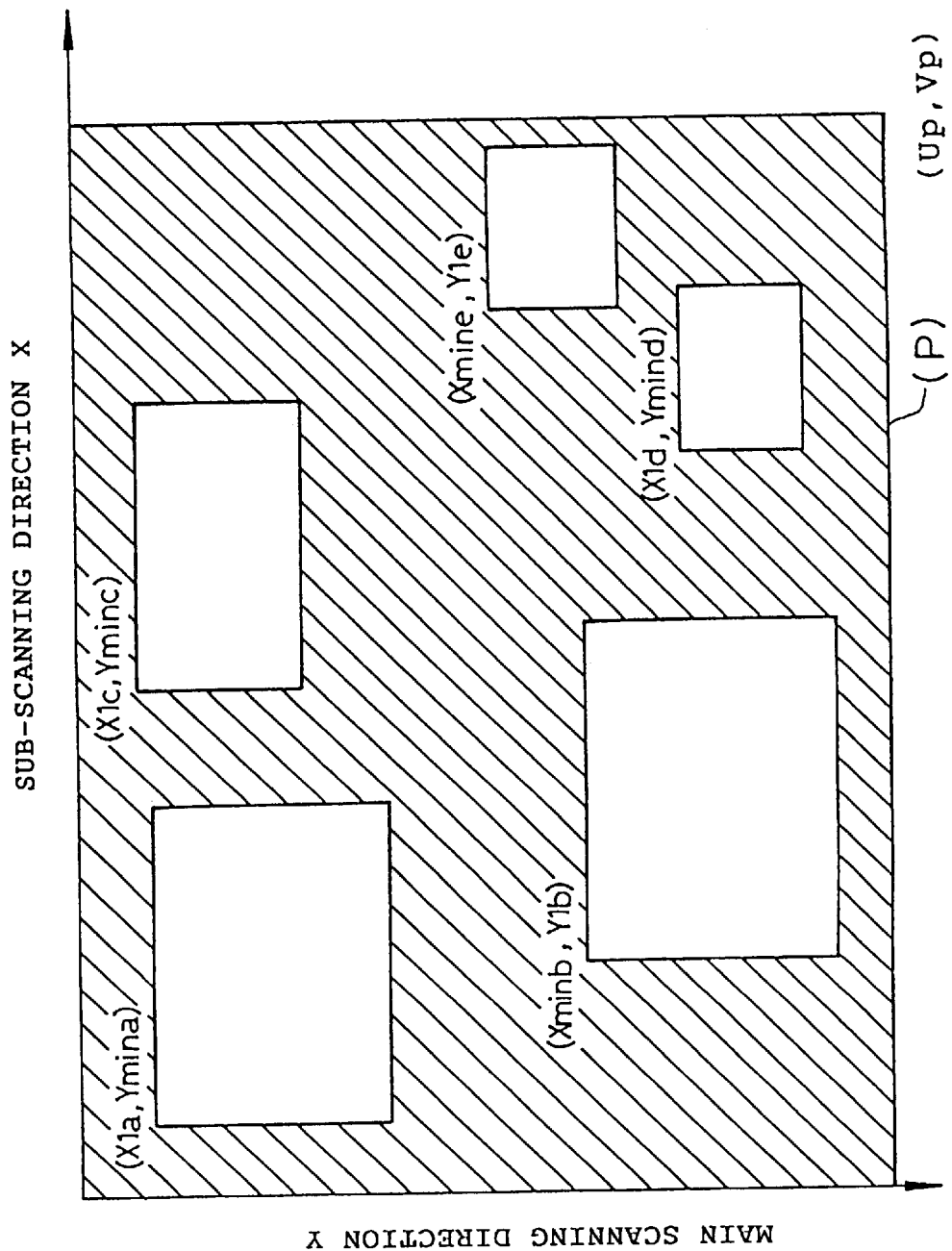
FIG. 25 is a diagram for explaining images formed by rotating the document as an editing operation images around the origins of the rotation coordinate systems.

FIG. 24 indicates respective inputted document images and the origins of the set rotation coordinates and FIG. 25 indicates the images subjected to the image editing processing in which the images are rotated around the origins of the set rotation coordinates. The area (P) shows a recording paper size.

Figure 26:
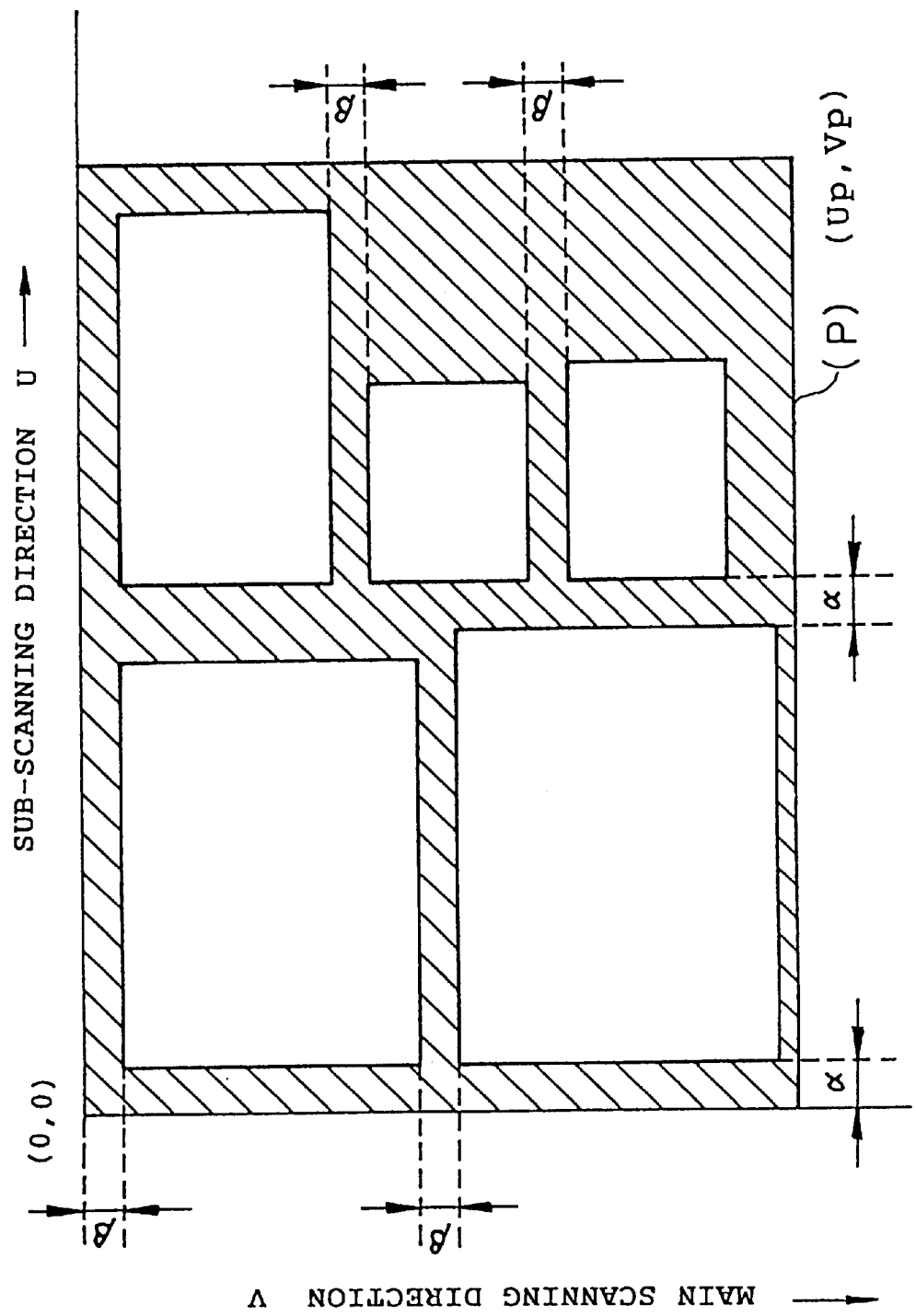
FIG. 26 is a diagram for explaining images formed by rotating the document images and parallely moving the document images to optimum positions.

FIG. 26 indicates the state where the rotation editing processing of image in accordance with the above-described "mode 1" is conducted with regard to the respective inputted document images shown by FIG. 24, where the respective inclinations of the plurality of document images are corrected and the document images are parallely moved to optimum positions. The area (P) shows a recording paper size.

Figure 13A:
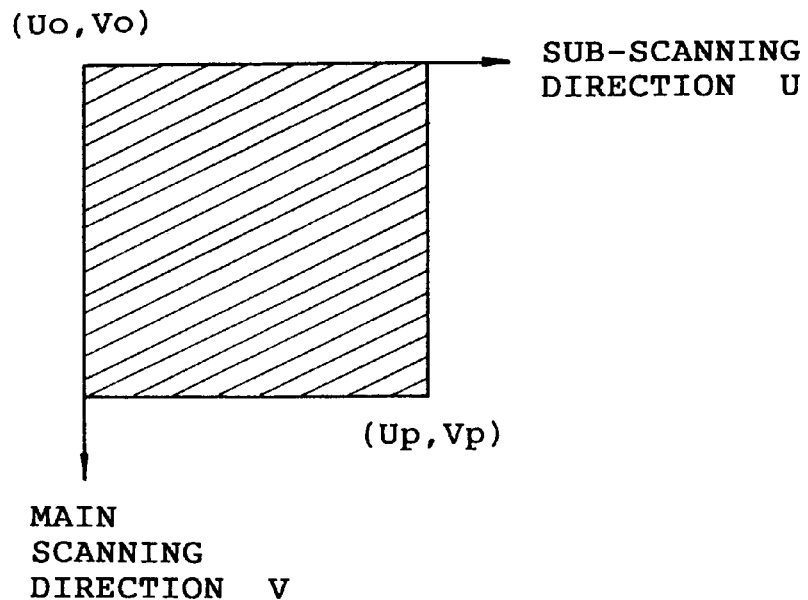
FIG. 13(a) and FIG. 13(b) are diagrams for explaining setting of paper size and setting of erasure area.
Figure 13B:
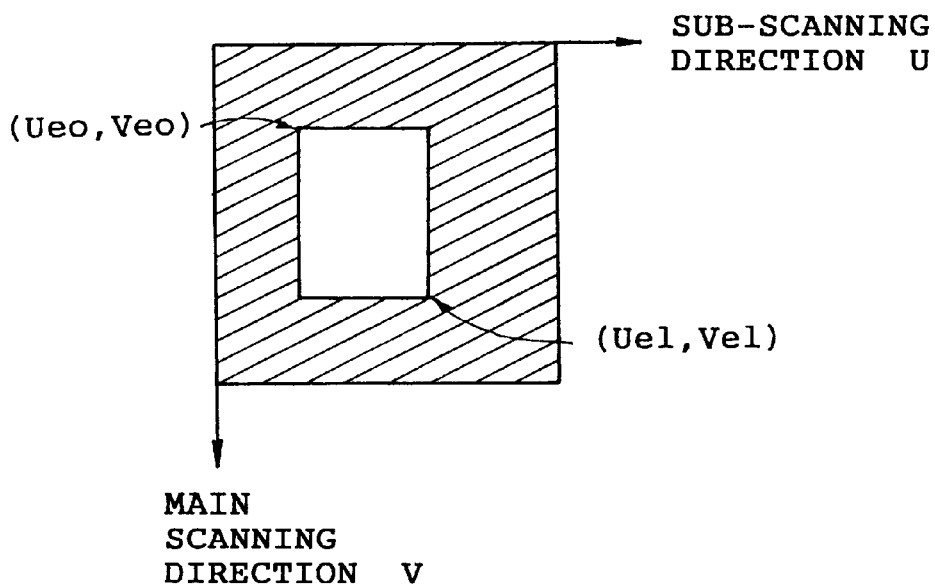
Figure 27:
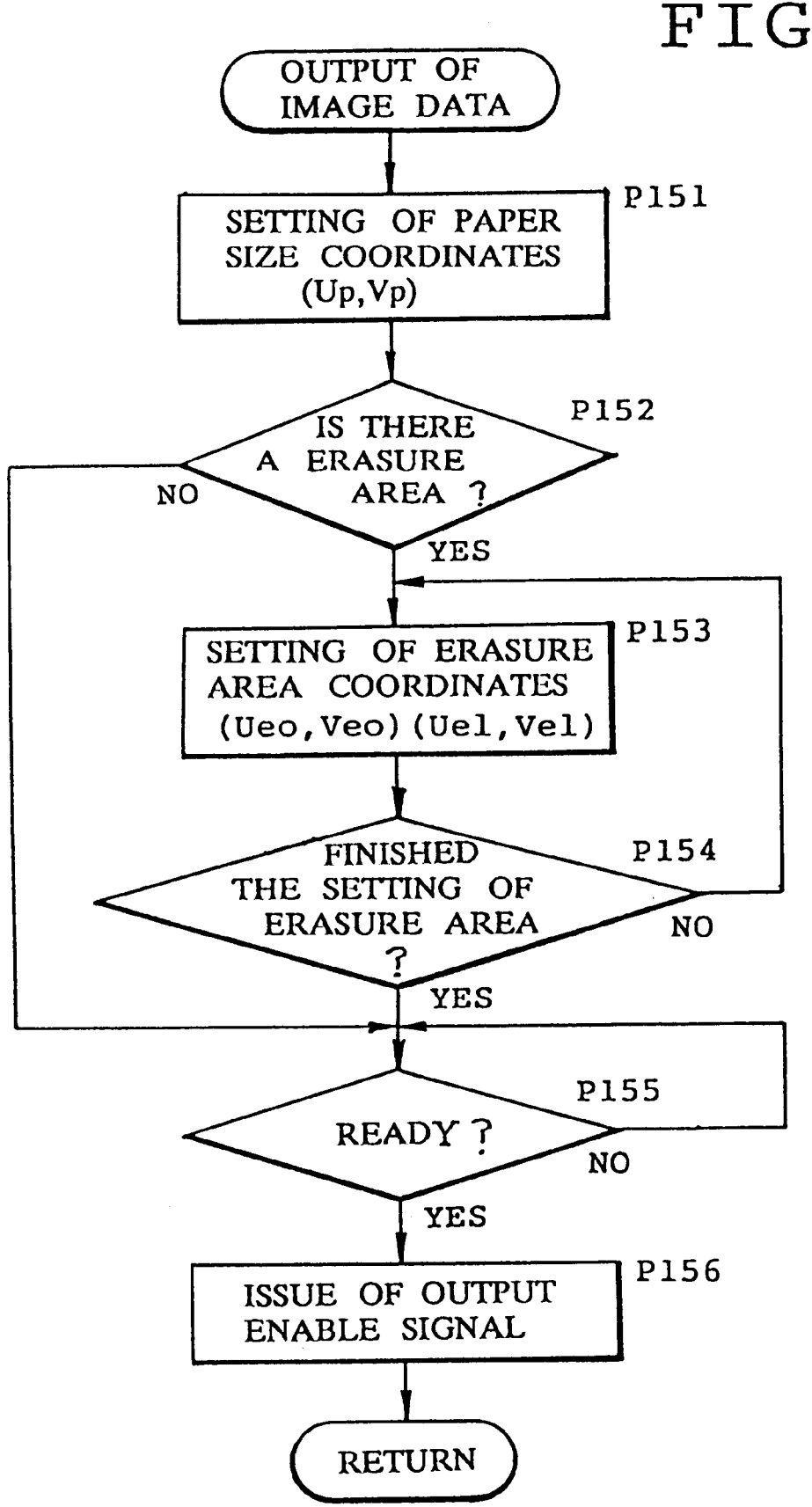
FIG. 27 is a flowchart for explaining details of processing of outputting image data.

FIG. 27 is a flowchart showing details of the processing of output of image data specified in the flowchart of FIG. 16 as steps P6, P11, P14 and P16 which is understandable by referring to FIGS. 13(a) and 13(b). Firstly, the coordinates (Up, Vp) showing the paper size is set (step P151). Whether the erasure area is set is determined (step P152) and when the erasure area is set, the coordinates (Ue0, Ve0) and (Ue1, Ve1) of two points on a diagonal line in the erasure area are set (step P153). When a plurality of the erasure areas are set, the setting is conducted repeatedly and the finishing of setting the erasure area is awaited (step P154). Finishing of standing ready is awaited and thereafter, the output enable signal is issued (steps P155, P156) and the operation returns to the main routine. When the erasure area is not set according to determination at step P152, the operation immediately proceeds to the processing of step P155.

Figure 28:
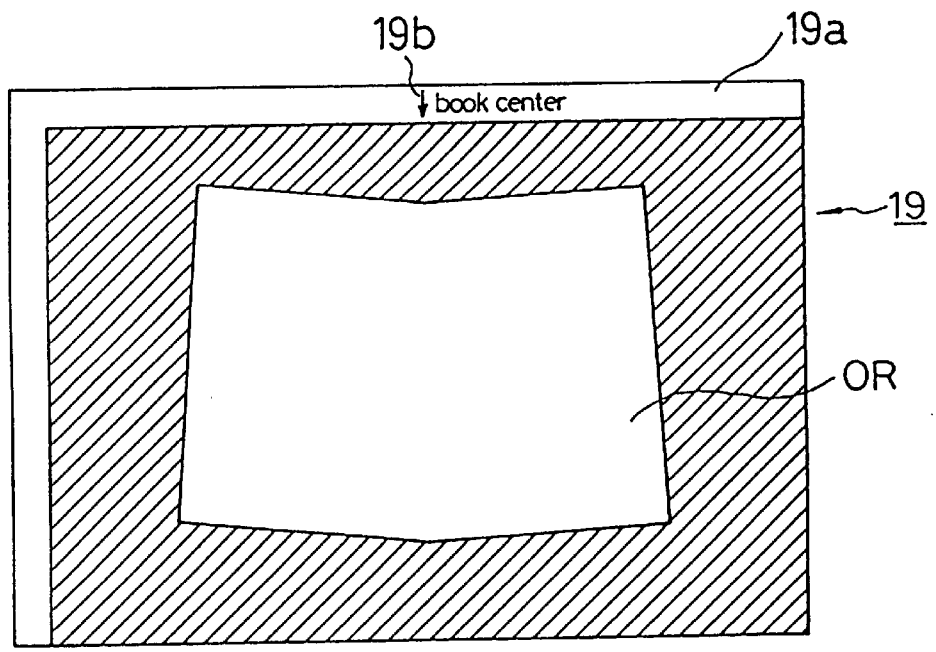
FIG. 28 is a diagram for explaining book document on a document base in a book mode.
Figure 29:
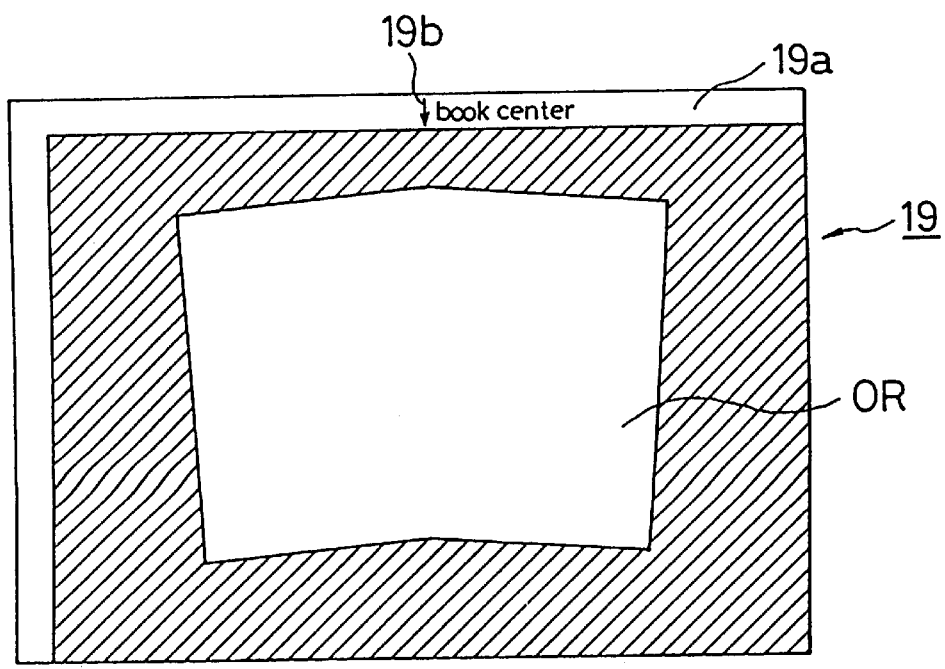
FIG. 29 is a diagram for explaining book document on a document base in a book mode.

Next, an explanation will be given of the processing in the case of the book mode. The book mode is a mode in which a book is divided into left and right pages and the pages are copied respectively and is also referred to as "book dividing page continuous copying mode". FIG. 28 and FIG. 29 are front views showing states where the book document is mounted on the document base. According to this example the left and right pages of the book document are placed inclined to the document scale 19a. An index 19b for positioning the central portion of the book document that is the bound portion thereof, is provided to the document scale 19a of the document base 19. In the following explanation the position of the index 19b is referred to as "book center".

The reading of the document image is conducted by scanning once the two left and right pages of the book document. The read document image is stored to the input page memory and the document edge coordinates are stored to the stack memory 113.

Figure 30:
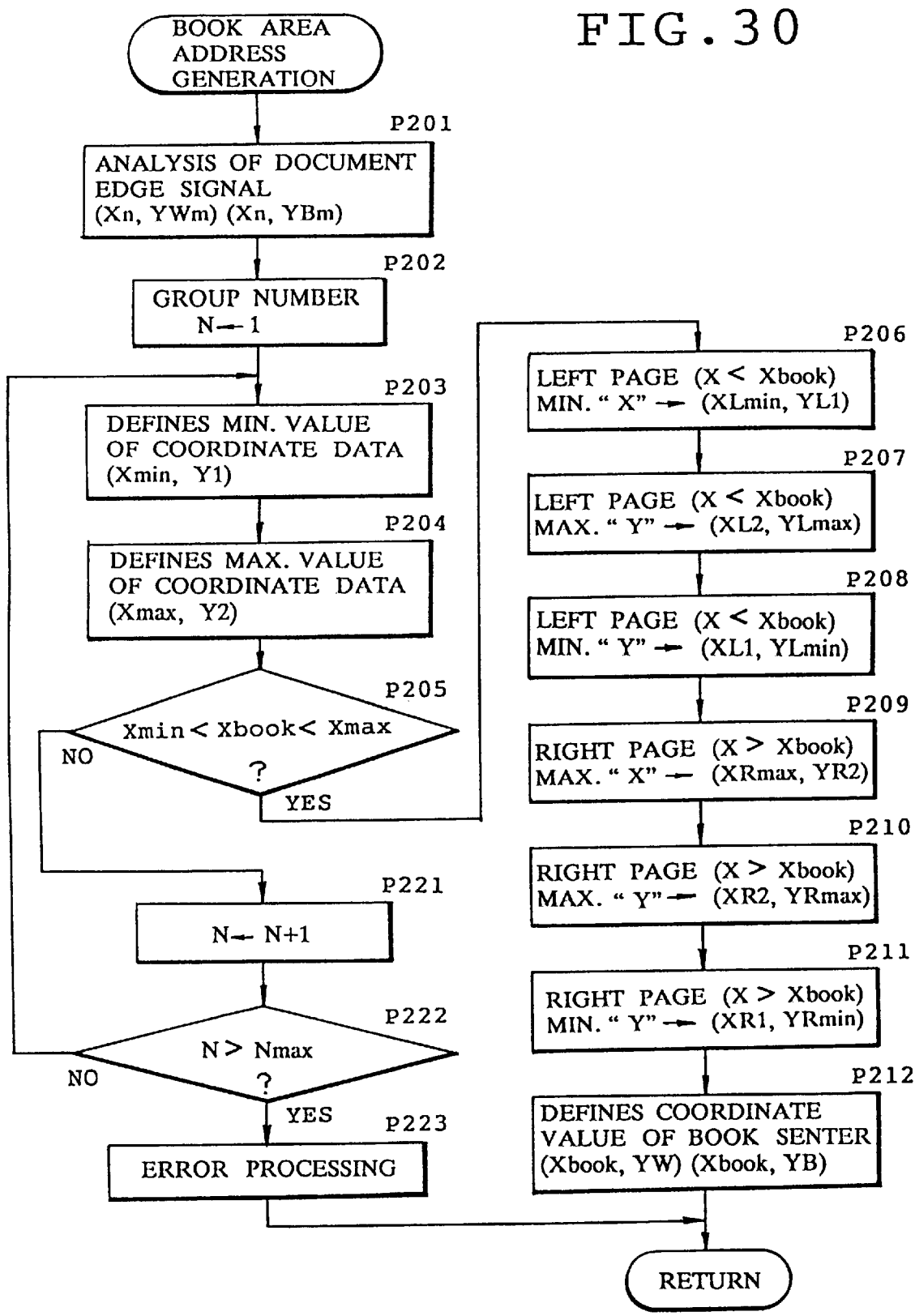
FIG. 30 is a flowchart for explaining details of an area address generation processing in a book mode.

FIG. 30 is a flowchart showing details of the processing of book area address generation defining the book document area in the flowchart of FIG. 16 as step P12. Firstly, the document edge detecting signals stored in the stack memory 113 are analyzed and determined a scanning line number (Xn) and a count value (YWm) of +EDGE, and the scanning line number (Xn) and a count value (YBm) of −EDGE, and 1 is substituted for the group number N (steps P201, P202).

Next, coordinate data (Xmin, Y1) indicating a minimum value of the X-axis coordinate in the group and coordinate data (Xmax, Y2) indicating a maximum value of the X-axis coordinate are defined (steps P203, P204). Whether a X-axis coordinate value Xbook of the book center is placed between the minimum value Xmin and the maximum value Xmax of the X-axis coordinate of the document edge is determined (step P205), and when it is placed therein, the document which is the most proximate to the document scale is determined as the effective document.

Further, with regards to the left page (area of X<Xbook), coordinates (XLmin, YL1) indicating a minimum value of the X-axis coordinate of the document edge, coordinates (XL2, YLmax) indicating a maximum value of the Y-axis coordinate of the document edge and coordinates (XL1, YLmin) indicating a minimum value of the Y-axis coordinate of the document edge, are defined and stored (steps P206, P207 and P208). With regards to the right page (area of X>Xbook), coordinates (XRmax, YR2) indicating a maximum value of the X-axis coordinate of the document edge, coordinates (XR2, YRmax) indicating a maximum value of the Y-axis coordinate of the document edge, and coordinates (XR1, YRmin) showing a minimum value of the Y-axis coordinate of the document edge, are defined and stored (steps P209, P210 and P211).

Further, the coordinate value (Xbook, YW) of +EDGE of the document edge and a coordinate value (Xbook, YB) of −EDGE thereof at the book center ate defined and stored (step P212) and the operation returns to the main routine.

When the X-axis coordinate value Xbook of the book center is not placed between the minimum value Xmin of the X-axis coordinate of the document edge and the maximum value Xmax of the X-axis coordinate there of according to the determination at step P205, the group number N is incremented and the finishing of processing in respect of all the groups is determined (steps P221, P222). When the processing is not finished, the operation returns to the step P203 to carry out the processing of a succeeding group and when the processing is finished, an error processing is carried out (step P223) and the operation returns to the main routine. The address of the image area is determined with respect to the left and right pages of the book document by the above-described processing.

Figure 31:
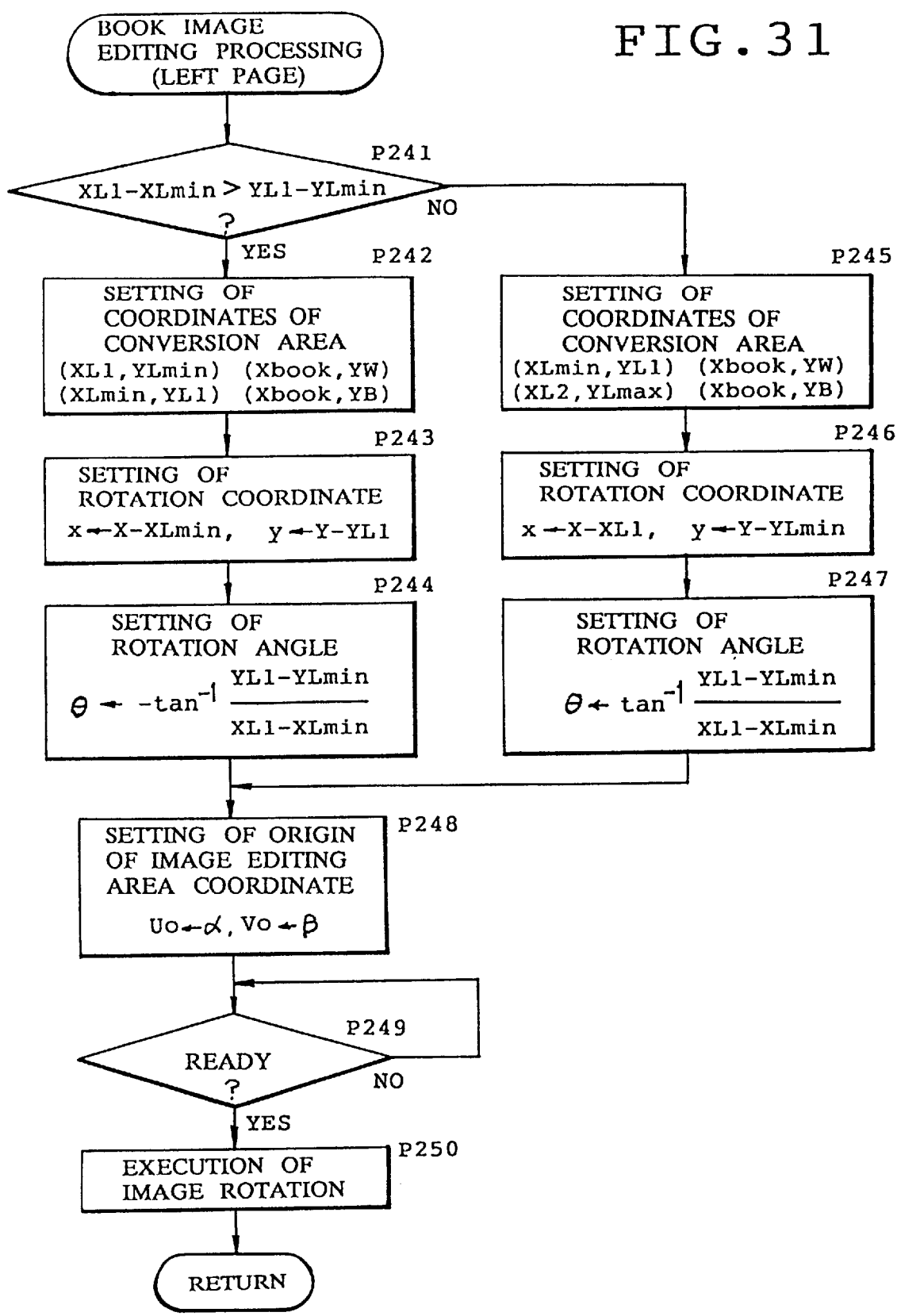
FIG. 31 is a flowchart for explaining details of a book edition processing (left page)
Figure 32:
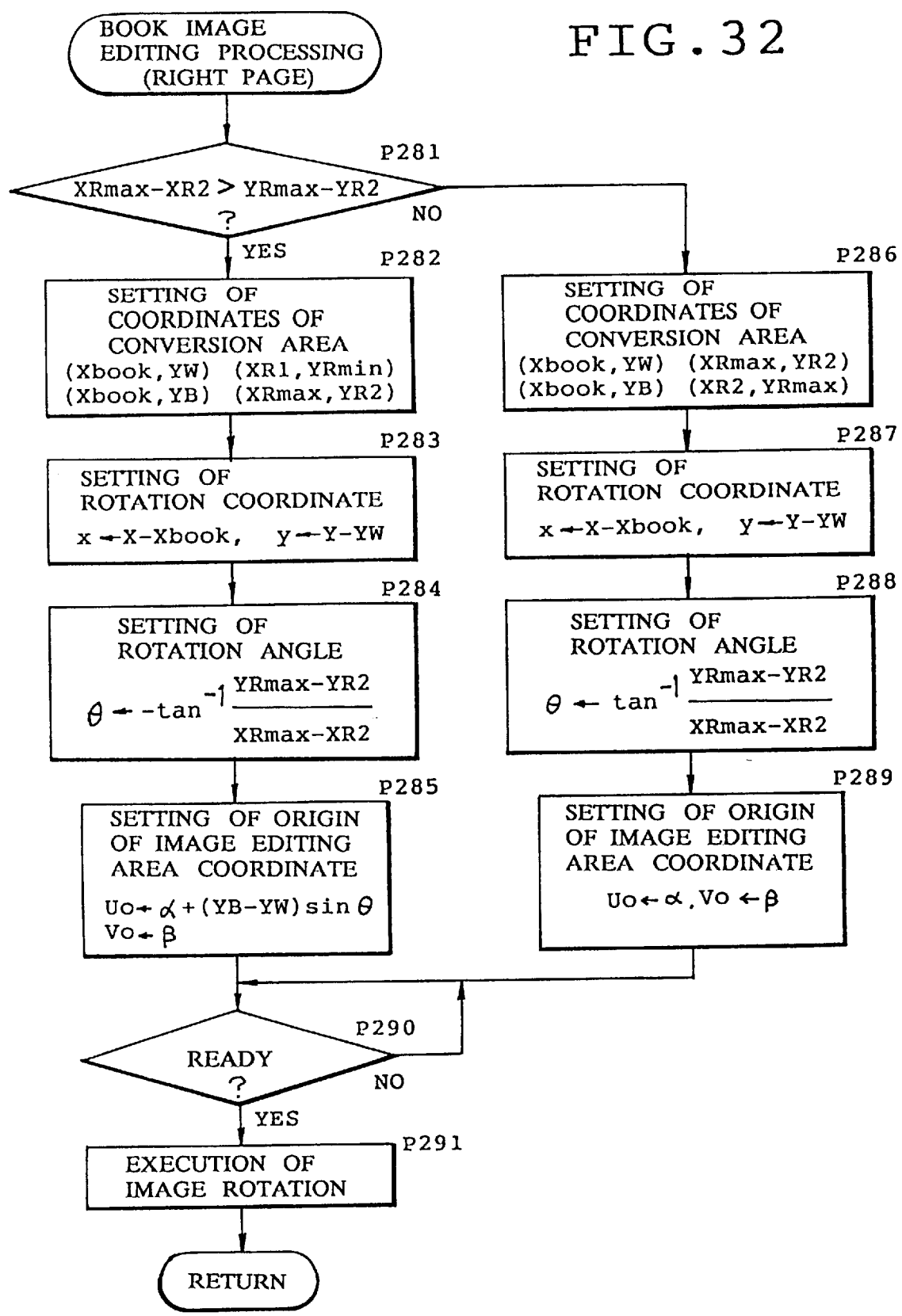
FIG. 32 is a flowchart for explaining details of a book edition processing (right page)

Next, an explanation will be given of the book image editing processing by flowcharts of FIG. 31 and FIG. 32. In the case of the book dividing pages continuous copying mode, processing of left page and processing of right page are separately carried out.

Firstly, an explanation will be given of the processing of left page by the flowchart of FIG. 31. Two distances between the coordinates of the document edges are compared whereby the direction of inclination of the document is determined (step P241). That is, in the case of XL1−XLmin>YL1−YLmin in respect of the two distances between coordinates, an image area (XL1, YLmin), (Xbook, YW), (XLmin, YL1), (Xbook, YB) which is determined by the processing of area address generation, is set as coordinates of a conversion area (step P242) and the origin (x, y) of the rotation coordinate and the rotational angle θ are set as follows (step P243, P244). The rotational direction is the clockwise direction.

$x \leftarrow (X-XLmin)$
$y \leftarrow (Y-YL1)$
$\theta \leftarrow -\tan^{-1}\{(YL1-YLmin)/(XL1-XLmin)\}$ In the case of XL1−XLmin≦YL1−YLmin in respect of the two distances between coordinates an image region (XLmin, YL1), (Xbook, VW), (XL2, YLmax), (Xbook, YB) which is determined by the processing of area address generation, is set as coordinates of a conversion region (step P245) and the origin (x, y) and rotational angle θ of the rotation coordinates are set as follows (steps P246, P247). The rotational direction is the counterclockwise direction.

$x \leftarrow (X-XL1)$
$y \leftarrow (Y-YLmin)$
$\theta \leftarrow \tan^{-1}\{(YL1-YLmin)/(XL1-XLmin)\}$ The coordinates (U0, V0) of the origin of image editing are set as U0=α, V0=β (step P248), the rotation processing is executed after awaiting for the finishing of standing ready (steps P249, P250) and the operation returns to the main routine. Incidentally, the values of α and β are previously inputted from the operation panel (or dip switch) (refer to explanation of display with touch panel).

Next, an explanation will be given of the processing of right page according to the flowchart of FIG. 32. Two distances between coordinates of the document edges are compared whereby the direction of inclination of the document is determined (step P281). That is, in the case of XRmax−XR2>YRmax−YR2 in respect of the two distances between the coordinates, a document area (Xbook, YW), (XR1, YRmin), (Xbook, YB), (XRmax, YR2) which is determined by the processing of area address generation, is set as coordinates of a conversion area (step P282) and the origin (x, y) and the rotational angle θ of rotation coordinates are determined as follows (steps P283, P284). The rotational direction is the clockwise direction.

$x \leftarrow (X-Xbook)$
$y \leftarrow (Y-YW)$
$\theta \leftarrow -\tan^{-1}\{(YRmax-YR2)/(XRmax-XR2)\}$ The coordinates (U0, V0) of the origin of image editing are set as U0=α+(YB−YW)sinθ, V0=β, (step P285), the rotation processing is executed after awaiting for the finishing of standing ready (steps P290, P291) and the operation returns to the main routine. Incidentally, the values of α and β are previously inputted from the operation panel (or dip switch) (refer to explanation of display with touch panel).

In the case where XRmax−XR2≦YRmax−YR2 in respect of the two distances between coordinates, a document area (Xbook, YW), (XRmax, YR2), (Xbook, YB), (XR2, YRmax) which is determined by processing of generating area address, is set as coordinates of a conversion area and the origin (x, y) and the rotational angle θ or rotation coordinates are determined as follows (steps P286, P287 and P288). The rotational direction is the counterclockwise direction.

$x \leftarrow (X-Xbook)$
$y \leftarrow (Y-YW)$
$\theta \leftarrow \tan^{-1}\{(YRmax-YR2)/(XRmax-XR2)\}$ The coordinates (U0, V0) of the origin of image editing are set as U0=α, V0=β (step P289), the rotation processing is executed after awaiting for a finishing of standing ready (steps P290, P291) and the operation returns to the main routine.

Figure 33:
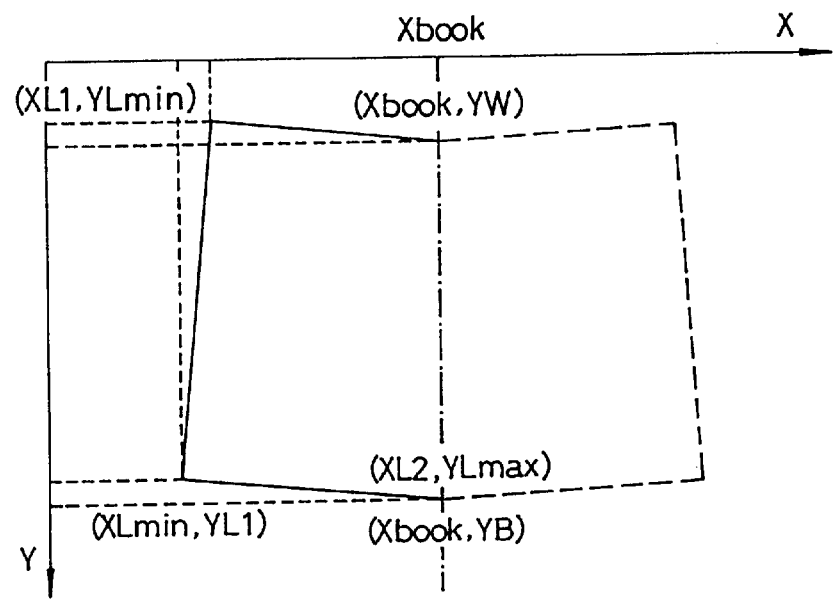
FIG. 33 is a diagram for explaining an address of document area on the left page of book mode.
Figure 34:
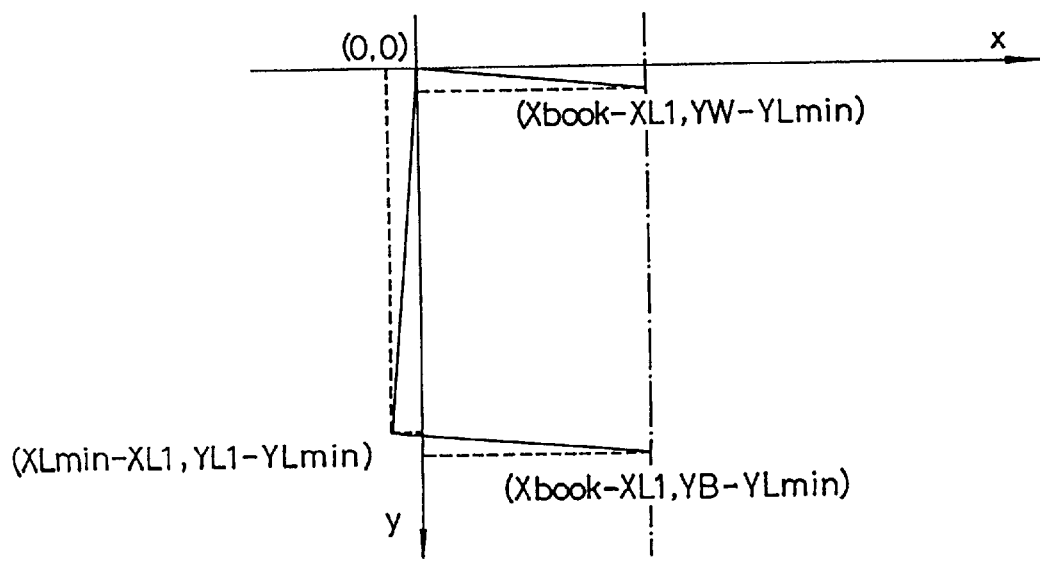
FIG. 34 is a diagram for explaining an address of the document area illustrated by FIG. 33 according to a new coordinate system.

FIG. 33 indicates an image area determined by the processing of area address generation in the case where XL1−XLmin≦YL1−YLmin in respect of the two distances between coordinates with respect to the left page in the book mode and FIG. 34 indicates the image area shown by FIG. 33 by new coordinates in accordance with the above-described conversion processing of the rotation coordinates. Further, FIG. 31 indicates a relation between the image area (I) and a paper size (P).

Figure 35:
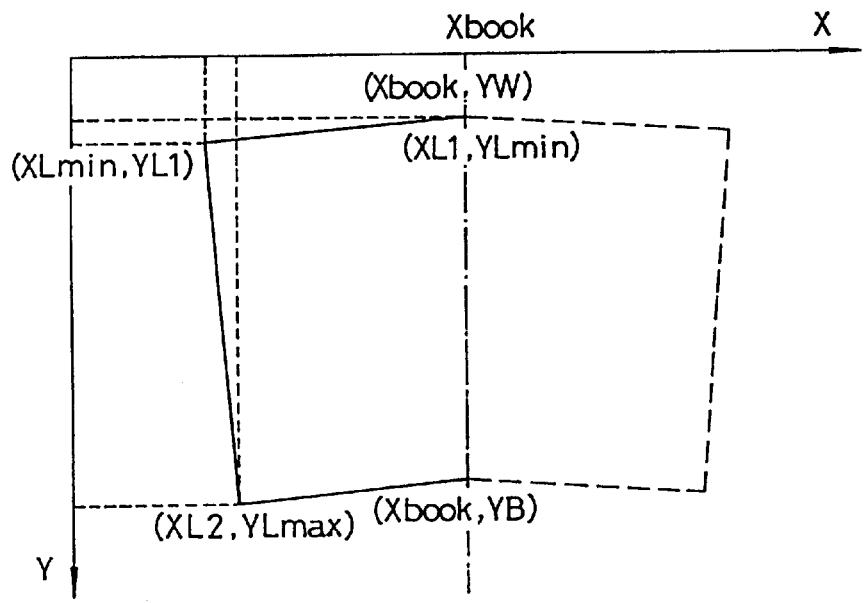
FIG. 35 is a diagram for explaining an address of document area on the left page in book mode.
Figure 36:
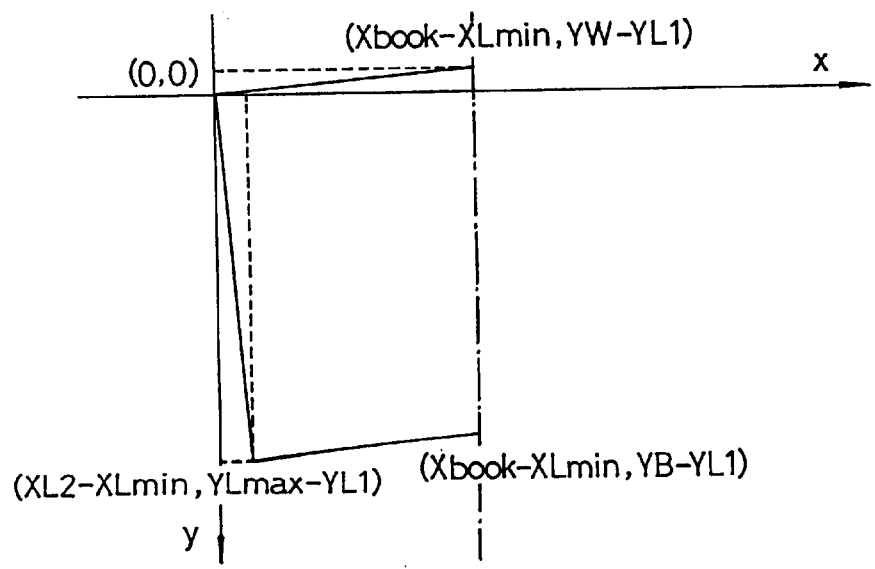
FIG. 36 is a diagram for explaining an address of the document area illustrated by FIG. 35 according to a new coordinate system.
Figure 37:
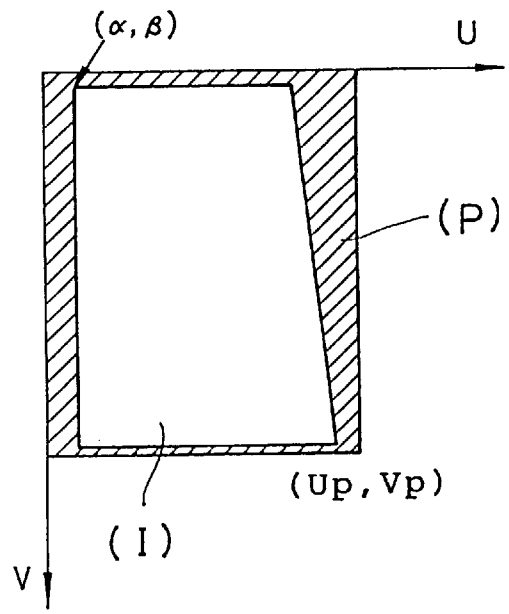
FIG. 37 is a diagram for explaining a relation between the document area illustrated by FIG. 34 and a paper size area.
Figure 38:
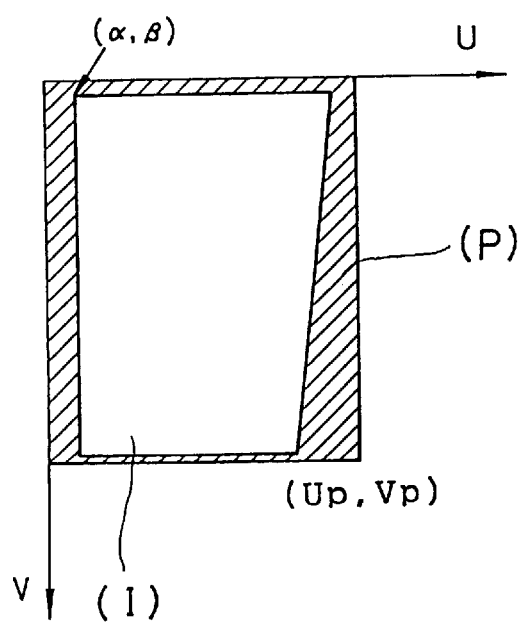
FIG. 38 is a diagram for explaining a relation between the document area illustrated by FIG. 36 and a paper size area.

FIG. 35 indicates the image area determined by processing of area address generation in the case where XL1−Xmin>YL1−YLmin in respect of the two distances between coordinates, and FIG. 36 indicates the image area shown by FIG. 35 by new coordinates in accordance with the above-described conversion processing of the rotation coordinates. Further, FIG. 38 indicates a relation between the image area (I) shown by FIG. 36 and the paper size (P).

Figure 39:
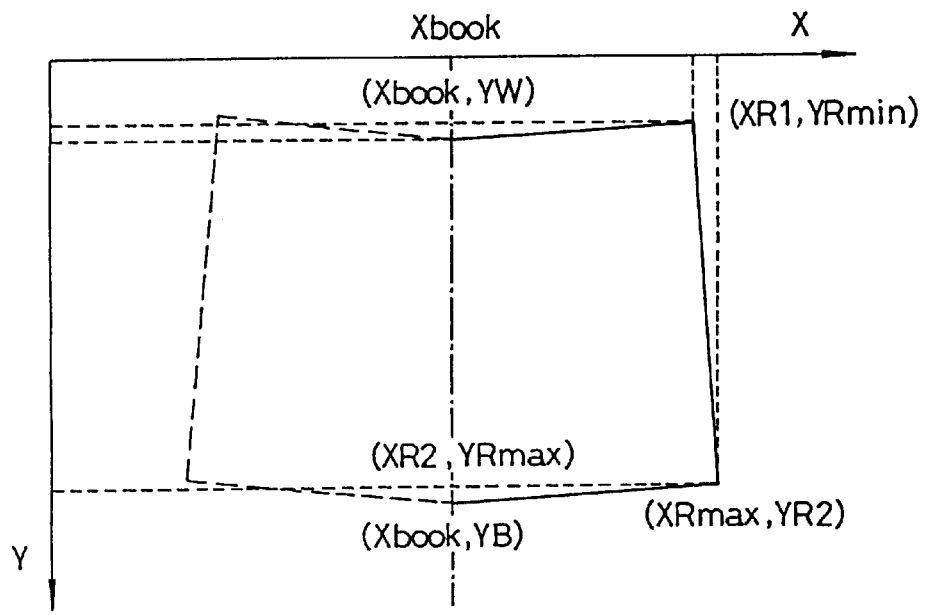
FIG. 39 is a diagram for explaining an address of a document area on the right page in book mode.
Figure 40:
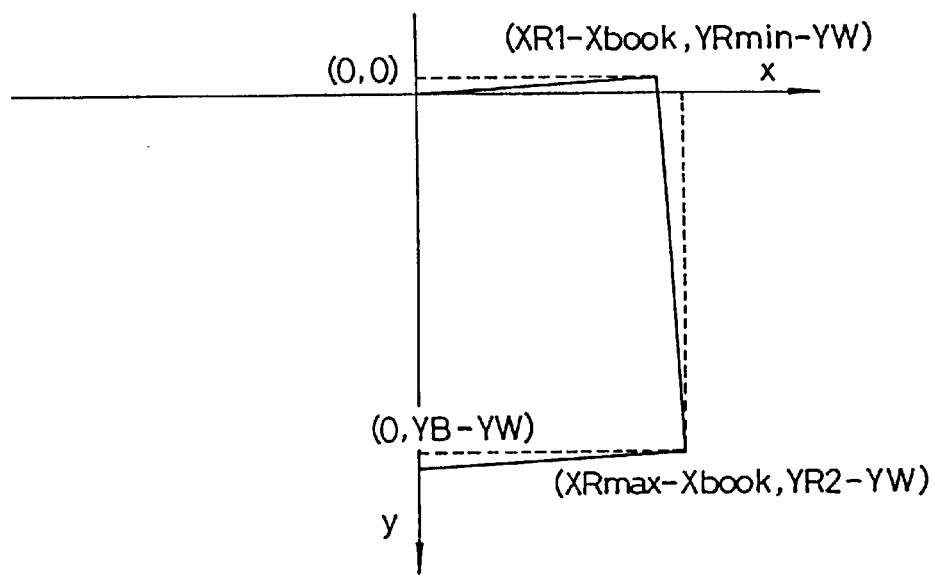
FIG. 40 is a diagram for explaining an address of the document area illustrated by FIG. 39 according to a new coordinate system.
Figure 43:
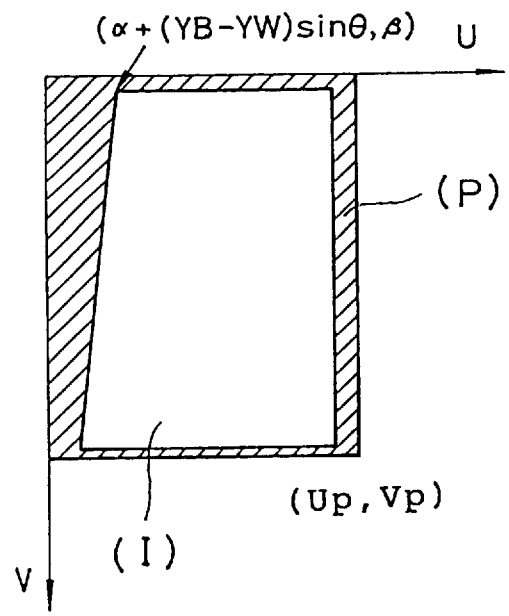
FIG. 43 is a diagram for explaining a relation between the document area illustrated by FIG. 40 and a paper size area.

FIG. 39 indicates the image area determined by the processing of area address generation in the case where XRmax−XR2>YRmax−YR2 in respect of the two distances between the coordinates in accordance with the right page in the book mode and FIG. 40 indicates the image area shown by FIG. 39 by new coordinates in accordance with the above-described conversion processing of the rotation coordinates. Further, FIG. 43 indicates a relation between the image area (I) shown by FIG. 40 and the paper size (P).

Figure 41:
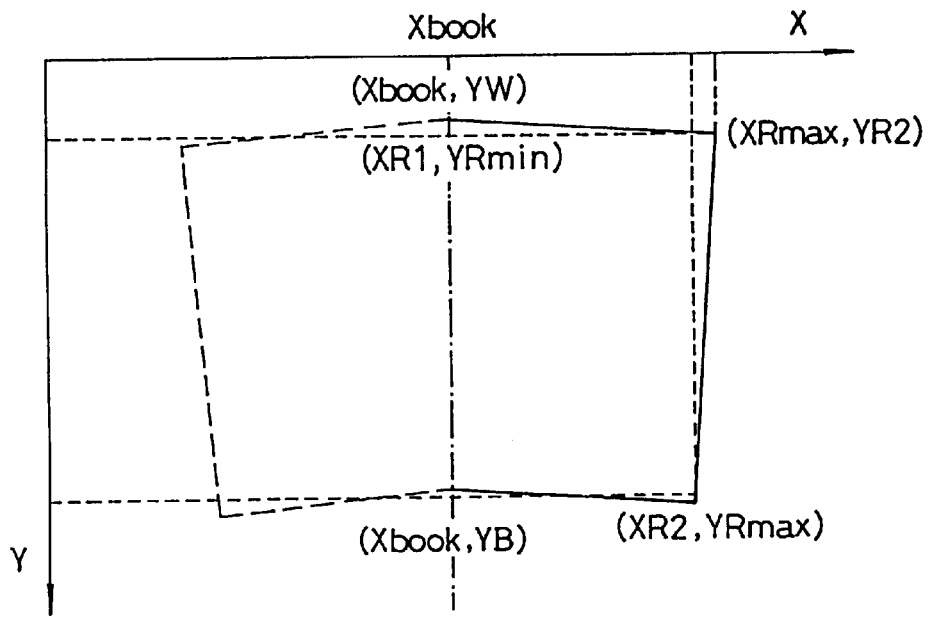
FIG. 41 is a diagram for explaining an address of a document area on the right page in book mode.
Figure 42:
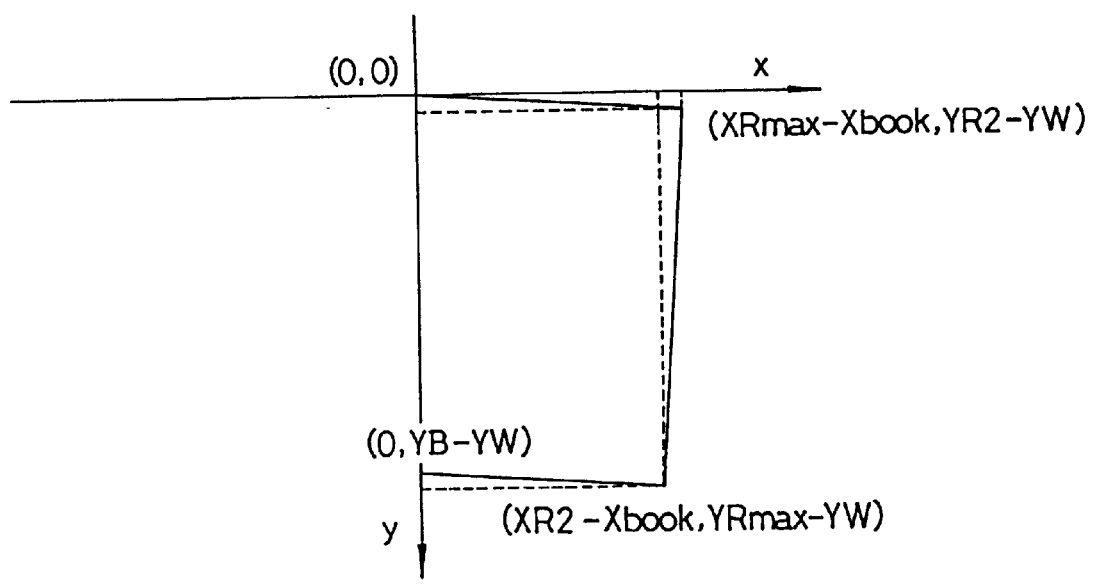
FIG. 42 is a diagram for explaining an address of the document area illustrated by FIG. 41 according to a new coordinate system.
Figure 44:
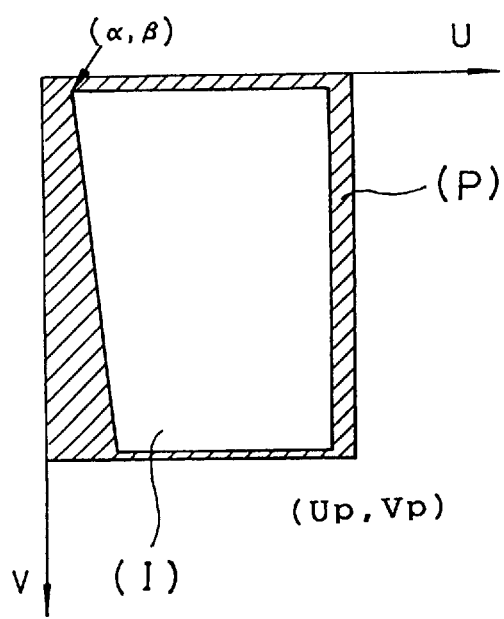
FIG. 44 is a diagram for explaining a relation between the document area illustrated by FIG. 42 and a paper size area.

FIG. 41 indicates the image area determined by the processing of area address generation in the case where XRmax−XR2<YRmax−YR2 in respect of the two distances between the coordinates and FIG. 42 indicates the image area shown by FIG. 41 by new coordinates in accordance with the above-described conversion processing of the rotation coordinates. FIG. 44 indicates a relation between the image area (I) shown by FIG. 42 and the paper size (P).

An explanation will be given of remaining major processings in the flowchart of FIG. 16.

Figure 45:
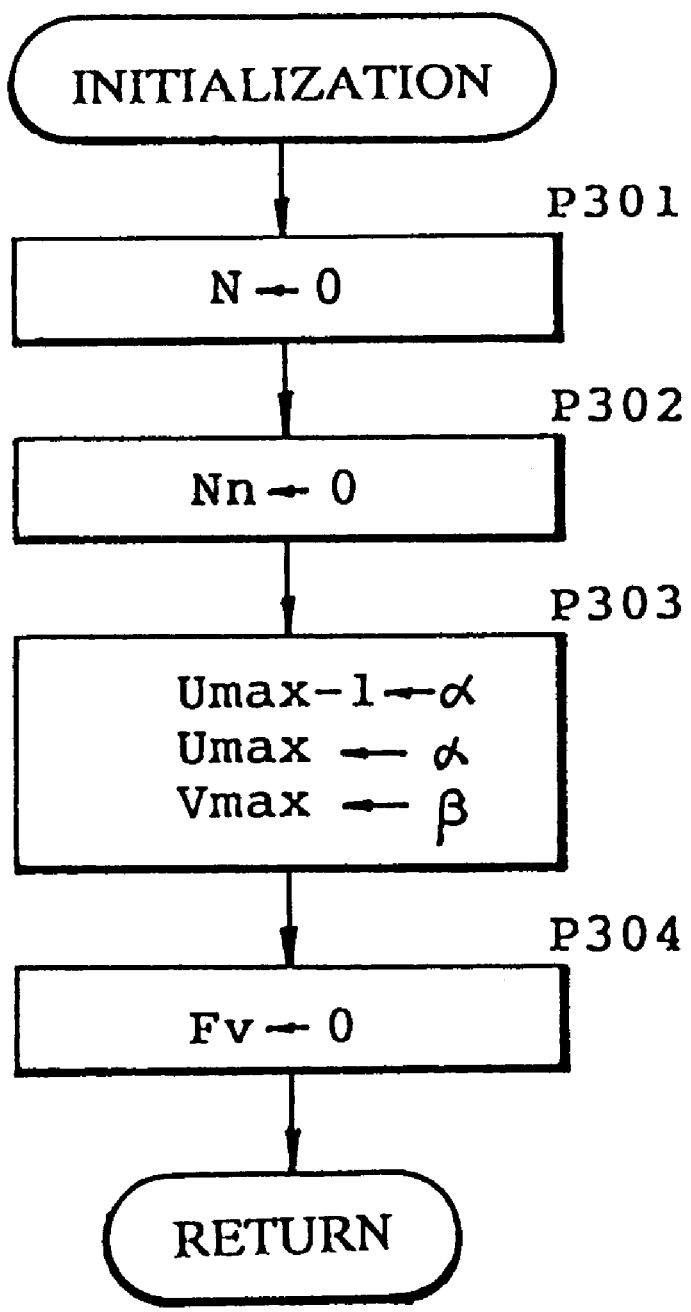
FIG. 45 is a flowchart for explaining details of initializing processing of an image processing routine.

FIG. 45 is a flowchart for explaining initialization processing in the flowchart of FIG. 16 as step P1. Here, the group number N corresponding to the number of sheets of the document placed on the document base is reset (step P301), the scanning line number Xn is reset (step P302), the total sum EUmax−1 of the coordinate values of the editing area in the U-axis direction and the total sum EUmax of the coordinate values of the editing area in the U-axis direction are set to the predetermined value α and the total sum EVmax of the coordinate values in the V-axis direction is set to β (step P303), the flag Fv is set to 0 (step P304) and the operation returns to the main routine.

Figure 46:
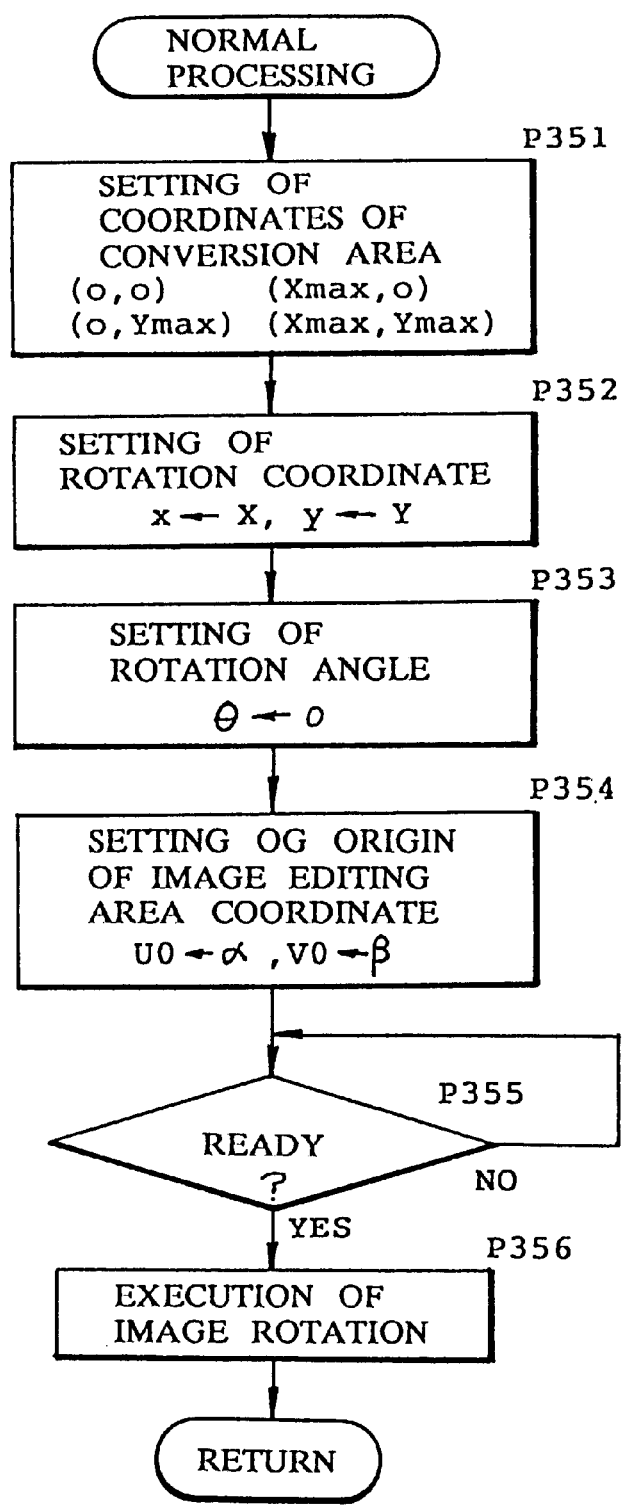
FIG. 46 is a flowchart for explaining details of normal processing of an image processing routine.

FIG. 46 is a flowchart for explaining the normal Processing in the flowchart of FIG. 16 as step P5. Firstly, coordinates of four points at four corners of the maximum size of the document are set as coordinates in a conversion area (step P351), coordinates (x, y) of the origin of rotation coordinates of the document image are set to the origin (0, 0) of the document image and the rotational angle θ is set to 0° (steps P352, P353). The coordinates (U0, V0) of the origin for image editing area are set to (αβ) (step P354), the rotation processing is executed after awaiting for the finishing of standing ready (steps P355, P356) and the operation returns to the main routine.

(Display with Touch Panel)

An explanation will be given of the operation and the display content of the display 96 with a touch panel on the operation panel OP.

Figure 47:
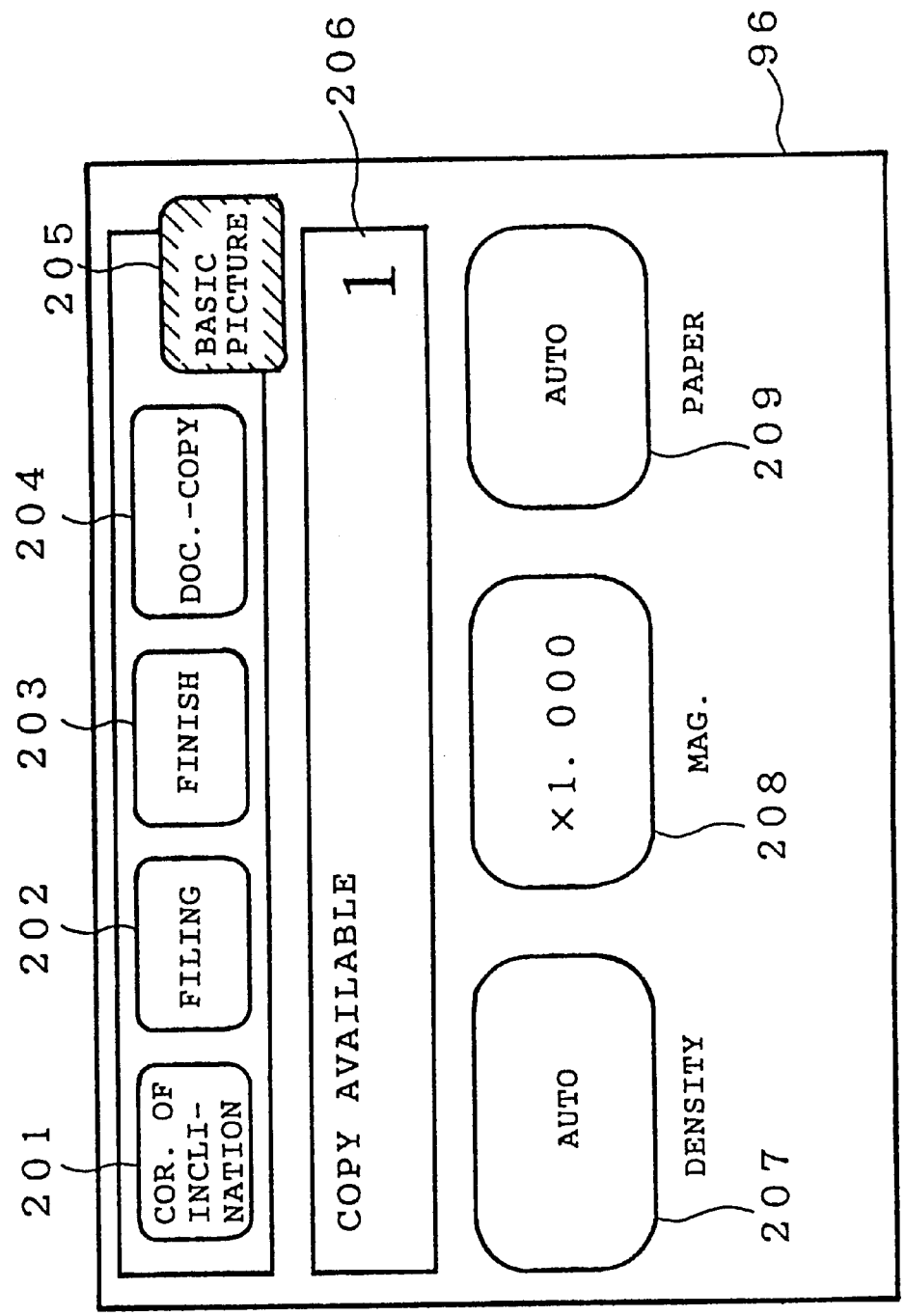
FIG. 47 is a diagram for explaining a basic picture of a display with a touch panel.

FIG. 47 indicates a basic picture of the display 96 with a touch panel in which the display 96 is provided with touch keys 201 through 205 instructing correction of inclination, filing, finishing, document→copy and selection of basic picture, a message unit 206 displaying message with respect to conditions of apparatus, a number of sheets of copies etc. and touch keys 207 through 209 designating copy density, copy magnification and paper size. According to this picture, a display content that copying can be carried out and the set number of sheets of copies is "1", is displayed in the message unit 206. Also, according to the touch keys 207 through 209 the copy density is set to "AUTO DENSITY" automatically setting the copy density, the copy magnification set to "1.000" and "AUTO PAPER SIZE" signifying that the paper size is automatically selected in accordance with the document size and the copy magnification, are displayed.

Figure 48:
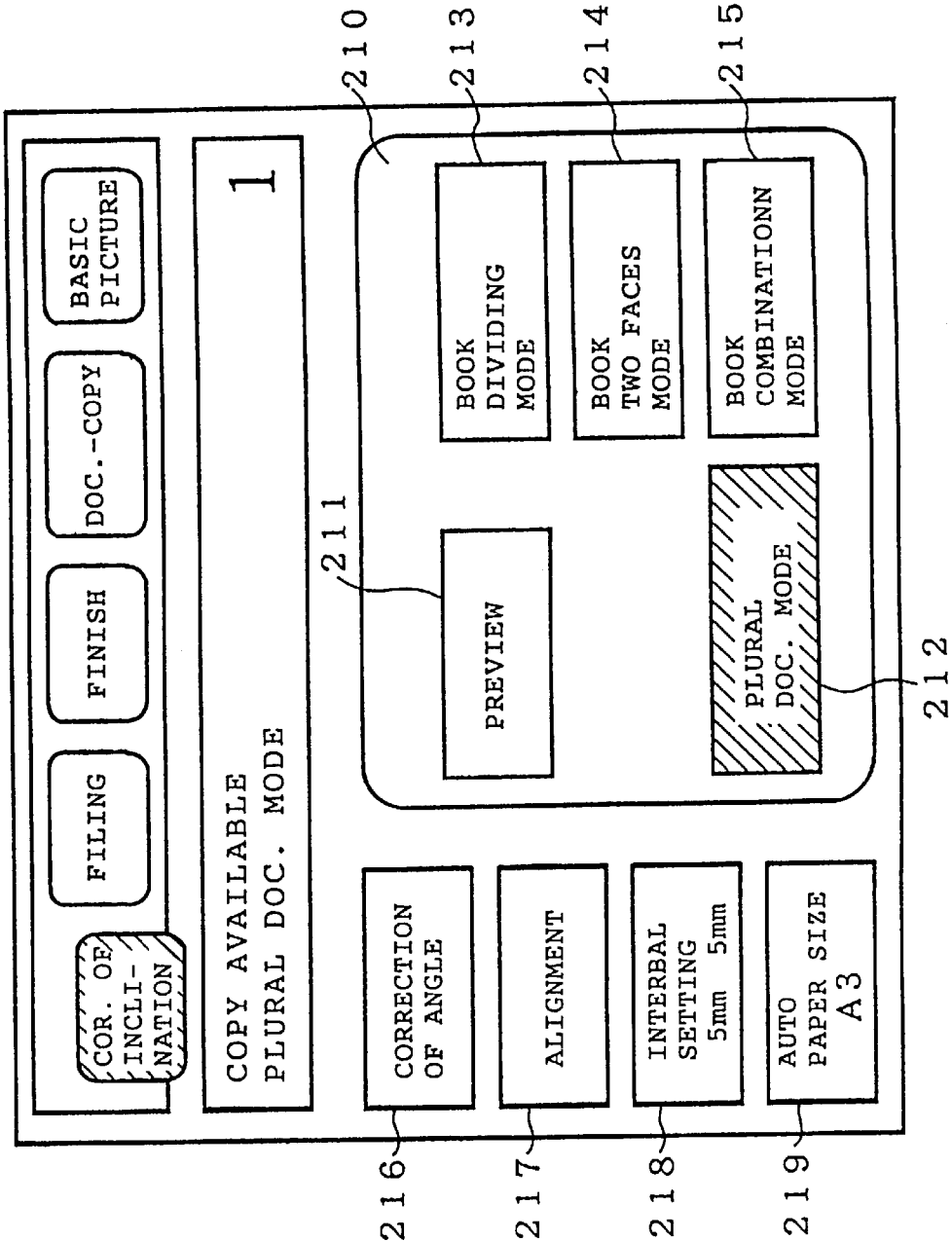
FIG. 48 is a diagram (1) for explaining a picture of the display with a touch panel in key operation.

FIG. 48 indicates a screen when correction of inclination is selected by the touch key 201 whereby the basic picture shown by FIG. 47 is switched to the picture shown by FIG. 48. In the picture, plural touch keys are provided in a frame 210, such as a preview key 211, a plural document mode key 212, a book dividing key 213, a book two face mode key 214, a book combination mode key 215, etc. are displayed and the modes can be selected by operating the touch keys.

Further, in this picture an angle correction key 216 instructing correction of image angle, an alignment key 217 instructing alignment of image, an interval setting key 218 instructing setting of image interval and a paper size selecting key 219 are displayed. According to the display state intervals of 5 mm are respectively set vertically and horizontally as image intervals and with regards to the recording paper size A3 (Japanese Industrial Standards, 297mm×420 mm) is currently selected by the "AUTO PAPER SIZE". The "mode 0" can be selected by turning ON the angle correction key 216 and the "mode 1" can be selected by turning ON the alignment key 217 (refer to step P108 in FIG. 19(a)). Additionally, the image intervals α and β in the "mode 1" can be set by operating the interval setting key 218.

Figure 49:
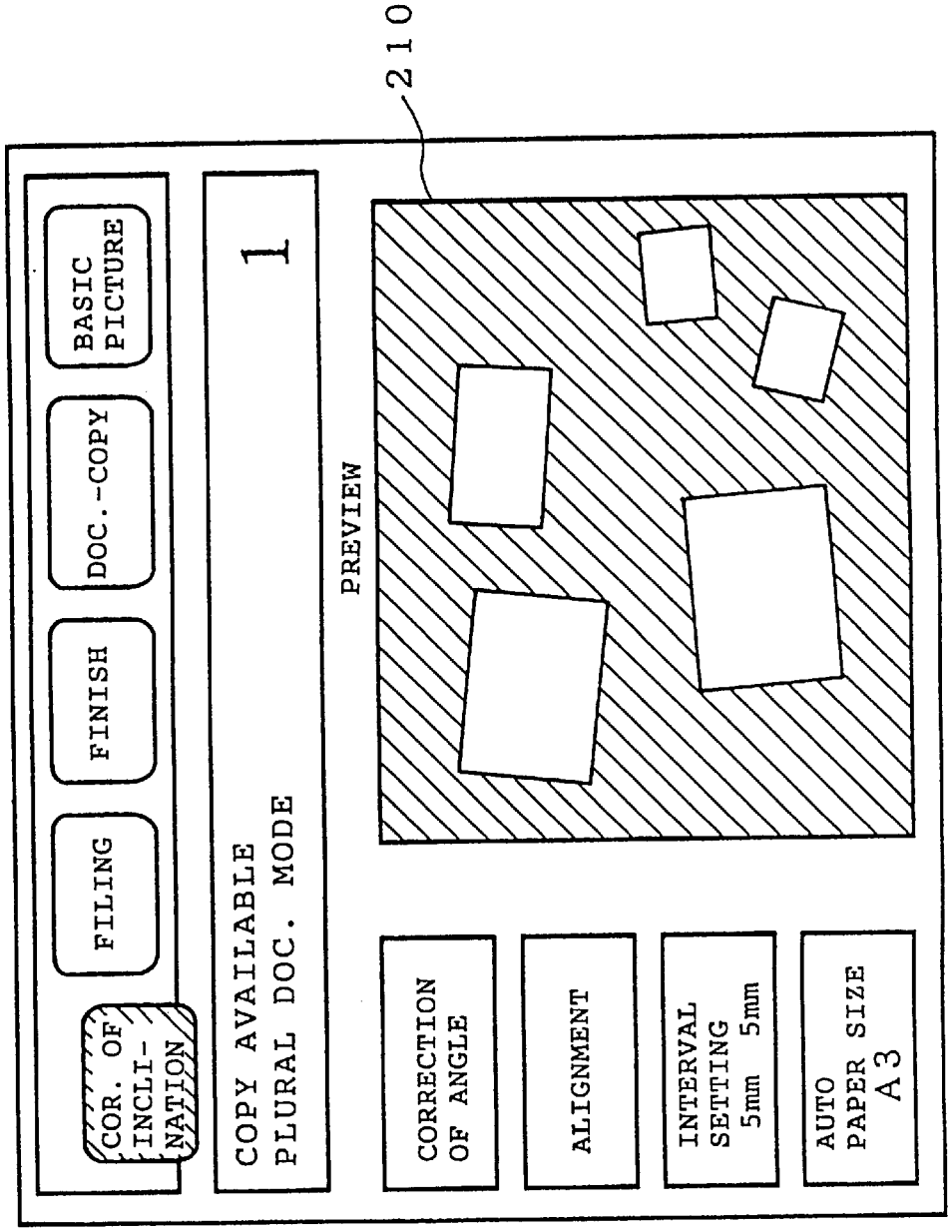
FIG. 49 is a diagram (2) for explaining a picture of the display with a touch panel in key operation.

When the preview key 211 is operated, the reading of the document image can be conducted by operating only the image reading unit IR whereby the arrangement state of document placed on the document base can be viewed. Further, when the angle correction key or the other keys are operated, the arrangement state of the processed image can be viewed by operating the preview key 211. FIG. 49 indicates a picture when the preview key 211 is operated where the arrangement state of document placed on the document base is displayed inside of the frame 210 shown by FIG. 48.

Figure 50:
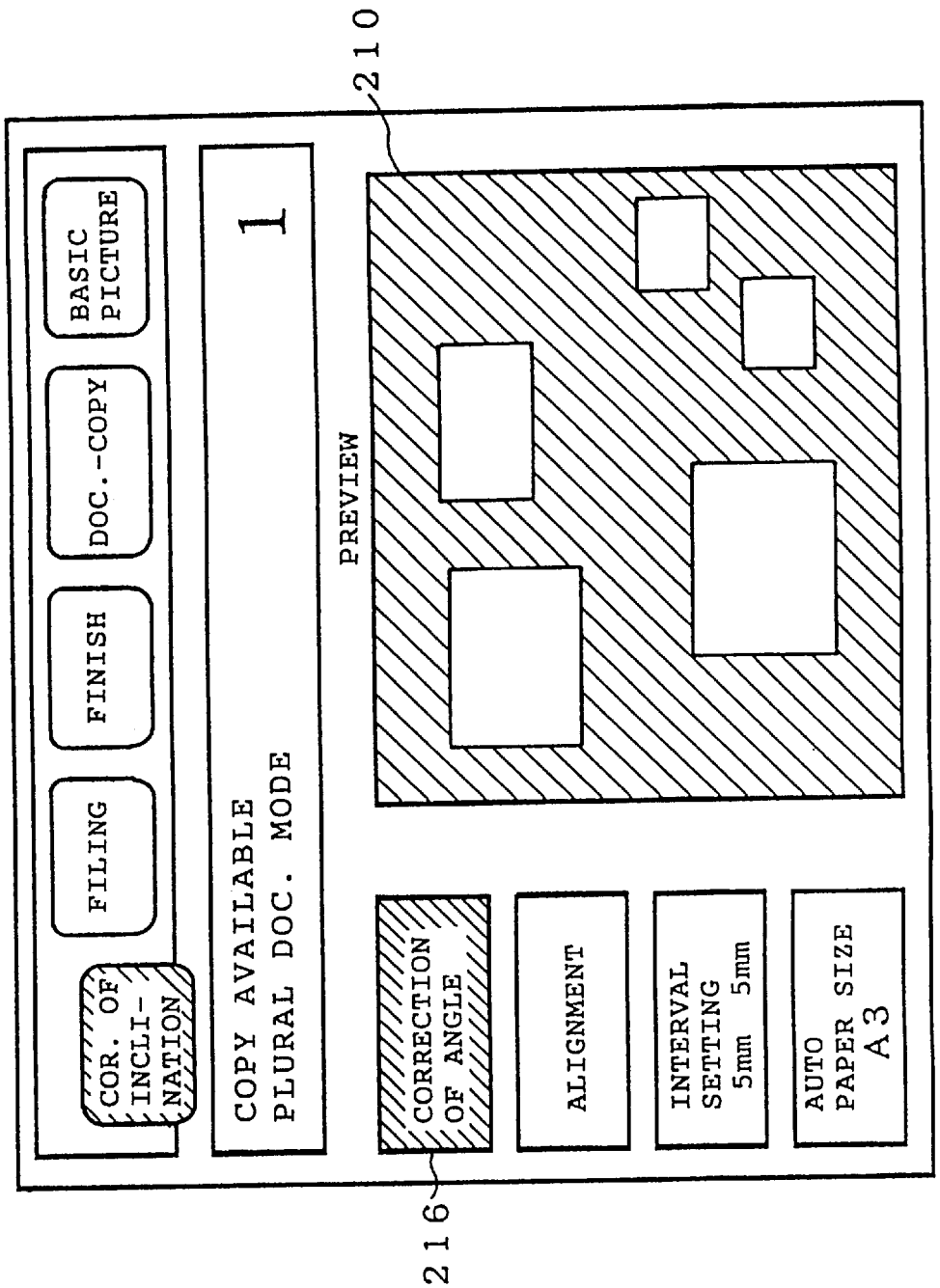
FIG. 50 is a diagram (3) for explaining a picture of the display with a touch panel in key operation.

FIG. 50 indicates a picture in the case where the inclinations of the document images are corrected by selecting the "mode 0" by operating the angle correction key 216. By operating the preview key 211, the state where the inclinations of the document images are corrected is displayed on the frame 210 whereby the state of correction can be confirmed and at the same time the selected recording paper size (Here, A3 constituting the full size of the frame 210 is selected by the "automatic paper feeding".) is displayed.

Figure 51:
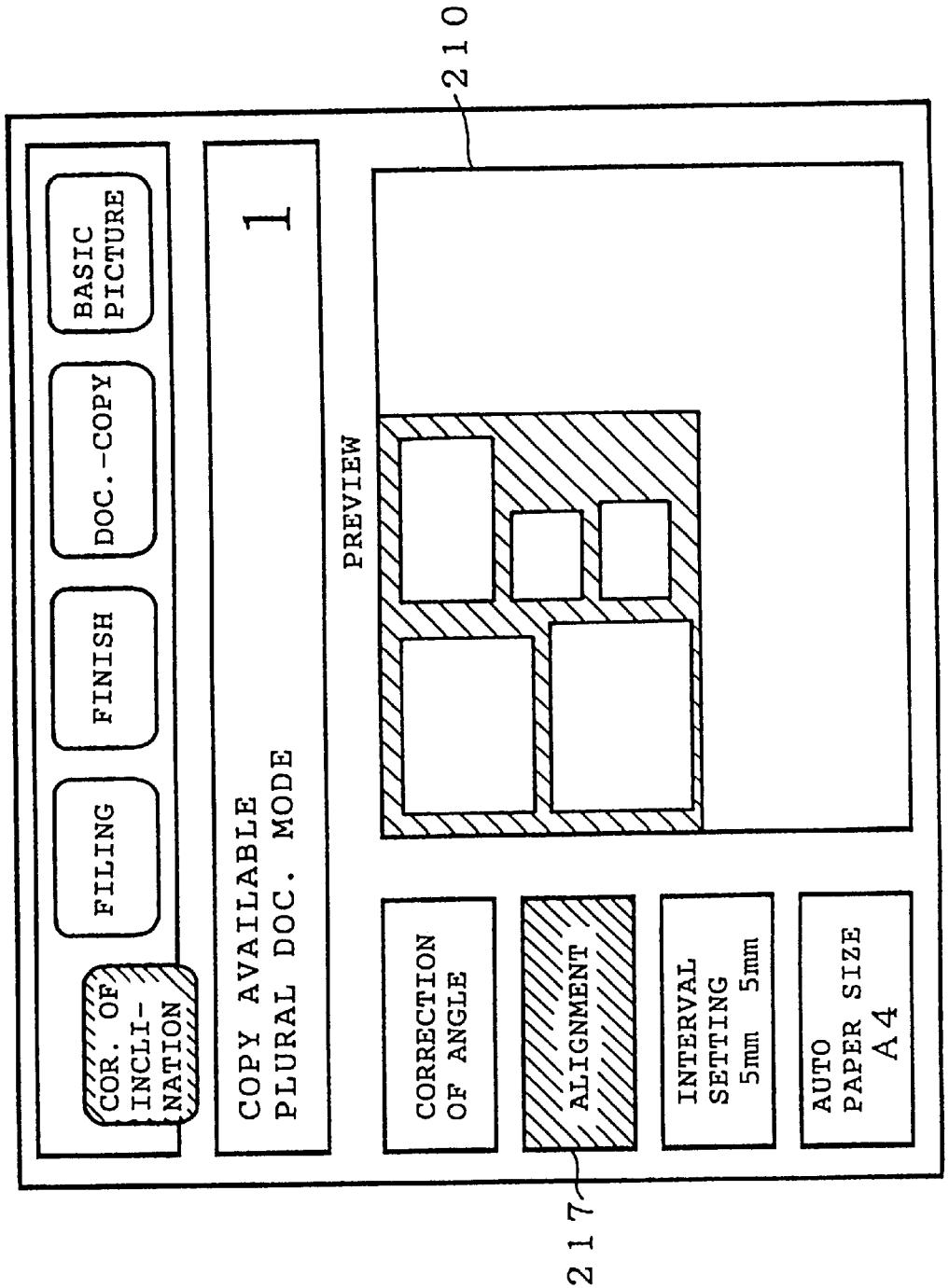
FIG. 51 is a diagram (4) for explaining a picture of the display with a touch panel in key operation.

FIG. 51 shows a picture in the case where the corrections of the inclinations of the document images and the alignment of arrangement thereof are conducted by selecting the "mode 1" by operating the aligning key 217. The state where inclinations of the document images are corrected and the images are aligned can be confirmed by operating the preview key 211.

Here, intervals of 5 mm have already been set as the document intervals α and β and the state where A4 (Japanese Industrial Standards, 210 mm×297 mm) is selected as the recording paper size by the "AUTO PAPER SIZE" mode is displayed. As in this example there is a case where margin space is reduced by correction of inclinations of the document images and the alignment processing thereof and accordingly, in the case or selecting the "AUTO PAPER SIZE" mode, recording paper having a smaller size is automatically selected when the document images can be recorded on the recording paper having a smaller size.

Figure 52:
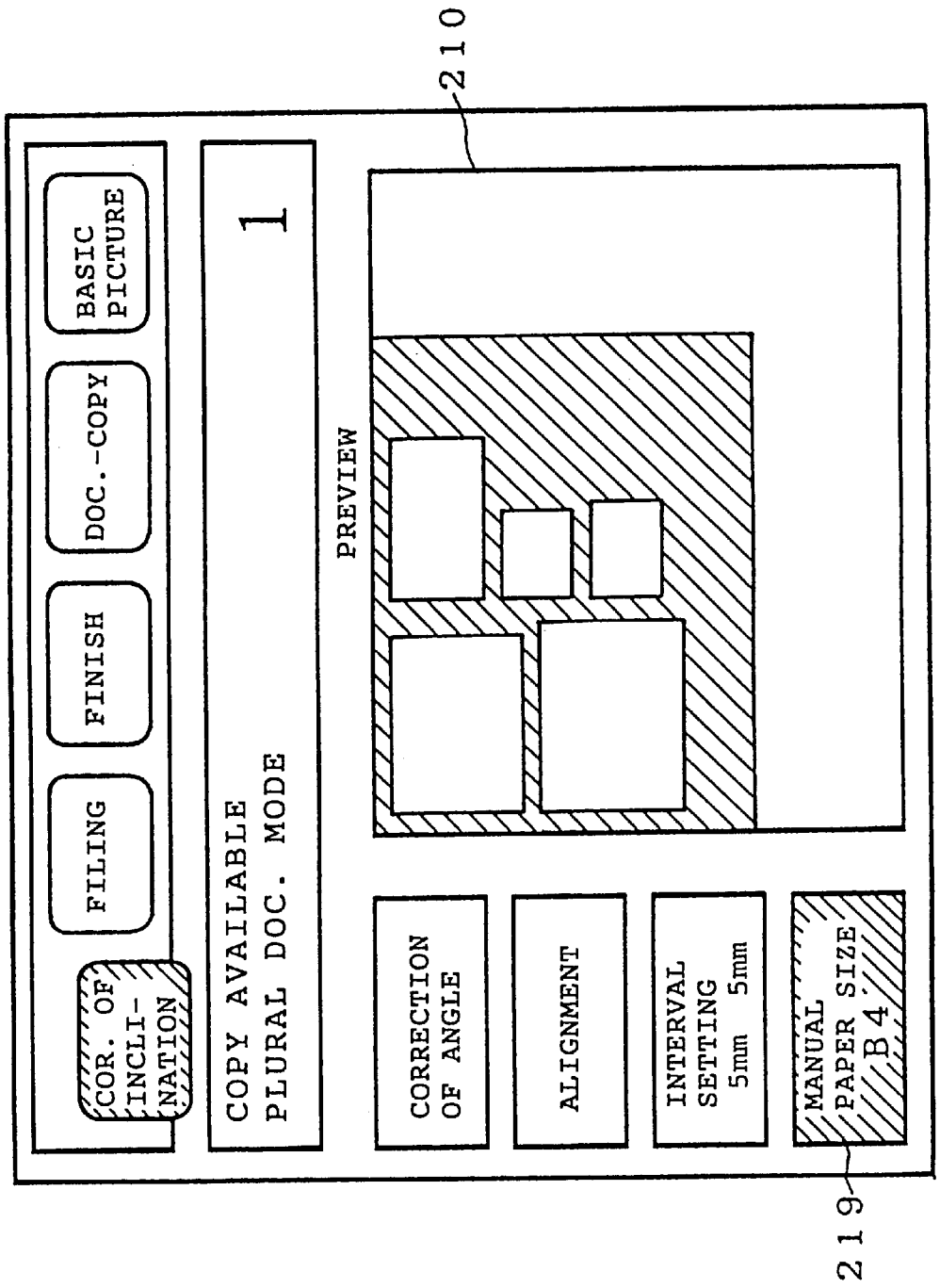
FIG. 52 is a diagram (5) for explaining a picture of the display with a touch panel in key operation.

FIG. 52 indicates a picture in the case where the recording paper size is changed to B4 (Japanese Industrial Standards, 257 mm×364 mm) by operating the recording paper size selecting key 219 in which a display of "manual" and "B4" is shown at the portion of the recording paper size selecting key 219. Also, recording paper having B4 size is displayed in the frame 210 along with the document images.

Figure 53:
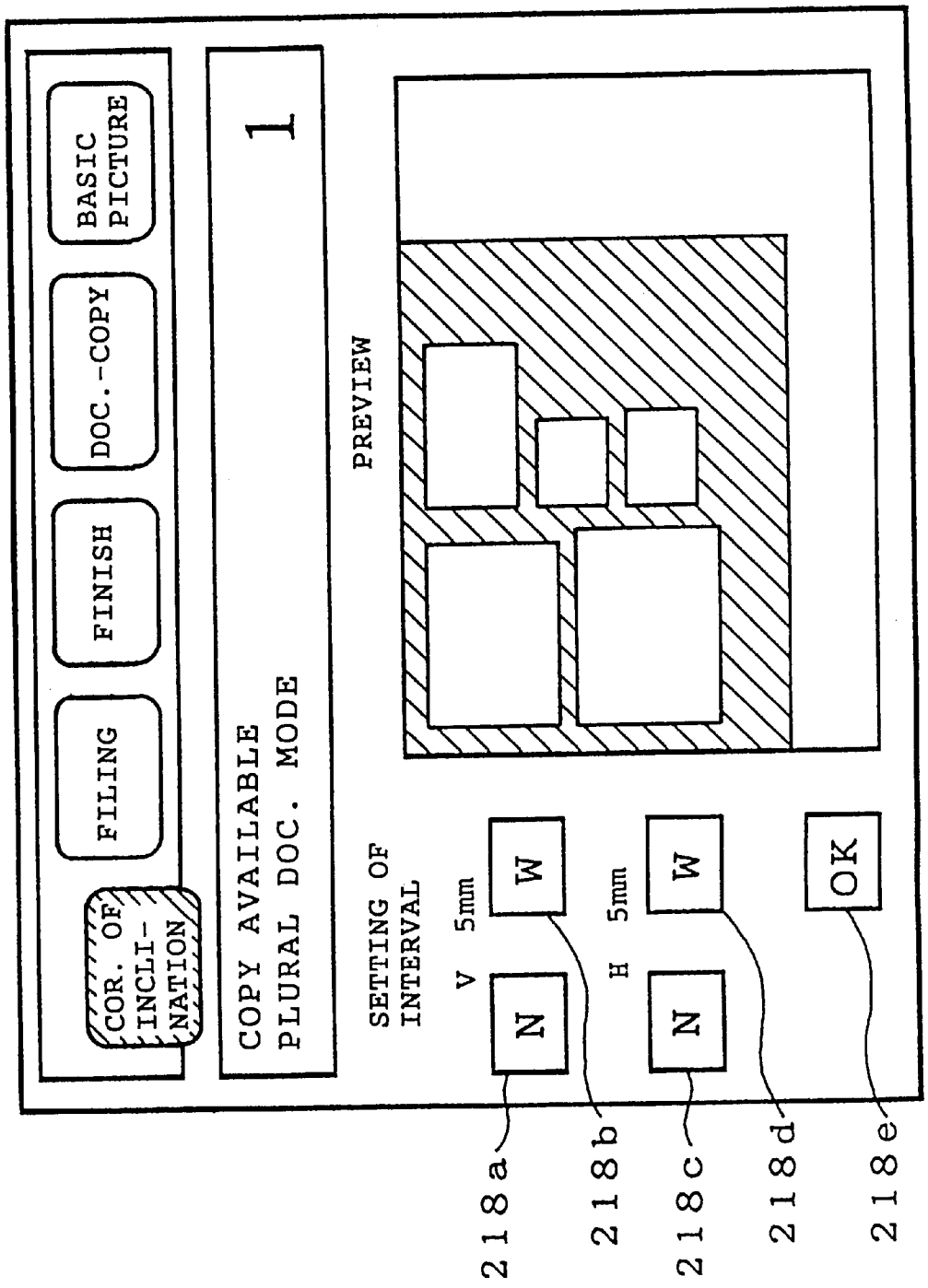
FIG. 53 is a diagram (6) for explaining a picture of the display with a touch panel in key operation.
Figure 54:
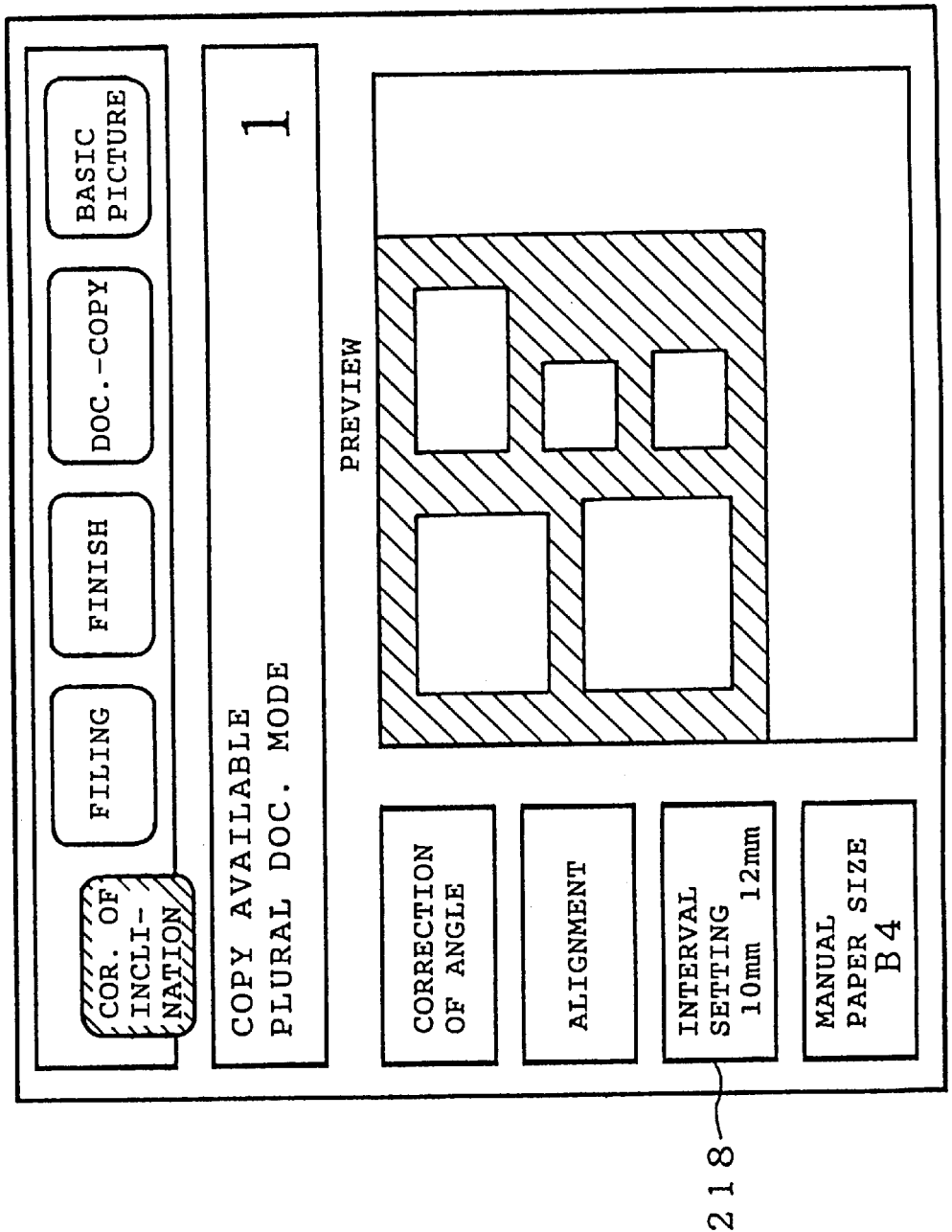
FIG. 54 is a diagram (7) for explaining a picture of the display with a touch panel in key operation.

FIG. 53 indicates a picture in the state where the interval setting key 218 is operated in the picture (picture in the state where the aligning key 217 is operated and "mode 1" is selected) shown by FIG. 51. In respect of the picture shown by FIG. 53, vertical interval setting keys 218a and 218b and horizontal interval setting keys 218c and 218d are operated while looking at the arrangement state of the document images displayed in the frame 210 whereby the vertical and horizontal intervals of the document images can be made desired intervals. The desired intervals can be set by operating an OK key 218e. FIG. 54 indicates the state where the vertical intervals among the document images are set to 10 mm and the horizontal intervals thereof are set to 12 mm.

Figure 55:
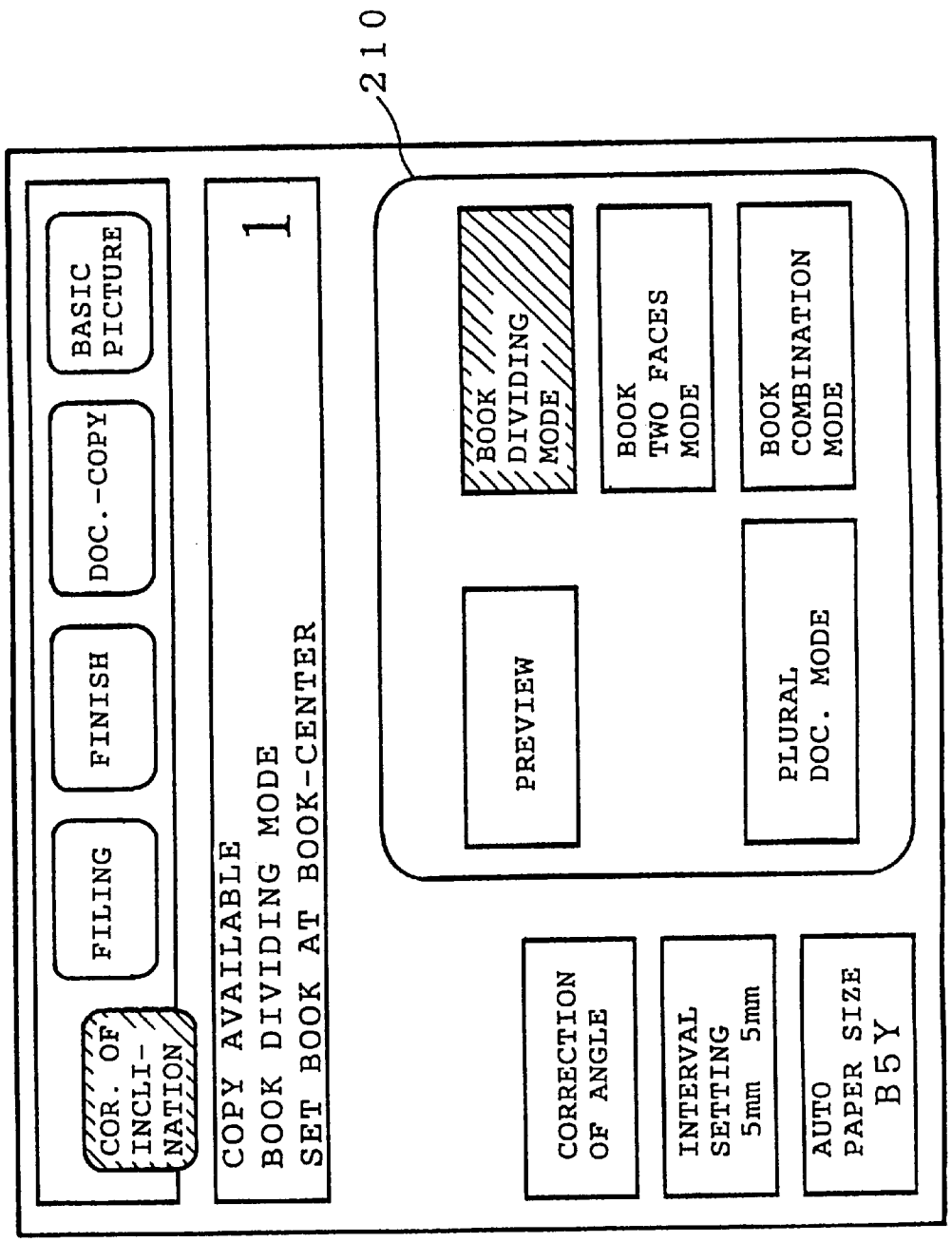
FIG. 55 is a diagram (8) for explaining a picture of the display with a touch panel in key operation.

FIG. 55 indicates the display picture when the inclination correction is selected by the touch key 201 as shown by FIG. 48, and when the book dividing mode key 213 is operated in the display, the basic display picture shown by FIG. 47 is switched as illustrated. Although the copying can be carried out even in this state, the angle correction, the interval setting or the like can be carried out as in the case of the plural sheets document mode explained above.

Figure 56:
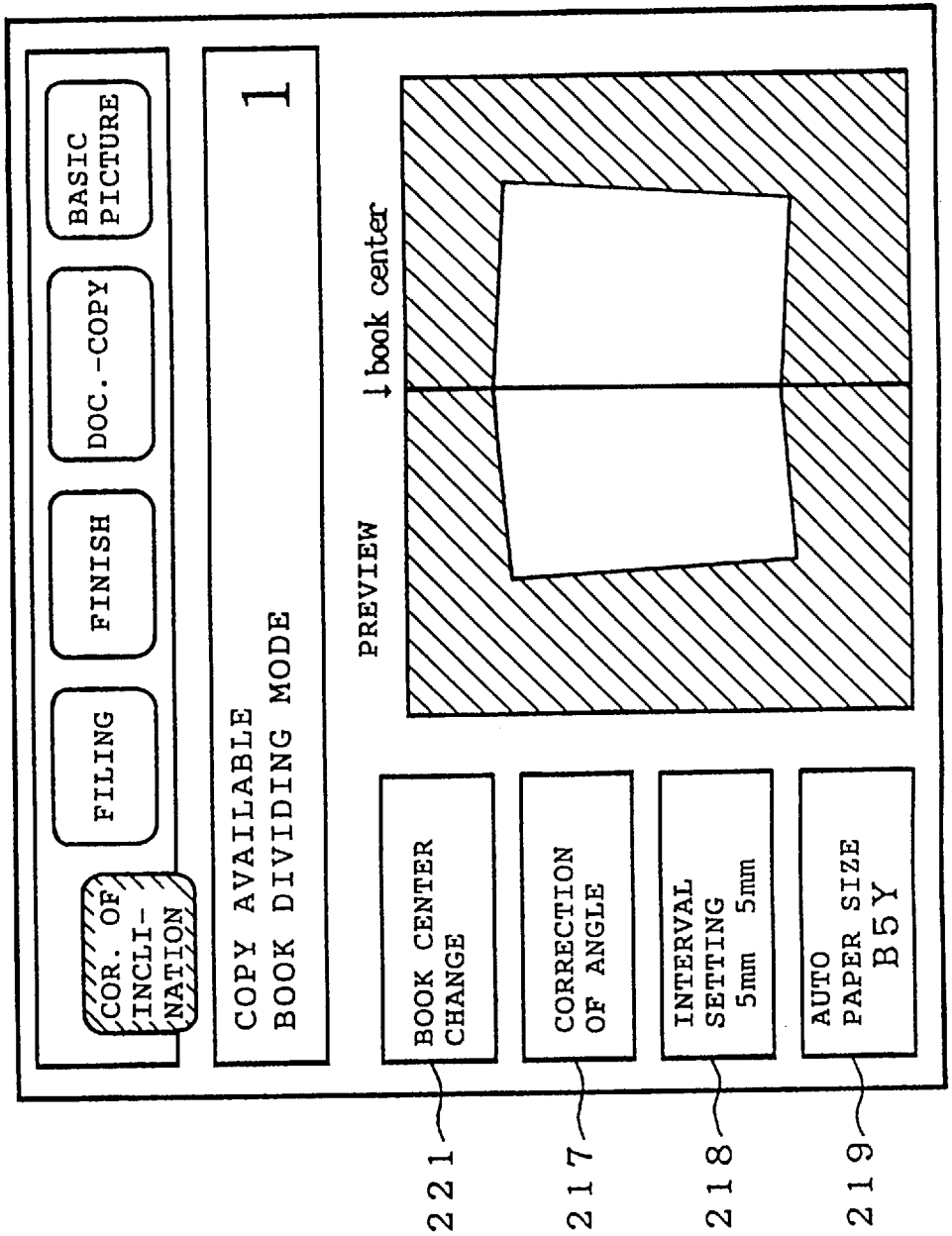
FIG. 56 is a diagram (9) for explaining a picture of the display with a touch panel in key operation.

When the book dividing mode key 213 is operated and the preview key 211 is operated in the picture illustrated by FIG. 55, the reading of the document image is conducted by operating the image reading unit IR and the arrangement state of the book document placed on the document base is displayed. FIG. 56 indicates the picture when the preview key 211 is operated. A book center change key 221 newly instructing the change of the position of the book center, is displayed.

Figure 57:
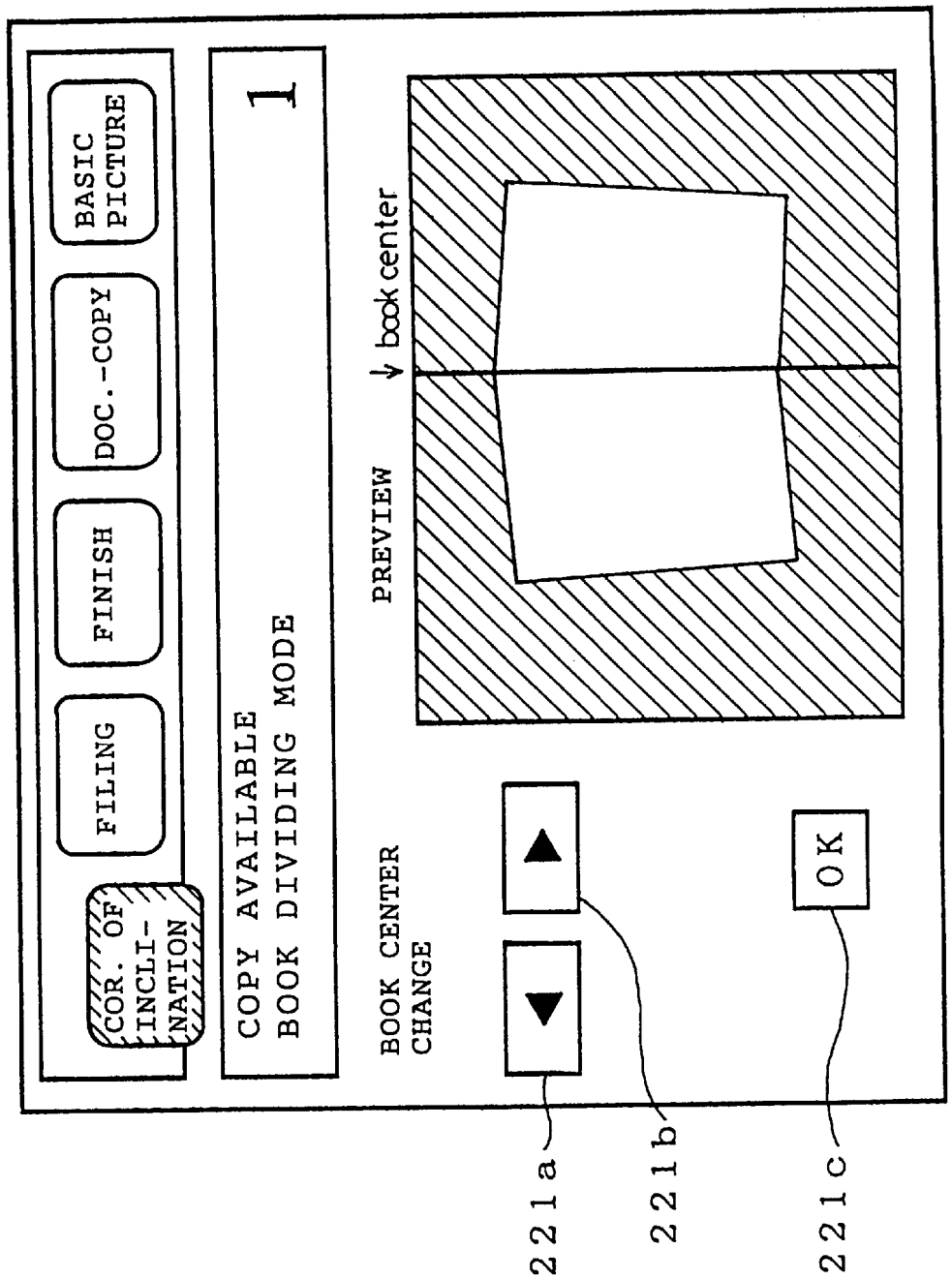
FIG. 57 is a diagram (10) for explaining a picture of the display with a touch panel in key operation.

When the book center change key 221 is operated in the picture shown by FIG. 56, the picture is switched to a picture shown by FIG. 57. The position of the book center can be moved by operating center position setting keys 221a and 221b setting the position of the book center to a desired position. The position of the book center can be set to the desired position by operating finally an OK key 221c. FIG. 57 indicates the state where position of the book center is moved to the right from the first position.

Figure 58:
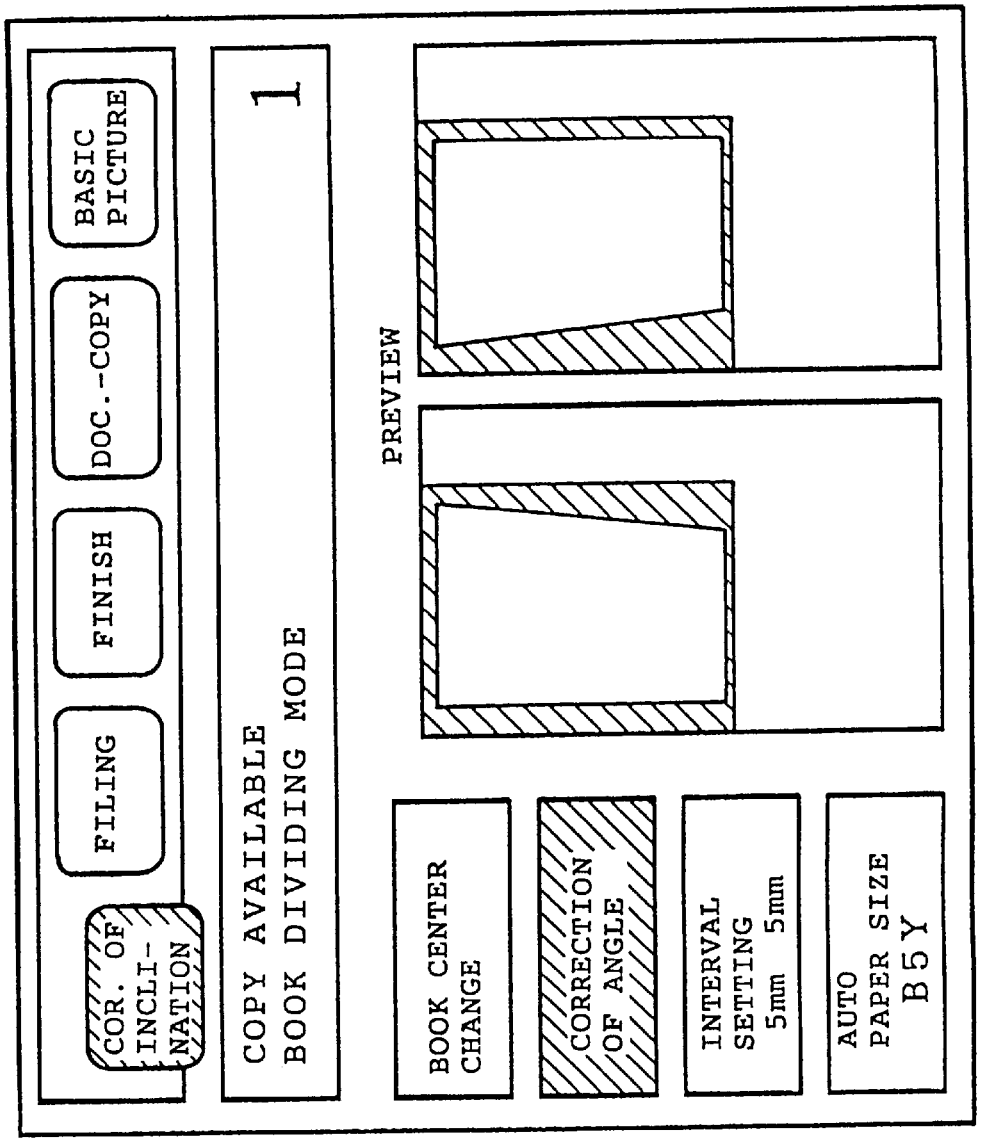
FIG. 58 is a diagram (11) for explaining a picture of the display with a touch panel in key operation.

FIG. 58 indicates a picture in the case where the angle correction is conducted in respect of the left and right pages by operating the angle correction key 216 and the state of correction is displayed by operating the preview key 211 in the state in which the book dividing mode is set. Here, intervals of 5 mm are set for the document intervals α and β and the state where B5Y (Japanese Industrial Standards, 182 mm×257 mm) is selected for the recording paper size in the "AUTO PAPER SIZE" mode, is displayed.

Figure 59:
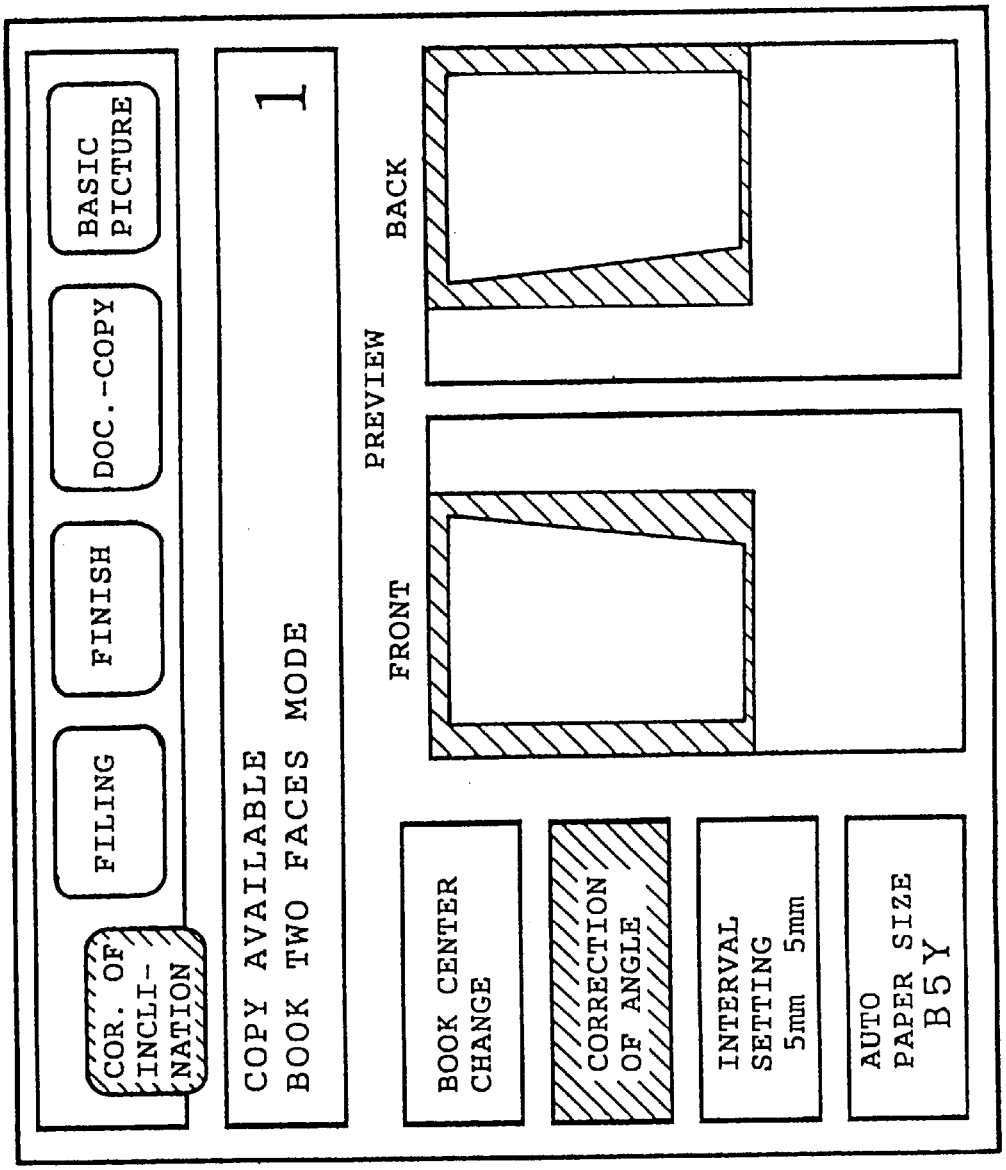
FIG. 59 is a diagram (12) for explaining a picture of the display with a touch panel in key operation.
Figure 60:
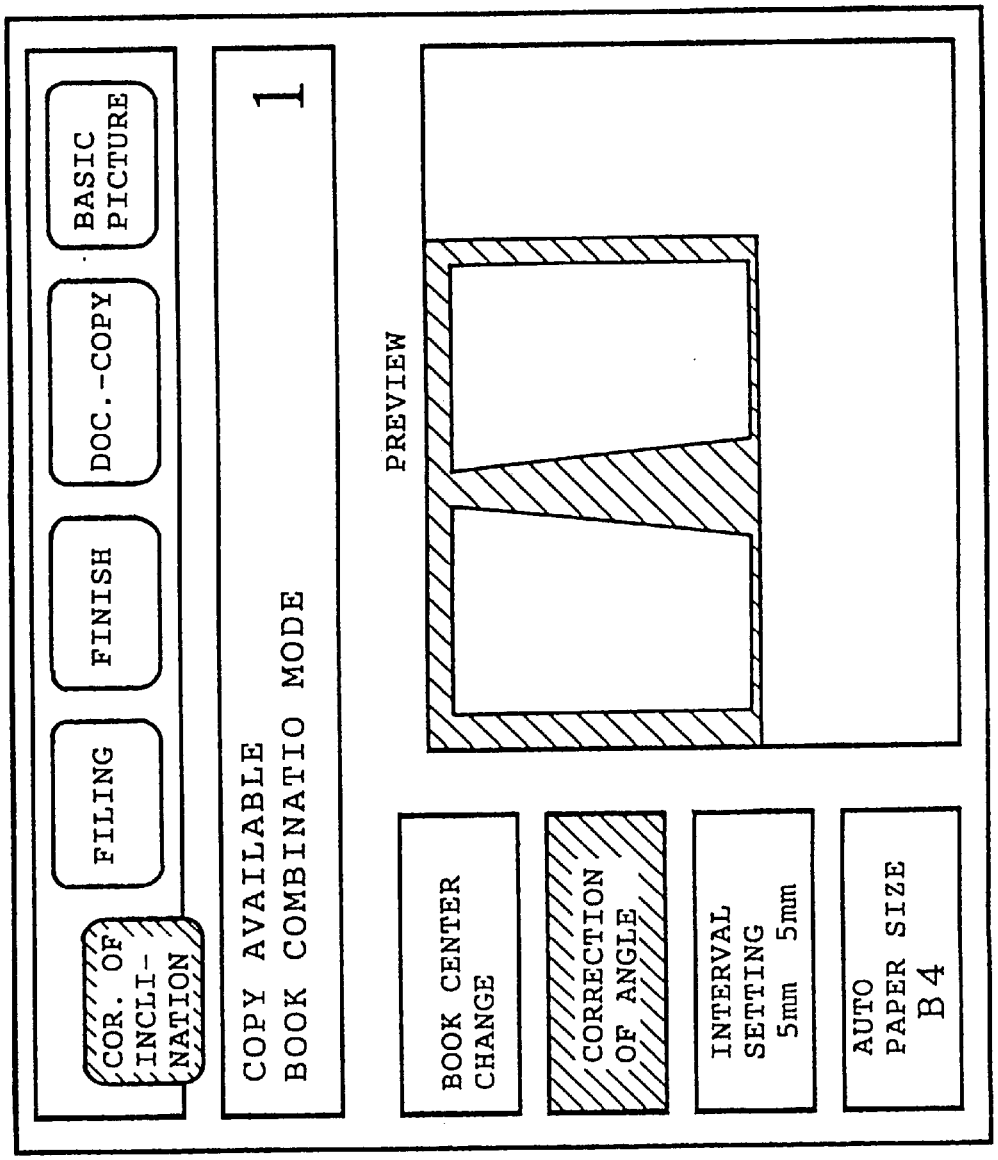
FIG. 60 is a diagram (13) for explaining a picture of the display with a touch panel in key operation.

FIG. 59 indicates a picture in the case where the angle correction is conducted in respect of the left and right pages by operating the angle correction key 216 and the state of correction is displayed by operating the preview key 211 in the state in which the book both face mode is set by operating the book two face mode key 214. Also, FIG. 60 indicates a picture in the case where the angle correction is conducted in respect of the left and right pages by operating the angle correction key 216 and the state of correction is displayed by operating the preview key 211 in the state in which the book combination mode is set by operating the key 215.

The setting of the image intervals and the selection of the recording paper size are the same as those in the case of the plural sheets document mode and therefore, an explanation thereof will be omitted.

Figure 61:
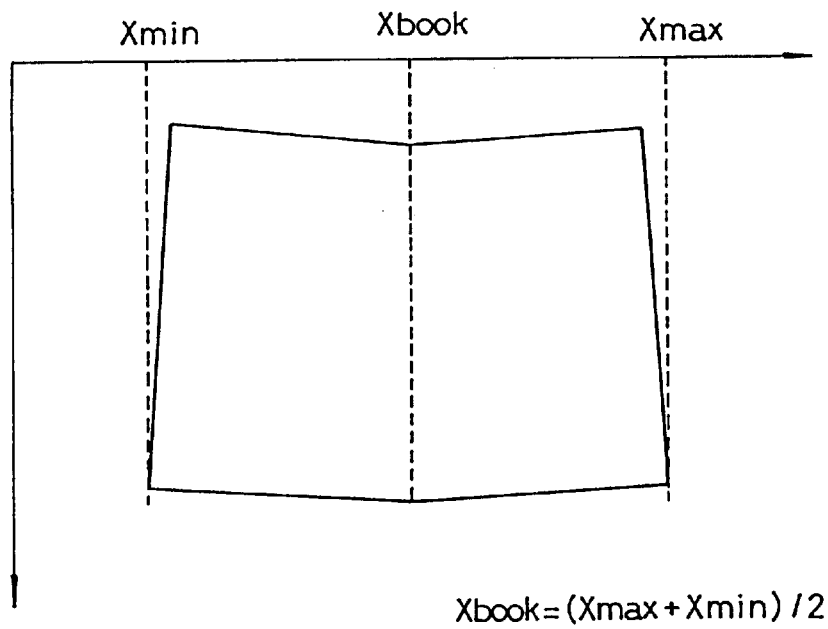
FIG. 61 is a diagram for explaining another example with respect to setting a book center position.

Although according to the embodiments described above the position of the book center is previously set on the side of the apparatus, the present invention is not limited thereto but the position can automatically be set based on the result of the processing of reading the document image. For example, as illustrated in FIG. 61 the position of the book center can be set to Xbook=(Xmax+Xmin)/2 from the maximum value Xmax and the minimum value Xmin of the coordinate value in the sub-scanning direction (X-axis direction) of the image area.

Figure 62:
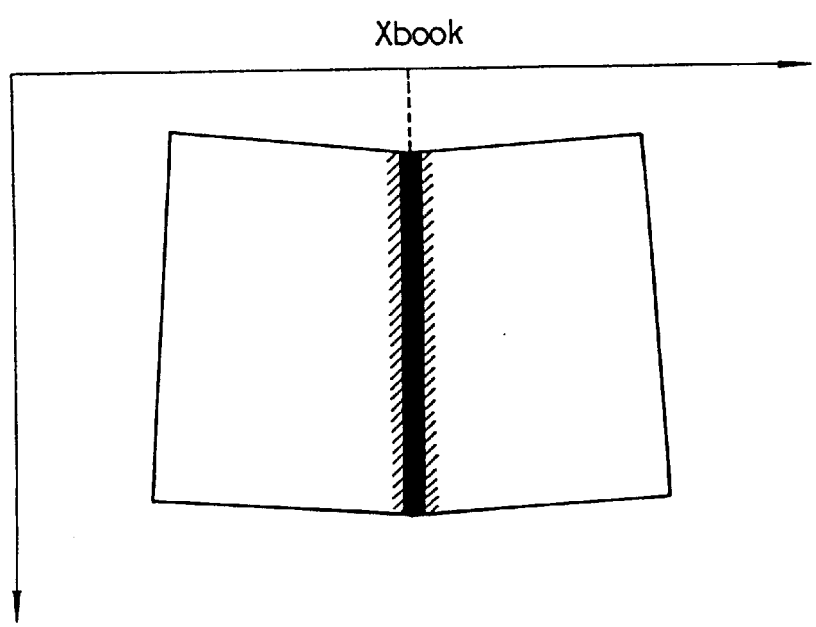
FIG. 62 is a diagram for explaining a shadow caused at a bound portion of book document.
Figure 63:
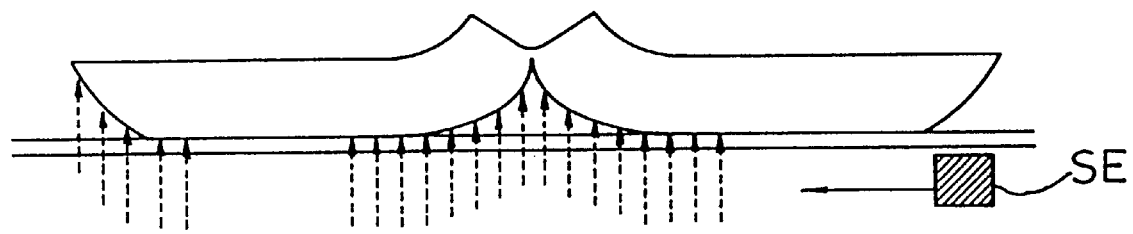
FIG. 63 is a diagram for explaining a close contact state between document and a document base caused at a bound portion of book document.

When the book document is placed on the document base, as illustrated, for example, by FIG. 62, the bound portion is not in close contact with the document base and a "shadow" different from the normal image is caused on that portion. Therefore, the position of the book center can also be determined by detecting the bound portion by detecting the "shadow" or by measuring a distance between the surface of the document base and the book document in the sub-scanning direction by a distance measuring sensor SE as illustrated by FIG. 63. Also, the inclination of the position of the book center can be detected by detecting the bound portion at a plurality of positions in the main scanning direction orthogonal to the sub-scanning direction.

Figure 64:
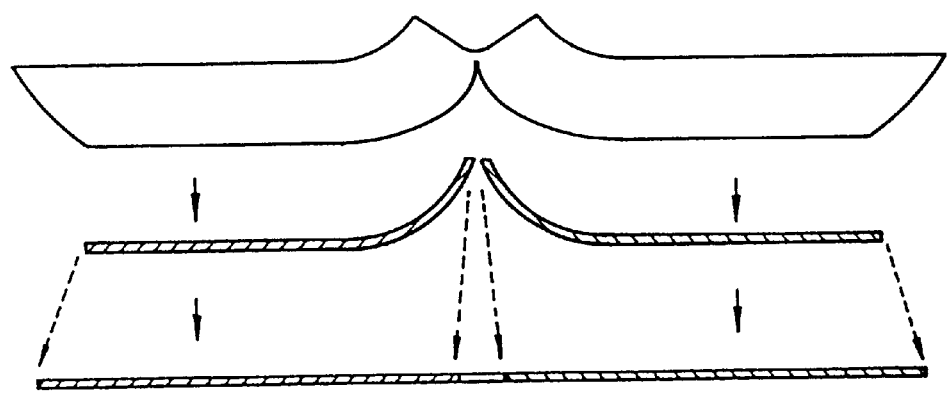
FIG. 64 is a diagram for explaining distortion of document image caused at a bound portion of book document and correction of the distortion.

Furthermore, as illustrated by FIG. 64, there has been suggested a technical means in which when the book document is placed on the document base, a distortion of the image that is caused since the bound portion is not brought into close contact with the document base, is corrected based on the distance between the surface of the document base and the book document. High quality image can be formed in the case of book document by correcting the angle or position of the image as well as correcting the distortion of the image by combining such a distortion correcting means.

Figure 65:
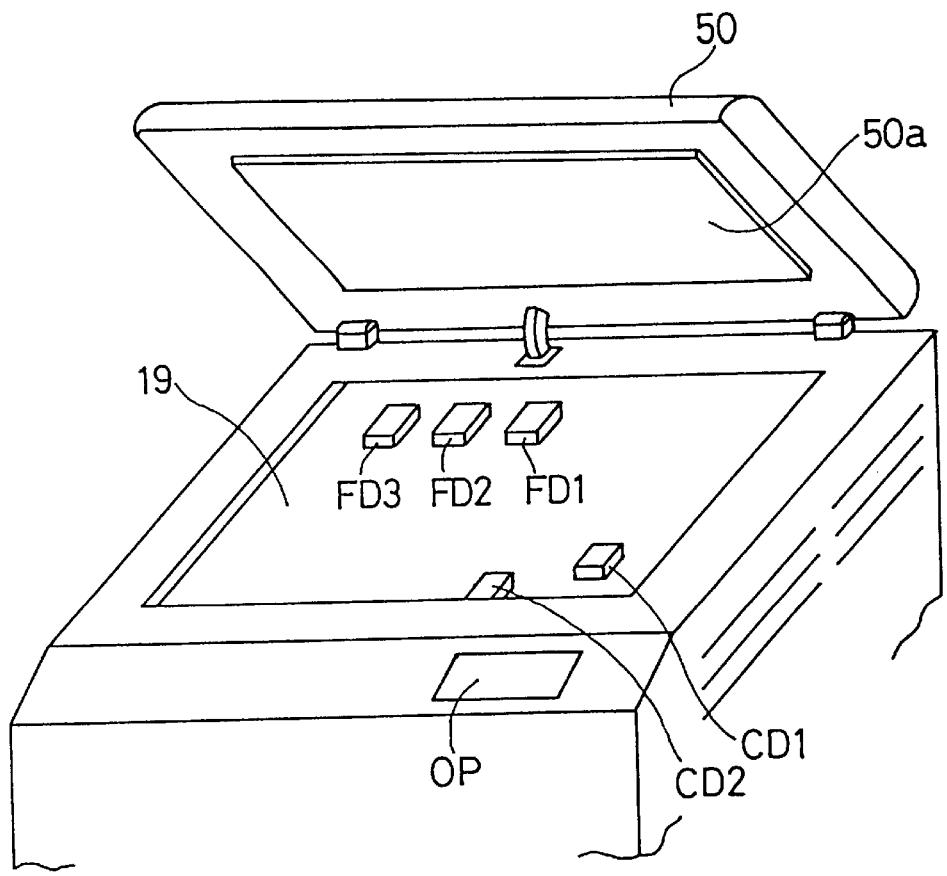
FIG. 65 is a perspective view showing a document base portion of a copier.
Figure 66:
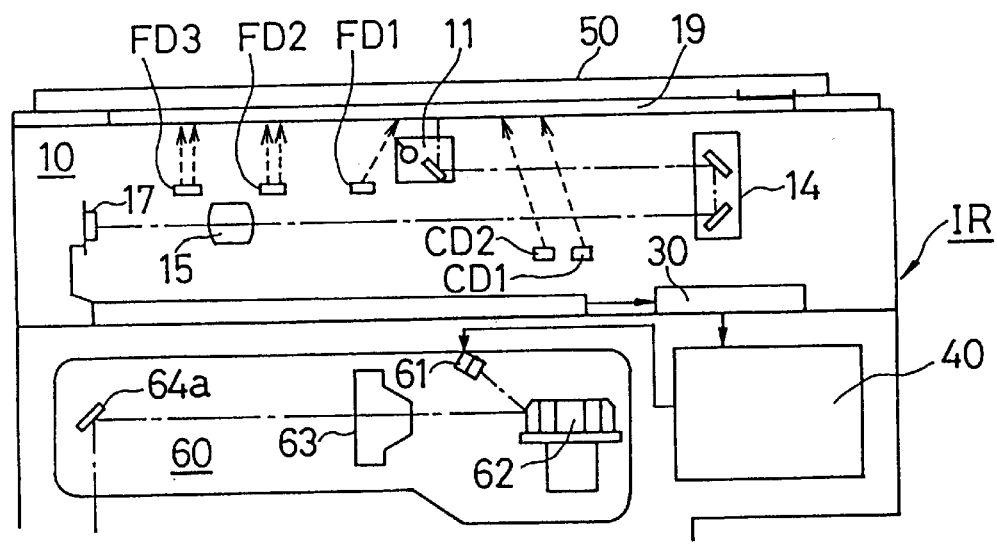
FIG. 66 is a sectional view showing the document base portion of the copier.

Here, a simple explanation will be given of a method of measuring a distance between the surface of the document base and the book document. FIG. 65 is a perspective view of the document base portion of the copier and FIG. 66 is a sectional view of the document base portion where distance sensor units FD 1 through FD 3 and distance sensor units CD 1 and CD 2 are arranged on the lower side of the document base 19. That is, the distance sensor units FD 1 through FD 3 on the lower side of the first scanner 11 are distance sensor units for detecting the length of the document mounted onto the document base 19 along the moving direction of the first scanner 11 and the distance sensor units CD 1 and CD 2 on the lower side of the second scanner 14 are distance sensor units for detecting the length thereof in a direction orthogonal to the moving direction of the first scanner 11.

Figure 67A:
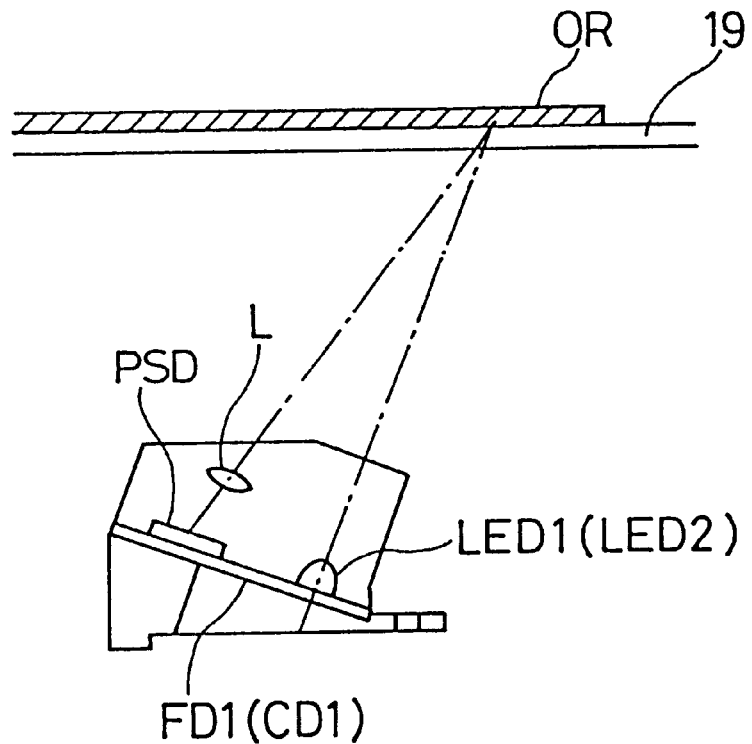
FIG. 67(*a*) and FIG. 67(*b*) are diagrams for explaining the constitution of a distance sensor unit.
Figure 67B:
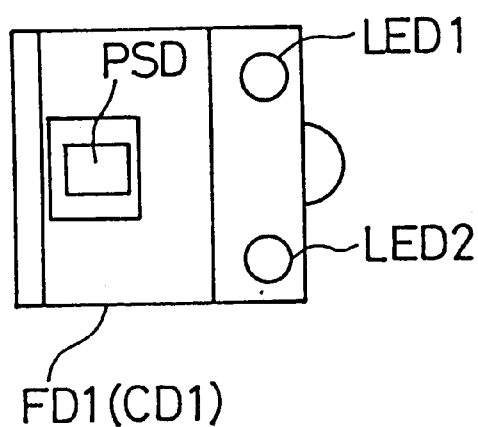
Figure 68:
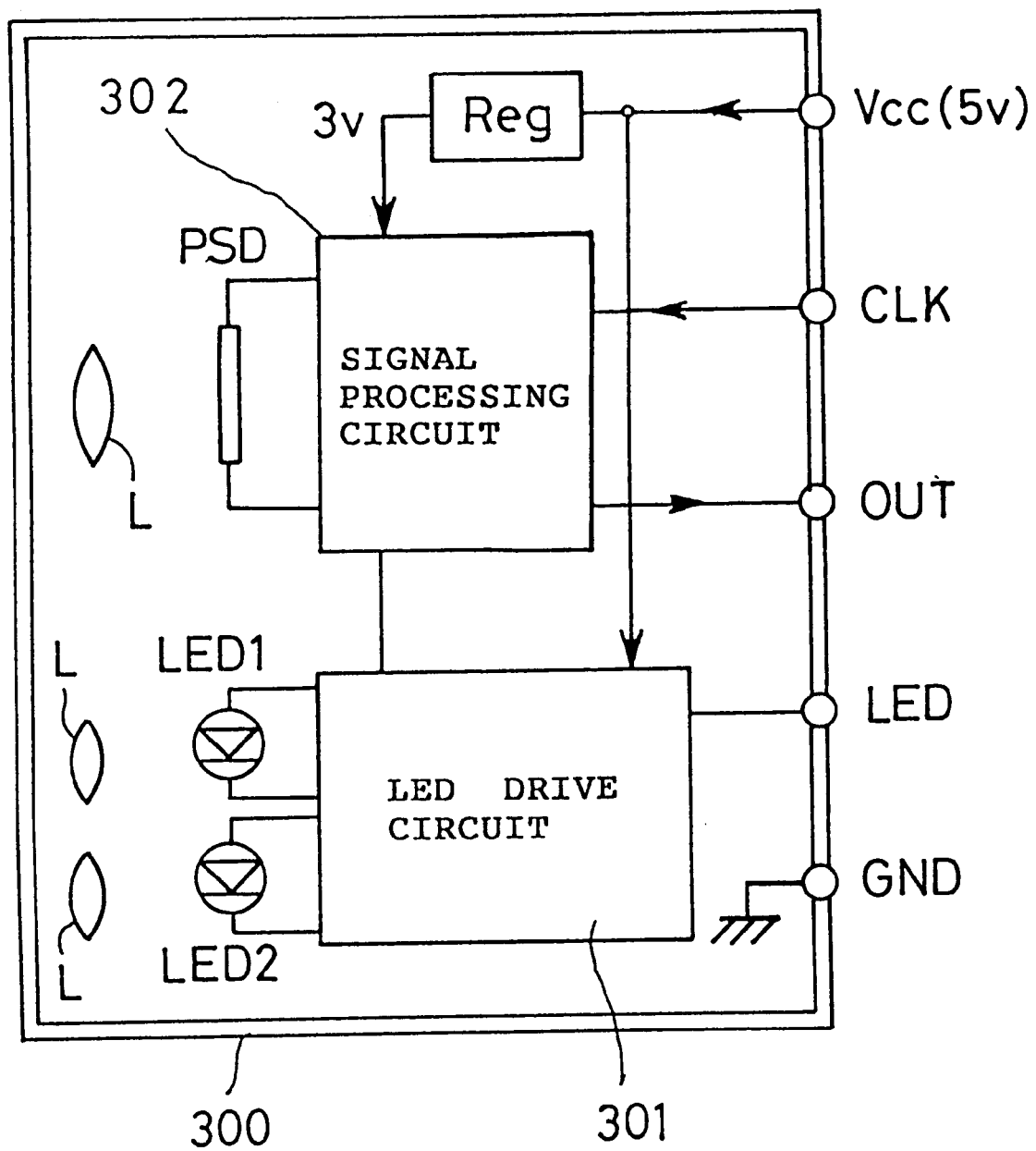
FIG. 68 is a block diagram showing a drive circuit incorporated in the distance sensor unit.

FIGS. 67(a) and 67(b) are views showing the constitution of the distance sensor units FD 1 through FD 3 and the distance sensor units CD 1 and CD 2 and FIG. 68 indicates a drive circuit 300 incorporated in the sensor unit. Incidentally, notation L designates a focusing lens. Each of the sensor units includes two of LED (Light Emitting Diode) 1 and LED 2 and one photodiode PSD whereby two locations of a position illuminated by LED 1 and a position illuminated by LED 2 can be detected by one sensor unit. Either one of LED 1 and LED 2 emits light in accordance with the state of LED signals inputted to a LED drive circuit 301 and the distance to the object can be detected by a detecting position on the photodiode PSD. An analog signal outputted from the photodiode PSD is converted into a digital signal at a signal processing circuit 302 and is outputted in synchronism with clock signals.

As illustrated by FIGS. 67(a) and 67(b), each sensor unit is arranged such that light projected from LED 1 or LED 2 is obliquely incident on the document OR. The photodiode PSD detects light irregularly reflected by the document face. According to this arrangement a difference between the distance from the sensor unit to a portion of the book document that is brought into close contact with the document base and a distance from the sensor unit to the bound portion of the book document that is not brought into close contact with the document base, can be magnified and the larger the difference, the higher the threshold value for detecting the bound portion of the book document can be set whereby the bound portion can firmly be detected.

Figure 69:
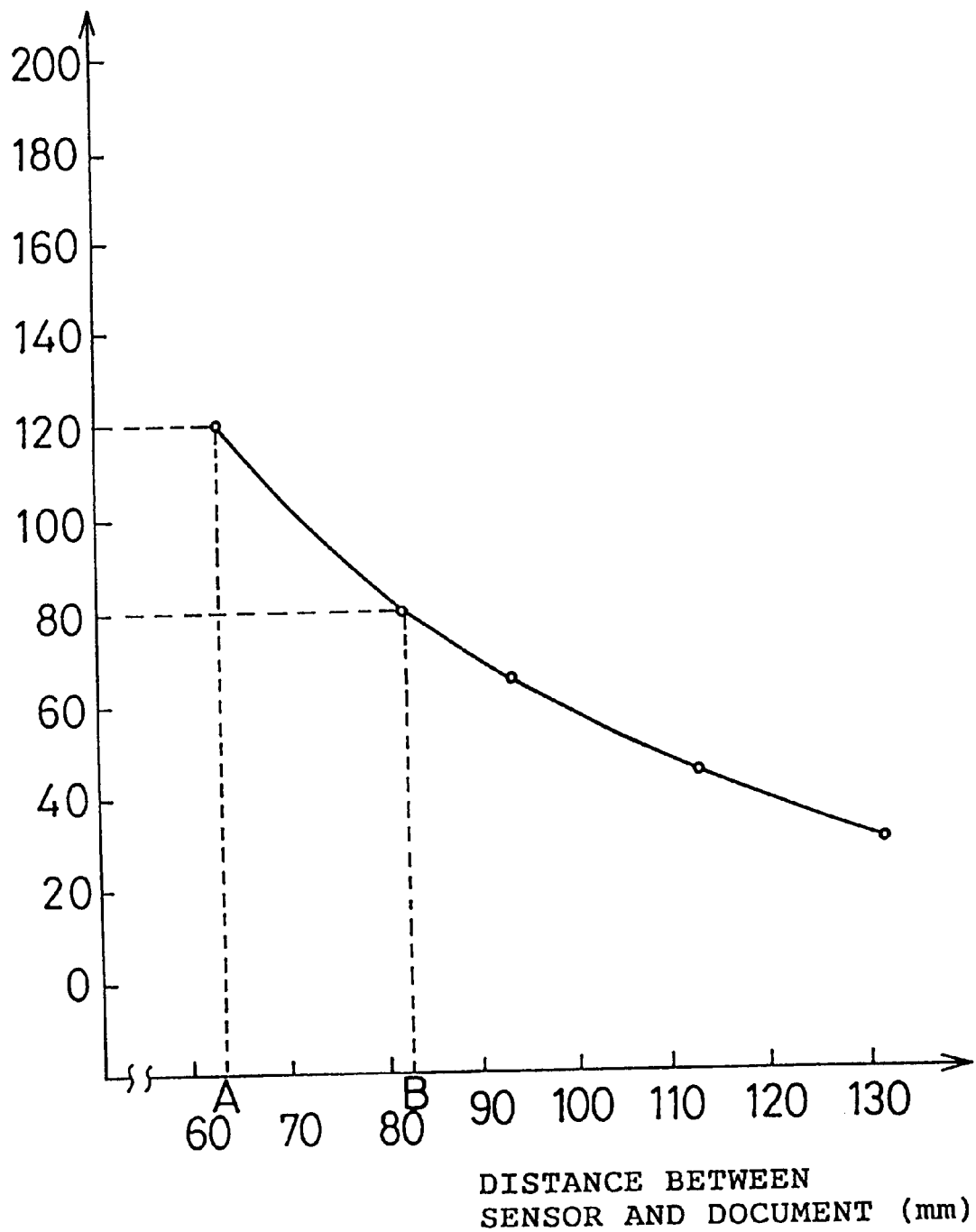
FIG. 69 is a diagram showing a relation between a distance from the distance sensor unit to a document base and an output of distance sensor (PSD).

FIG. 69 indicates an example of a relation between the distance from the sensor unit to the document face and the output of the photodiode. An output of the photodiode at a distance A from the sensor unit to a portion of the book document that is brought into close contact with the document base is 120 DSC, whereas an output of the photodiode at a distance B between the sensor unit and the bound portion of the document face of the book document that is not brought into close contact with the document base is 80 DSC. Therefore, when the threshold value is set to, for example, 100 DSC, the bound portion of the book document can firmly be detected.

Additionally, although according to the above-described embodiments, in respect of the inclination of the document image, the inclination of the periphery of the document with respect to the document scale is detected, the detection of the inclination of the document image is not limited thereto but the inclination of the document image can also be detected by applying a method in which an image inside of the document, for example, the inclination of letter rows is detected. Incidentally, there have been suggested many methods of detecting the inclination of letter rows of document.

Although an explanation has been given of digital copiers which are an example of the image forming apparatus according to the embodiments, the present invention is naturally applicable to an image processing apparatus for, for example, receiving a plurality of image information sent from a plurality of image processing apparatuses (including scanners etc.), as in a digital camera or the like.

According to the present invention, based on image signals provided by scanning a plurality of sheets of document simultaneously arranged on a document base, respective image areas of the plurality of sheets of document are detected, respective inclinations of the plurality of image areas in respect of at least a predetermined reference line are detected and images are formed by image signals correcting the inclinations wherein the relative positions among the images can also be corrected.

Thereby, even when document in book style such as books is placed on a document base and left and right pages thereof are respectively and irregularly inclined, the inclinations of the image and the positions thereof are corrected and the aligned images having no inclination in respect of the periphery of recording paper can be constructed whereby high quality copy can be provided.

What is claimed is:

1. An image forming apparatus comprising:
    a scanner for reading a first document and a second document different from the first document placed on a document base for providing a first image data corresponding to the first document and a second image data corresponding to the second document;
    a memory for storing the first image data and the second image data;
    identifying means for identifying a first image area of the first document and a second image area of the second document by comparing the first image data and the second image data with a threshold value;
    detecting means for detecting a first inclination of the first image area in respect of the document base and a second inclination of the second image area in respect of the document base by comparing positions of the first image area and the second image area with a position of the document base;
    rotation processing means for processing a rotation of the first image data and the second image data stored in the memory in order to correct the first inclination and the second inclination;
    aligning means for aligning images based on the first image data and the second image data rotated by the rotation processing means at predetermined intervals, the aligning means controllably setting a predetermined gap between the images; and
    a printer for printing the first image data and the second image data rotated by the rotation processing means on a record medium.

2. An image forming apparatus according to claim 1, further comprising:
    displaying means for displaying a first image based on the first image data and a second image based on the second image data inclined in respect of the document base before rotation processing the first image data and the second image data, and a first image based on the first image data and a second image based on the second image data rotated by rotation processing the first image data and the second image data.

3. An image forming apparatus according to claim 2, further comprising:
    display switching means for switching a display of the images based on the first and the second image data before rotation processing on the displaying means and a display of the images based on the first and the second image data after rotation processing on the displaying means.

4. An image forming apparatus according to claim 2, wherein the displaying means displays the first and second images based on the first and the second image data after rotation processing overlapped with an image of a size of the record medium.

5. An image forming apparatus according to claim 1, further comprising an interval changing means for changing the predetermined intervals.

6. An image forming apparatus according to claim 5, further comprising operation parameter inputting means for inputting an operation parameter, said operation parameter inputting means includes the aligning means and the interval changing means.

7. An image forming apparatus according to claim 1, wherein in a case of a book document, the first document corresponds to a right page of a spread book document and the second document corresponds to a left page of the spread book document.

8. An image forming apparatus according to claim 7, further comprising:
    detecting means for detecting boundary between the right page and the left page of the spread book document placed on the document base in a spread state.

9. An image forming apparatus according to claim 8, wherein the detecting means is a distance sensor for measuring a distance between a surface of the document base and the book document, said distance sensor detecting a maximum value of the measured distance as a bound portion of the book document and determining the bound portion as a boundary between the right page and the left page of the book document.

10. An image forming apparatus according to claim 8, further comprising boundary changing means for changing the boundaries detected by the detecting means.

11. An image forming apparatus according to claim 10, further comprising:
    operation parameter inputting means for inputting an operation parameter wherein the boundary changing means is included and image ranges of the right page and the left page of the spread book document are changed by operating the boundary changing means.

12. An image processing apparatus comprising:
    first image area detecting means for detecting an image area of a first document;
    second image area detecting means for detecting an image area of a second document different from the first document;
    inclination detecting means for detecting a first inclination of the first document from the image area of the first document and a second inclination of the second document from the image area of the second document;
    correcting means for correcting the first inclination and for correcting the second inclination;
    aligning means for aligning the image data of the first document, the first inclination of which has been corrected by the correcting means, and the image data of the second document, the second inclination of which has been corrected by the correcting means, at predetermined intervals previously set, the aligning means controllably setting a predetermined gap between images; and outputting means for outputting an image data of the first document with the corrected first inclination and an image data of the second document with the corrected second inclination.

13. An image processing apparatus according to claim 12, further comprising:

a printer connected to the outputting means for printing the image data of the first document and the image data of the second document both outputted by the outputting means.

14. An image processing apparatus according to claim 12, wherein the first inclination is different from the second inclination.

15. An image processing apparatus according to claim 12, wherein the first correcting means corrects the first inclination by rotating the image area of the first document and the second correcting means corrects the second inclination by rotating the image area of the second document.

16. An image processing apparatus according to claim 12 further comprising interval changing means for changing the predetermined intervals previously set.

17. An image processing apparatus according to claim 16, further comprising operation parameter inputting means for inputting an operation parameter, said operation parameter inputting means includes the aligning means and the interval changing means.

18. An image processing apparatus comprising:

a scanner for reading a first document and a second document thereby providing a first image data and a second image data;

detecting means for detecting an inclination of the first document and an inclination of the second document in respect of a scanning direction of the scanner based on the first image data and second image data;

correcting means for correcting the inclination of the first document and the inclination of the second document;

aligning means for aligning the first image data and the second image data the inclination of which have been corrected by the correcting means at predetermined intervals previously set, the aligning means controllably setting a predetermined gap between images; and displaying means for displaying the first image data and the second image data before correcting and the first image data and the second image data after correcting by the correcting means.

19. An image processing apparatus according to claim 18, wherein the inclination of the first document is different from the inclination of the second document.

20. An image processing apparatus according to claim 18, the correcting means corrects the inclination of the first document and the inclination of the second document by rotating the first image data of the first document and the second image data of the second document.

21. An image processing apparatus according to claim 18, further comprising a printer for printing the first image data and the second image data which have been aligned at the predetermined intervals on paper.

22. An image processing apparatus according to claim 21, wherein the displaying means displays images based on the first image data and the second image data aligned by the aligning means overlapped with an image of a size of a record medium.

23. An image processing apparatus according to claim 18, further comprising interval changing means for changing the predetermined intervals previously set.

24. An image processing apparatus according to claim 23, further comprising operation parameter inputting means for inputting an operation parameter, said operation parameter inputting means includes the aligning means and the interval changing means.

25. An image processing apparatus having information processing means for executing an image data processing in accordance with a method comprising the steps of:

providing a first image data and a second image data;

detecting a first inclination of the first image data and a second inclination of the second image data;

correcting the first inclination and the second inclination;

aligning the first image data and the second image data the inclinations of which have been corrected at predetermined intervals;

controllably setting a predetermined gap between images; and outputting the first image data the first inclination of which has been corrected and the second image data the second inclination of which has been corrected.

26. An image processing apparatus according to claim 25, wherein the method of the image data processing further comprising a step of printing the outputted first image data and the outputted second image data.

27. An image processing apparatus according to claim 25, wherein the method of the image data processing further comprising a step of displaying the first image data before correcting the first inclination thereof and the second image data before correcting the second inclination thereof or the first image data after correcting the first inclination thereof and the second image data after correcting the second inclination thereof.

28. An image processing apparatus having information processing means for executing an image data processing in accordance with a method comprising the steps of:

scanning a first image data and a second image data;

detecting a first inclination of the first image data in respect of a scanning direction and a second inclination of the second image data in respect of the scanning direction;

correcting the first inclination and the second inclination;

aligning the first image data and the second image data the inclination of which have been corrected at predetermined intervals;

controllably setting a predetermined gap between images; and displaying the first image data and the second image data before correcting the first and the second inclinations thereof or the first image data and the second image data after correcting the first and the second inclinations thereof.

29. An image processing apparatus according to claim 31, wherein the method of the image data processing furthr comprising a step of printing the first image data and the second image data after correcting the first and the second inclinations thereof.

* * * * *